United States Patent
Cho et al.

(10) Patent No.: US 11,080,753 B2
(45) Date of Patent: Aug. 3, 2021

(54) APPARATUS AND METHOD FOR USING CONNECTED VEHICLES AS AN ADVERTISEMENT PLATFORM

(71) Applicant: AD CONNECTED, INC., Seoul (KR)

(72) Inventors: Inje Cho, Seoul (KR); Hoonje Cho, Seoul (KR)

(73) Assignee: AD CONNECTED, INC., Seoul (KR)

( * ) Notice: Subject to any disclaimer, the term of this patent is extended or adjusted under 35 U.S.C. 154(b) by 0 days.

(21) Appl. No.: 16/286,336

(22) Filed: Feb. 26, 2019

(65) Prior Publication Data

US 2019/0266644 A1    Aug. 29, 2019

Related U.S. Application Data

(60) Provisional application No. 62/636,065, filed on Feb. 27, 2018.

(51) Int. Cl.
*G06Q 30/02* (2012.01)
*H04W 4/02* (2018.01)
(Continued)

(52) U.S. Cl.
CPC ......... *G06Q 30/0266* (2013.01); *B60Q 1/503* (2013.01); *B60Q 5/005* (2013.01); *B60R 11/0235* (2013.01); *G06Q 30/0265* (2013.01); *G09F 21/04* (2013.01); *G09F 27/005* (2013.01); *H04W 4/023* (2013.01); *H04W 4/23* (2018.02); *H04W 4/44* (2018.02); *B60R 2011/004* (2013.01); *B60Y 2200/91* (2013.01); *G05D 1/0088* (2013.01); *G09F 2027/001* (2013.01)

(58) Field of Classification Search
CPC ............ G06Q 30/0266; G06Q 30/0265; B60R 11/0235; B60R 2011/004; H04W 4/023; H04W 4/44; H04W 4/23; B60Y 2200/91; G05D 1/0088; G09F 2027/001; G09F 27/00; G09F 21/04; G09F 27/005;
(Continued)

(56) References Cited

U.S. PATENT DOCUMENTS 6,812,888 B2   11/2004   Drury et al.
2007/0061057 A1   3/2007   Huang et al.
(Continued)

FOREIGN PATENT DOCUMENTS

JP   2004227162 A   8/2004
JP   2013089096 A   5/2013
(Continued)

OTHER PUBLICATIONS

Eric Sachs, Ads in Cars—Future of Digital Marketing, 2016 (Year: 2016).*
(Continued)

*Primary Examiner* — Tarek Elchanti
(74) *Attorney, Agent, or Firm* — Ichthus International Law PLLC

(57) ABSTRACT

By way of example, novel systems and methods for reproducing advertisements on connected vehicles are disclosed. In one example embodiment, a system for delivering advertisements include a plurality of connected vehicles participating in an advertisement event, and the plurality of connected vehicles is each configured to receive an instruction from one of the connected vehicles or a server over a network to cluster near or at a target area for reproducing an advertisement in a coordinated manner as a group of the connected vehicles.

14 Claims, 33 Drawing Sheets

(51) Int. Cl.
*H04W 4/44* (2018.01)
*H04W 4/23* (2018.01)
*B60Q 1/50* (2006.01)
*B60Q 5/00* (2006.01)
*B60R 11/02* (2006.01)
*G09F 21/04* (2006.01)
*G09F 27/00* (2006.01)
*B60R 11/00* (2006.01)
*G05D 1/00* (2006.01)

(58) Field of Classification Search
CPC . G08G 1/20; B60Q 5/008; B60Q 9/00; B60Q 1/503; B60Q 5/005
USPC .......................................... 705/14.45, 14.63
See application file for complete search history.

(56) References Cited

U.S. PATENT DOCUMENTS

| | | | |
|---|---|---|---|
| 2013/0243390 A1 | 9/2013 | Yoshio et al. | |
| 2014/0249913 A1* | 9/2014 | Endo | G06Q 30/02 705/14.45 |
| 2015/0348112 A1 | 12/2015 | Ramanujam | |
| 2017/0032402 A1 | 2/2017 | Patsiokas et al. | |
| 2017/0276935 A1 | 9/2017 | Sisbot | |
| 2018/0075481 A1* | 3/2018 | Adoni | G06F 16/285 |

FOREIGN PATENT DOCUMENTS

| | | |
|---|---|---|
| KR | 100418095 B1 | 2/2004 |
| KR | 1020130073278 A | 7/2013 |
| KR | 101371930 B1 | 3/2014 |
| KR | 20160046494 A * | 4/2016 |
| WO | WO2017040924 A1 | 3/2017 |

OTHER PUBLICATIONS

International Search Report and Written Opinion in PCT/KR2019/000724 dated May 16, 2019, pp. 11.
International Search Report and Written Opinion in PCT/KR2019/002394 dated Jul. 9, 2019, pp. 13.
International Search Report and Written Opinion in PCT/KR2019/005429 dated Aug. 14, 2019, pp. 11.

* cited by examiner

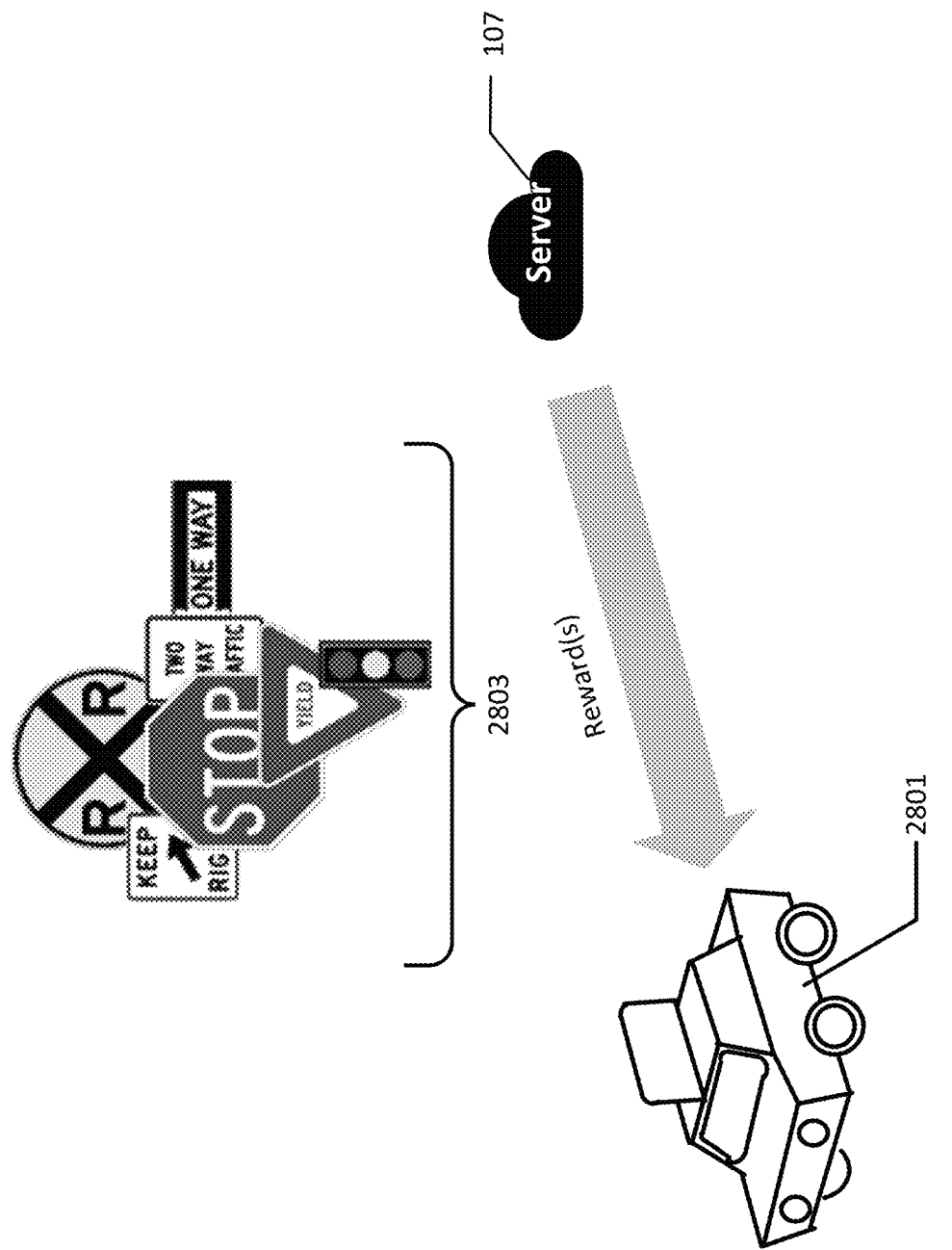

APPARATUS AND METHOD FOR USING CONNECTED VEHICLES AS AN ADVERTISEMENT PLATFORM

CROSS-REFERENCE TO RELATED APPLICATION(S)

The present application claims the benefit of U.S. Provisional Patent Application No. 62/636,065, filed Feb. 27, 2018, titled "SYSTEM FOR PROVIDING VEHICLE ADVERTISEMENT AND METHOD FOR CONTROLLING VEHICLE," and related Korean Patent Application Nos. KR10-2018-0052083, filed May 4, 2018, KR10-2018-0052084, filed May 4, 2018, KR10-2018-0052085, May 4, 2018, KR10-2018-0052086, May 4, 2018, KR10-2018-0052775, filed May 8, 2018, KR10-2018-0052776, filed May 8, 2018, KR10-2018-0052777, filed May 8, 2018, KR10-2018-0052778, May 8, 2019, KR10-2018-0052779, May 8, 2018, KR10-2018-0052780, May 8, 2018, the entire contents of which are incorporated by reference herein in its entirety.

TECHNICAL FIELD

The present disclosure relates to a system and method for delivering advertisements over a network, in particular, delivering the advertisements to one or more connected vehicles over the network in a connected environment.

BACKGROUND

As modern technology advances, internet connected devices are gaining more popularity and are becoming more common place in people's everyday lives. Further, commercial advertisements are taking various delivery technology channels such as internet, webpages, you-tubes, mobile phones, smart TVs, etc. substantially away from traditional channels such as newspapers, magazines, TVs, and billboards. The advertisement channels are becoming more digital and mobile.

In an internet of things (IoT) environment, nowadays vehicles or transportation means are becoming more connected than ever. Also, transportation vehicles such as taxis or buses are displaying more advertisements for profit, in the form of stickers or special paints, on the sides of the vehicles so that passers-by or pedestrians can view them. However, these delivery platforms are static in nature and are very limited in nature such that the advertisements are attached to the vehicles for a contract duration that is agreed between vehicle owners and an advertiser. After the contract duration, the advertisements need to come off or repainted. Further, these advertisements are static in nature and are not location based. That is, the advertisements don't change during an entire vehicle route. Furthermore, the advertisements are not interesting to the people in general.

As such, there is still a need for a new, improved, and innovative method or technique for reproducing digital advertisements using vehicles for the purpose of increasing the effect of advertisement.

SUMMARY

With the advent of autonomous vehicles and/or electric vehicles, the vehicles are more connected to a network or Internet, via various communications technology. Further, there are more connected vehicles to the Internet, which are capable of communications with a device over a wireless network as well as with other connected vehicles. That is, vehicles are becoming not only a transportation means but also devices, e.g., clients (in a client-server context), which may communicate with one or more servers over a network for retrieving various information including current news, weather data, and advertisements from the one or more servers on the network.

The present technology described herein provides a system or a method for delivering one or more advertisement contents to connected vehicles in an Internet of Things (IoT) environment, in a more effective manner, thereby increasing the effect of advertisements delivered to people. That is, the present technology provides in an aspect a new, novel system or method for delivery of one or more advertisement contents for the highest possible effect to the viewers, using the connected vehicles as part of an advertisement platform.

In one embodiment of the present technology, a system for delivering advertisements include a plurality of connected vehicles participating in an advertisement event. Each of the plurality of connected vehicles is configured to receive an instruction from one of the connected vehicles over a first network or a server over a second network to cluster near or at a target area for delivering an advertisement as a cluster advertisement among a group of the connected vehicles.

In an aspect of the present disclosure, each of the connected vehicles of the system is configured to: receive input on a driving destination from a driver of the connected vehicle, send the received input to the server over the network, and in response, receive one or more quests from the server. The one or more quests may be determined based in part on one or more driving routes to the driving destination and available advertisement events in the one or more driving routes.

In another aspect of the present disclosure, in preparation for a carry-out of a parade or a mission, the plurality of connected vehicles of the system is instructed to gather together at a predetermined location. The predetermined location may be a parking lot or a road with the least amount of traffic.

In an aspect of the present disclosure, the advertisement event in the system is a parade or a mission event, and the plurality of the connected vehicles participating in the advertisement event is determined based in part on vehicle profiles or user preferences.

In an aspect of the present disclosure, the advertisement event in the system is the parade and movements of the plurality of connected vehicles participating in the parade are continuously monitored by the one of the connected vehicles over the first network or the server over the second network.

In another aspect of the present disclosure, during the parade, driving speeds and routes of the connected vehicles participating in the parade or the mission in the system are controlled by the server to maintain a predefined formation of procession in the parade or the mission. As such, when the cluster of the connected vehicles participating in the parade is broken into multiple sub-groups by a traffic light, the driving speeds and routes of the connected vehicles are controlled such that the multiple sub-groups may be clustered again into a single cluster for the parade after the traffic light.

In another aspect of the present disclosure, each of the plurality of connected vehicles of the system is configured to synchronize reproduction of one or more advertisements with other connected vehicles as the cluster advertisement, while participating in the advertisement event.

In an aspect of the present disclosure, each of the plurality of connected vehicles of the system participating in the parade is configured to display vehicle identification information of a preceding vehicle to follow in the parade on an internal display of the connected vehicle.

In an aspect of the present disclosure, each of the plurality of connected vehicles of the system participating in the parade is further configured to display an indication of whether the connected vehicle is at a right position in the parade.

In an aspect of the present disclosure, each of the plurality of connected vehicles of the system participating in the parade is further configured to display vehicle identification information of the connected vehicle on an external display of the preceding vehicle that the connected vehicle is following in the parade.

In an aspect of the present disclosure, each of the plurality of connected vehicles of the system participating in the parade is configured to output an indication from one of the connected vehicles over the first network or the server over the second network as to whether the connected vehicle is at a right position in the parade.

In an aspect of the present disclosure, the connected vehicles of the system participating in the parade are configured to drive a predetermined route near or around the target area with a predetermined number of turns around the predetermined route, while reproducing a same advertisement in a coordinated manner as the group of connected vehicles, thereby increasing an effect of the advertisement on people. Further, the predetermined number of turns around the predetermined route may be determined in advance by the server on the network, based in part on location of an advertiser, a density of traffic, or a density of people on the predetermined route.

In an aspect of the present disclosure, each of the plurality of connected vehicles of the system is configured to receive in advance, prior to arrival at or near the target area, real-time information on whether a minimum number of connected vehicles for a carry-out of the advertisement event have already arrived at or near the target area.

In an aspect of the present disclosure, when it is determined that the minimum number of connected vehicles that are needed for the carry-out of the advertisement event is not reached within a predetermined period of time, the plurality of connected vehicles is configured to receive a cancellation notice of the advertisement event from the server over the network.

In another embodiment of the present disclosure, when it is determined that the minimum number of connected vehicles that are needed for the carry-out of the advertisement event is reached within a predetermined period of time, drivers of the connected vehicles participating in the advertisement event receive a reward for participating in the advertisement event.

In an aspect of the present disclosure, a driver of a connected vehicle of the system receives a penalty when the connected vehicle is determined to deviate from the carry-out of the advertisement event in which the driver of the connected vehicle has selected to participate.

Further, in an aspect of the present disclosure, when a first connected vehicle of the system participating in the advertisement event is stopped at a traffic light, the first connected vehicle is configured to reproduce, via an external speaker of the first connected vehicle, an audio content of the advertisement.

In an aspect of the present disclosure, when a second connected vehicle of the system participating in the advertisement event is stopped at the traffic light, the second connected vehicle is configured to wait until an end of reproduction of the audio content of the advertisement via the external speaker of the first connected vehicle, and the first and second connected vehicles are configured to reproduce a same advertisement in a synchronized manner as a group of connected vehicles while the first and second connected vehicles are stopped at the traffic light.

In another aspect of the present disclosure, when the plurality of connected vehicles of the system participating in the advertisement event is configured to reproduce the advertisement as a stereo advertisement.

In an aspect of the present disclosure, when the connected vehicles of the system participating in the advertisement event are stopped at a traffic light or stopped at a certain location or moving with a speed lower than a predetermined speed, the connected vehicles are configured to reproduce the same advertisement via external displays and/or speakers of the connected vehicles in a coordinated manner as a cluster advertisement.

In as aspect of the present disclosure, when the coordinated manner comprises a simultaneous reproduction of the same advertisement or a sequential reproduction of the same advertisement as a round advertisement among the plurality of connected vehicles.

In another aspect of the present disclosure, when it is determined that the connected vehicles are coming to a stop, the reproduction of the same advertisement on external speakers of the connected vehicles is controlled so that an audio of the same advertisement is increased in accordance with decreasing speeds of the connected vehicles coming to the stop for a purpose of simultaneously reproducing the same advertisement on the connected vehicles.

In an aspect of the present disclosure, the system is configured to award a reward to a driver of a connected vehicle for safe driving, the reward including a discount in an auto insurance premium or other benefits.

In another aspect of the present technology, a system of connected vehicles is disclosed. When the connected vehicles are parked near each other in a parking lot, the connected vehicles are configured to reproduce one or more advertisements when one of the connected vehicles receives a signal from a remote controller associated with the one of the connected vehicles.

In an aspect of the present disclosure, the one or more advertisements of the system are selected for reproduction based at least in part on a profile of a user of the one of the connected vehicles, vehicle profile information, or location information of the connected vehicles.

In an aspect of the present disclosure, the connected vehicles of the system are configured to form a cluster and reproduce an advertisement via external displays and/or speakers of the connected vehicles in a synchronized manner as the cluster, when the one of the connected vehicles receives the signal from the remote controller associated with the one of the connected vehicles.

In an aspect of the present disclosure, the connected vehicles of the system are further configured to reproduce the one or more advertisements after the one of the connected vehicles outputs a sound and/or a flash in response to the signal received from the remote controller associated with the one of the connected vehicles.

In another aspect of the present technology, a connected vehicle including an autonomous driving unit and an advertisement identification unit coupled to the autonomous driving unit is disclosed. The advertisement identification unit is configured to recognize and identify one or more visual contents of an advertisement reproduced on external displays of other connected vehicles.

In an aspect of the present disclosure, the advertisement identification unit of the connected vehicle is further configured to recognize the one or more visual contents of the advertisement reproduced on an external display, based in part on a number of pixels in the external display.

In an aspect of the present disclosure, the advertisement identification unit of the connected vehicle is further configured to recognize the one or more visual contents of the advertisement based in part on one or more image frames inserted in the one or more visual contents of the advertisement, and the one or more image frames are configured to inform the advertisement identification unit that the one or more visual contents of the advertisement are advertisements that are designed to be reproduced on the external displays of the connected vehicles.

In an aspect of the present technology, a connected vehicle including an in-vehicle audio system and an advertisement system is also disclosed. The in-vehicle audio system of the connected vehicle is configured to stream music inside the connected vehicle, and the advertisement system of the connected vehicle is coupled to the in-vehicle audio system and configured to detect the streaming of music and to reproduce one or more advertisements to one or more occupants inside the connected vehicle.

In an aspect of the present disclosure, the advertisement system of the connected vehicle is further configured to: create one or more advertisements based in part on one or more segments of the music that is played inside the connected vehicle and reproduce the one or more advertisements at an end of the streaming of the music.

In another aspect of the present disclosure, the one or more advertisements are created based in part on a melody of the music and profile information of the one or more occupants in the connected vehicle.

In an aspect of the present disclosure, the one or more advertisements are created based in part on a melody of the music which is selected based on a number of words in a commercial music.

In an aspect of the present disclosure, after the reproduction of the melody of the music, the one or more advertisements are reproduced within a predetermined period of time.

In an aspect of the present disclosure, the advertisement system of the connected vehicle is further configured to control the reproduction of the one or more advertisements based in part on whether the music is played via a radio or a mobile device via Bluetooth.

In another aspect of the present technology, a connected vehicle which is an electric vehicle including an advertisement system is also disclosed. The advertisement system is configured to reproduce one or more audio advertisements in a continuous manner via external speakers of the connected vehicle, in place of imaginary engine sounds, for safety of people outside.

In an aspect of the present disclosure, the advertisement system is further configured to detect presence of the people near the connected vehicle via one or more sensors.

In an aspect of the present disclosure, the connected vehicle is configured to reproduce a same advertisement substantially simultaneously with other connected vehicles disposed near the connected vehicle or to reproduce an advertisement in coordination with other connected vehicles.

In an aspect of the present disclosure, the electric vehicle further includes an auxiliary battery for external speakers, and the electric vehicle is configured to reproduce one or more advertisements when the presence of people near the electric vehicle is detected via one or more proximity sensors of the electric vehicles.

In an aspect of the present disclosure, the external speakers of the electric vehicle comprise one or more vibration speakers based in part on one or more vibration media.

In another aspect of the present technology, a connected vehicle including an advertisement system is disclosed. The advertisement system is configured to reproduce one or more advertisements on one or more external displays, and the one or more advertisements comprise non-commercial information.

In an aspect of the present disclosure, the advertisement system is further configured to reproduce the non-commercial information between reproductions of commercial advertisements on the one or more external displays, and the non-commercial information comprises news, weather, traffic or other public information or announcements. Further, the non-commercial information may include real-time scores for sports games.

In an aspect of the present disclosure, the non-commercial information includes location-based information relating to transportation schedules including bus or train arrival times, when the connected vehicle is disposed at or near a bus or train station. Further, in another aspect of the present disclosure, the non-commercial information may include flight schedule when the connected vehicle is disposed at or near an airport or an airport shuttle stop in a city.

In another aspect of the present technology, it is disclosed that an advertisement platform for reproducing one or more advertisement includes a plurality of connected vehicles forming a cluster of connected vehicles, and the plurality of connected vehicles is configured to reproduce the one or more advertisements as a cluster advertisement or an interactive advertisement.

In an aspect of the present disclosure, the reproduction of the cluster advertisement in the advertisement platform includes simultaneous reproduction of a same advertisement in synchronization with other connected vehicles of the cluster.

In an aspect of the present disclosure, the reproduction of the interactive advertisement in the advertisement platform includes reproduction of a same advertisement among the cluster, in which the connected vehicles are each assigned one or more different roles in the reproduction of the same advertisement.

In an aspect of the present disclosure, the reproduction of the cluster advertisement or the interactive advertisement in the advertisement platform is controlled either by a server over a network or by a master connected vehicle among the plurality of connected vehicles of the cluster.

In an aspect of the present disclosure, the reproduction of the interactive advertisement in the advertisement platform is configured to respond to input from a person who views the interactive advertisement.

In an aspect of the present disclosure, the one or more advertisements in the advertisement platform are provided by a server over a network, by one or more in-vehicle storage systems, or by one or more removable storage systems.

In another aspect of the present technology, the plurality of connected vehicles in the advertisement platform is configured to provide public guidance information via external displays of the connected vehicles or external speakers of the connected vehicles while driving on a road, when an emergency vehicle approaches the plurality of connected vehicles on the road.

As such, in various aspects of the present disclosure, one or more advertisements may be delivered and/or reproduced on a plurality of connected vehicles so that the effect of advertisement may be significantly increased. Also, using one or more connected vehicles as an advertisement platform, as well as by reproducing the one or more advertisements, based in part on location information, local time information, or attributes of people around the connected vehicles, the effect of advertisement may be significantly increased.

The following brief description of the drawings and the detailed description of the exemplary embodiments of the present technology are provided for better understanding of the present technology.

BRIEF DESCRIPTION OF THE DRAWINGS

A more detailed understanding may be obtained from the following description in conjunction with the following accompanying drawings.

FIG. 28 conceptually illustrates an example embodiment of the present technology in accordance with an aspect of the present disclosure.

DETAILED DESCRIPTION

Figure 1:
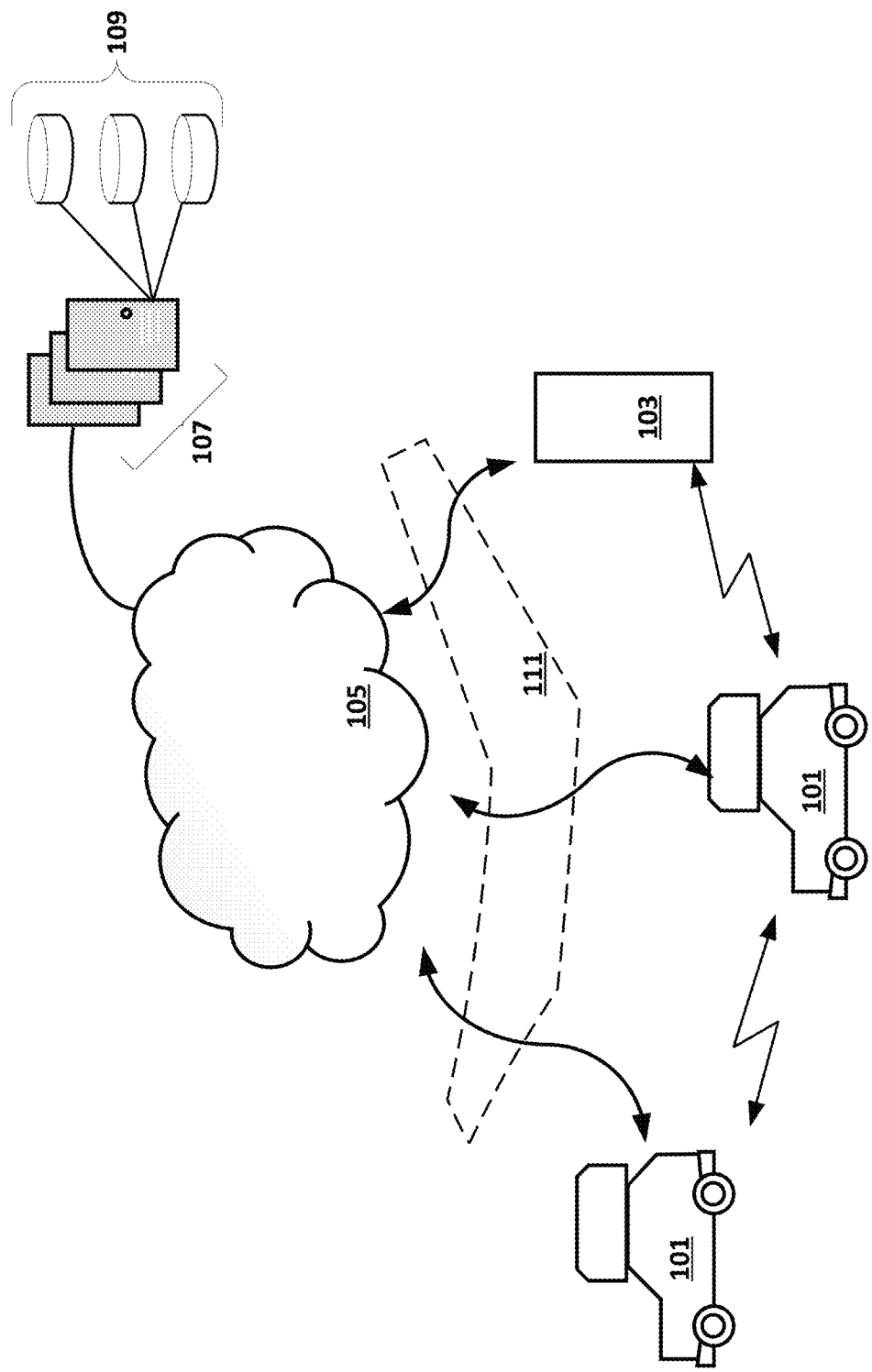
FIG. 1 is an overall network diagram conceptually illustrating an example embodiment of the present technology in accordance with an aspect of the present disclosure.

The detailed description of illustrative examples will now be set forth below in connection with the various drawings. The description below is intended to be exemplary and in no way limit the scope of the claimed invention. It also provides a detailed example of possible implementation(s) and is not intended to represent the only configuration(s) in which the concepts or present technology described herein may be practiced. Further, the detailed description includes specific details for providing a thorough understanding of various concepts, and it is noted that these concepts may be practiced without these specific details. In some instances, well known structures and components are shown in block diagram form to avoid obscuring such concepts or clarity of presentation. Also, it should be noted that like reference numerals are used in the drawings to denote like elements and features.

While the methodologies are described herein sometimes as a series of steps or acts, for simplicity, the claimed subject matter is to be understood to not be limited by the order of these steps or acts, as some steps or acts may occur in different orders and/or concurrently with other acts from that shown and described herein. Further, not all illustrated steps or acts may be required to implement various methodologies according to the present technology disclosed herein. Also, it should be appreciated that the apparatus and methods described herein may be utilized separately or in combination with other aspects of the present disclosure, or in combination with conventional technology, without departing from the teachings of the present disclosure or technology.

In the present disclosure disclosed herein, various terms or phrases as used herein are defined as follows. The term "advertisement platform" as used herein mean a system including one or more connected vehicles configured to reproduce one or more advertisements. The phrase "advertisement content(s)" or the term "advertisement" as used herein means any content, either audio advertisement or visual advertisement for a product, a service, including but not limited thereto, videos, audios, live TV broadcasts, news, weather, mission, surveys, votes, interactive games, sports updates, etc. that may be delivered via one or more audio, image, or video files in various formats. The advertisement may include an audio content and/or a visual content. The term "audio advertisement content," "audio advertisement," or "audio content" as used herein means an audio component of an advertisement. The term "visual advertisement content" or "visual content" as used herein means a visual or image component of an advertisement. The term "audio advertisement" as used herein may also mean an audio without image or visual content so that only audio systems such as speakers are used for reproducing the audio advertisement. Further, the term "visual advertisement" or "image advertisement" as used herein may mean a visual advertisement without audio content so that only displays are used for reproducing the visual advertisement.

The term "connected vehicle(s)" as used herein means one or more vehicles or transportation means including but not limited thereto electric vehicles, either stationary or moving, which are capable of being connected to a network, e.g., an Internet protocol (IP) network, and can communicate with one or more computing devices over the network. The connected vehicles may include conventional vehicles equipped with one or more advertisement systems in aspect of the present disclosure. The connected vehicles may be configured to include some interior spaces for one or more occupants, e.g., a driver or passengers for transportation purposes and may be configured to include autonomous vehicles as well as non-autonomous vehicles. An "autonomous vehicle" is also known as a self-driving vehicle that is capable of sensing its environment and moving with little or no human input and may be configured to include one or more autonomous driving units.

The term "coupled to" or its variations as used herein means being connected to or in communication with, e.g., a certain device over a network via various network protocols.

The term "a display means" or its variations are used herein to mean a display device including certain electronic display means, including but not limited to, a liquid crystal display (LCD) display, a light emitting diode (LED) display, an organic LED (OLED) display, or other types of display which is capable of outputting one or more visual advertisement contents. Further, the display means may include a flexible display which is flexible in nature, as opposed to more traditional flat screen displays used in most electronic devices. The flexible display may incorporate different types of electronic paper technology such as, but not limited thereto, electrophoretic or electrowetting technologies.

The term "audio means" as used herein means any type of audio means including, but not limited to, one or more speakers which are capable of outputting audio or sounds. The audio means may include traditional speakers and/or vibration speakers.

The term "location information" as used herein means certain information or data including, but not limited to, location data which are determined based on global positioning system (GPS), cellular signals, Wi-Fi signals, beacon signals, etc. The term "proximity information" is also used herein to mean certain position information of an object relative to another object, and may include distance information among two or more objects, based on technologies such as, including but not limited thereto, ultra-wideband (UWB), lidar, laser, camera, ultrasonic waves, etc.

The term "preceding" as used herein means being ahead of or in front of at a certain distance between two or more connected vehicles which may be moving in a direction or stationary. The term "following" as used herein means being disposed behind a connected vehicle while moving in a direction or stationary.

The term "billboard" as used herein means a general structure displaying one or more advertisements, such as, including but not limited thereto, a stationery structure, e.g., a conventional billboard, a wall of a building, etc., or a display disposed on a side of a vehicle, which may be stationary or moving. Also, the billboard may include one or more computing devices and/or communication devices.

The term "a discount rental fee" as used herein means a code or coupon for a discount in a rental fee of a connected vehicle. The term "a maximum reward route" as used herein means a route in which one can collect a maximum amount of rewards possible using or riding in a connected vehicle. The term "an expected advertisement effect" as used herein means an effect of advertisement including both quantifiable and non-quantifiable effects. An example of an expected advertisement effect may be a numerical value assigned to a number of viewers of an advertisement outside a connected vehicle.

Further, the terms "audio," "audio content" or "audio advertisement" may be used interchangeably; the terms "image," "image content" or "image advertisement" may be used interchangeably and the terms "video," "video content" or "video advertisement" may be used interchangeably to mean the same subject matter. In the present disclosure, each advertisement may include either an audio or an image advertisement content.

The term "mission advertisement" or "mission" as used herein means one or more advertisements that are carried out or reproduced by at least one vehicle, e.g., connected vehicle when a driver of the at least one vehicle accepts a mission or mission advertisement that is made available by a system or server over a network. A mission or mission advertisement may be determined based in part on factors including, but not limited thereto, certain location information, time, duration, etc. related to the one or more advertisements requested by an advertiser.

The term "cluster advertisement" as used herein means one or more advertisements reproduced simultaneously or in a coordinated manner by at least three vehicles as a cluster, e.g., group of connected vehicles. That is, a cluster advertisement may include a non-interactive advertisement or an interactive advertisement. The non-interactive advertisement includes a same advertisement simultaneously reproduced by a cluster of connected vehicles using external displays and/or external speakers, thereby amplifying and increasing the effect of an advertisement that is reproduced. On the other hand, the interactive advertisement may include a same advertisement reproduced by the cluster of connected vehicles in a coordinated manner, but each connected vehicle may take on a role different from others in the same advertisement. The interactive advertisement may include the same advertisement reproduced as a single body with different roles assigned to each connected vehicle in the cluster. The interactive advertisement may also include a stereo advertisement disclosed herein. Further, the interactive advertisement may interact with bystanders or pedestrians and receive input from them.

The term "individual advertisement" as used herein means one or more advertisements reproduced by a connected vehicle when not participating in either a mission advertisement or a cluster advertisement. In the individual advertisement, either an image or a video advertisement may be reproduced, based on a predetermined order, including but not limited thereto, advertisement priority, a reproduction counter for a currently running advertisement, arrival time to a specific location, specific time of the day, status on preceding and following vehicles, etc.

The term "parking advertisement" as used herein means one or more advertisements reproduced by at least one connected vehicle in a parking lot. In a parking lot, such as a department store parking lot or other public or private parking lot, a group of connected vehicles may be parked. In such a case, a cluster for advertisement may be formed and the parking advertisement may be reproduced right after when transmission of a wireless signal from a remote controller to a parked vehicle near the cluster is detected. The term "public goods advertisement" or "public goods announcement" as used herein means one or more public goods advertisements or announcements that are reproduced for non-commercial purposes by at least one connected vehicle. The public goods advertisement may include a video or an image displaying weather, dust, traffic, news, train or bus schedules, emergency announcements, etc. based on location of the connected vehicle.

The term "advertisement event" as used herein means an event designed for carry-out of one or more advertisements by one ore more connected vehicles for an advertiser at a particular purpose. The one or more advertisements may include a mission advertisement, a cluster advertisement, an individual advertisement, a parking advertisement, or a public goods advertisement. In the present disclosure, the advertisement event may also mean a mission advertisement, a cluster advertisement, an individual advertisement, a parking advertisement, or a public goods advertisement.

FIG. 1 is a diagram conceptually illustrating an example embodiment of the present technology in accordance with an aspect of the present disclosure. FIG. 1 illustrates a high-level system including various components such as one or more clients 101 or 103, a network 105, one or more servers 107, and one or more databases 109. The one or more clients 101 may include one or more connected vehicles 101 or advertisement structures 103, which are coupled to the network 105 via a first wireless network 111. The first wireless network 111 may be implemented using various telecommunications technologies, such as cellular technology and/or data communications technology, including but not limited thereto, the 3$^{rd}$ Generation (3G), the 4$^{th}$ Generation (4G), the 5$^{th}$ Generation (5G), or any other advanced future generation telecommunications technologies, which are based on Internet Protocol (IP) or its variants. The network 105 may be composed of one or more public or private networks connecting the one or more clients 101 and 103 to one or more servers 107 over a network.

In an aspect of the present disclosure, the one or more servers 107 may include ADC servers which may be coupled to one or more databases 109. The one or more databases 109 may contain various types of data, including but not limited thereto, a database of advertisements (or advertisement contents), a database of user profiles, a database of advertiser profiles, a database of news and other information (e.g., news, videos, audios, broadcasts, weather news, missions, surveys or votes, interactive games, etc.) and a database of the clients 101 and 103. Further, the one or more servers 107 may be implemented to perform various functions, including but not limited thereto, management and control of advertisements. Also, the one or more servers 107 (e.g., ADC servers) may be configured to manage and control delivery of advertisements or advertisement contents to the one or more clients 101 or 103 over the first wireless network 111. Also, the one or more servers 107 may include account management functions for the advertisement contents, advertisers, advertisement events, and users. The account management functions may also include information on subscriptions, reward payments, etc. Further, in an aspect of the present disclosure, the one or more servers 107 may be implemented in a single computer or over multiple computers as a distributed system. The one or more servers 107 may also be implemented in cloud platforms.

Referring back to FIG. 1, in an aspect of the present disclosure, the one or more connected vehicles 101 may be configured to receive one or more advertisements or advertisement contents from the servers 107, based in part on location information of the one or more connected vehicles 101, via the network 105 and the wireless network 111, and output the one or more advertisements to occupants inside the one or more connected vehicles 101 or people outside the one or more connected vehicles 101. As such, as mentioned above, the one or more connected vehicles 101 may operate as clients and the servers 107 (e.g., ADC server(s)) as a server in a client-server environment. Also, in another aspect of the present disclosure, the one or more advertisements may be determined based in part on a local time and other factors such as attributes or characteristics of people (e.g., age, sex, preferences, etc.) around or outside the connected vehicles 101, in addition to the location information of the connected vehicles 101. That is, the connected vehicles 101 may be configured to collect, via cameras, information on the attributes or characteristics of people outside the connected vehicles 101 and sent the collected information to the servers 107 for further processing. The one or more servers 107 may be configured to process the collection information for extracting characteristics or traits of the people outside the connected vehicles 101. Many different image processing as well as data analytic tools may be applied to identify and/or determine the attributes or characteristics such as age, sex, preferences, moods, trends, etc. some of which may be used in determining one or more advertisements that is going to be delivered and reproduced on the one or more connected vehicles 101.

Further, the one or more connected vehicles 101 are each configured to send to the servers 107 certain identification information of the connected vehicles, such as vehicle identification number, user, driver or owner information. Further, the one or more connected vehicles 101 may be configured to collect and send real-time to the servers 107 location information of the connected vehicles, e.g., global positioning system (GPS), ultra-wideband (UWB) data, etc., as well as current vehicle operating status and diagnostic data such as speed, temperature, operating conditions, etc.

Furthermore, the one or more connected vehicles 101 are each configured to receive commands and/or data from the servers 107, such as, including but not limited thereto, advertisements or advertisement contents, news, or other types of data that are to be reproduced inside the connected vehicles 101 or outside the connected vehicles 101 (e.g., via external speakers and/or displays). Alternatively, the one or more connected vehicles 101 are each configured to independently take appropriate actions in response to certain commands from the servers 107 over the network 105.

Further, as mentioned above, the client 103 may include a building or structure, such as a billboard, equipped with displays and speakers for reproducing one or more advertisement contents. In another aspect of the present disclosure, the client 101 or 103 may be configured to send certain data to server(s) 107 over the network 105, such as current location information, identification information, environmental conditions including surrounding conditions, a micro dust amount in air, temperature, noise, etc. The client 101 or 103 is further configured to receive from the servers 107 certain commands and/or information, in response, and process the received commands and/or information for one or more actions, e.g., to display or reproduce information on the external displays of the clients 101 or 103. By way of example, the servers 107 may be configured to receive sensory data about the micro dust amount in air from the client 101 or 103 disposed at a certain location, and send certain commands and/or data in response, e.g., warning or alert messages, to the client 101 or 103 so that the warning or alert messages may be reproduced on the external displays and/or external speaker of the client 101 or 103 for the public or people nearby the client 101 or 103

Figure 2A:
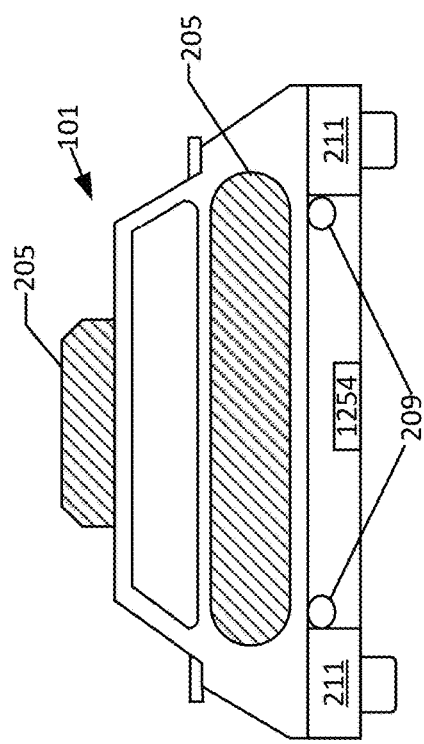
FIGS. 2A-2C are diagrams conceptually illustrating example embodiments of the present technology in accordance with an aspect of the present disclosure.
Figure 2B:
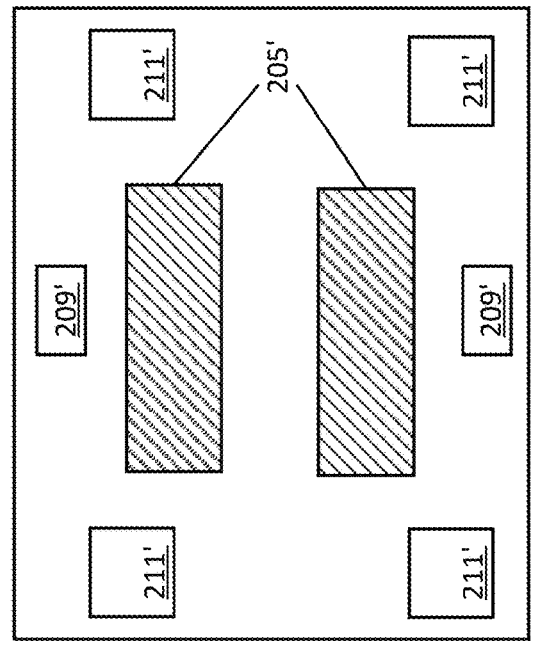
Figure 2C:
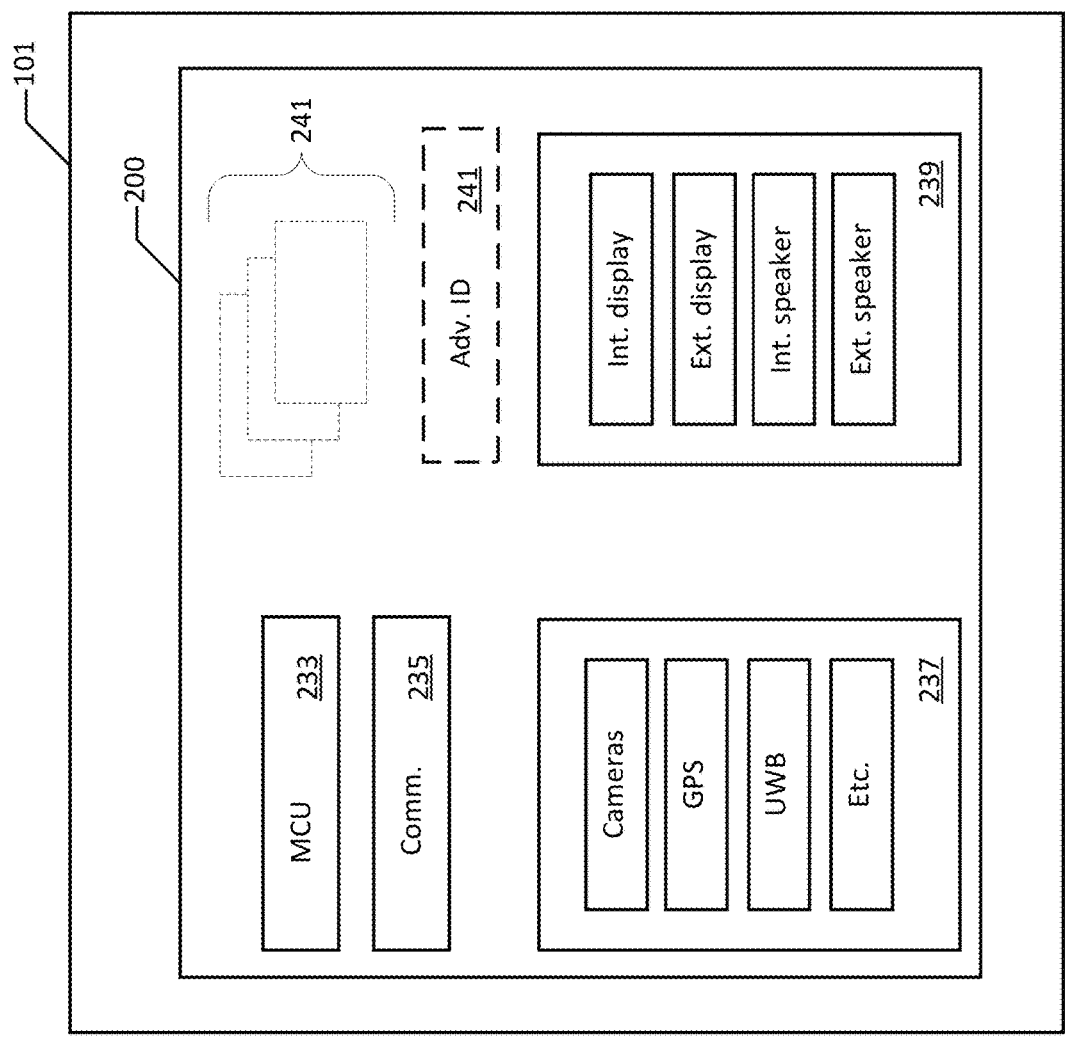

FIGS. 2A-2C illustrate example embodiments of the present technology in an aspect of the present disclosure. By way of example, as shown in FIGS. 2A and 2B, each connected vehicle 101 may be equipped with various devices inside and outside in accordance with aspects of the present technology. First, as shown in FIG. 2A, the connected vehicle 101 may be equipped with one or more external displays 205, one or more external speakers 211, and one or more external cameras 209, for reproducing one or more advertisements or advertisement contents for people outside the connected vehicle 101. Further, the connected vehicle 101 may include inside one or more internal displays 205', one or more internal speakers 211', and one or more internal cameras 209', for reproducing one or more advertisement contents for occupants including drivers and/or passengers in the connected vehicle 101. In an aspect of the present disclosure, the one or more external speakers 211 or the one or more internal speakers 211' may include one or more vibration speakers which are configured to turn vehicle surfaces into speakers.

FIG. 2C illustrate a block diagram conceptually illustrating components of a connected vehicle 101 which includes an advertisement system 200 in an aspect of the present disclosure. By way of example, the advertisement system 200 of FIG. 2C may be included in a vehicle, such as a connected vehicle as shown in FIGS. 1-28. The advertisement system 200 of FIG. 2C may include, but not limited thereto, various components such as a main control unit (MCU) 233, a communication unit 235, a sensor unit 237, an output unit 239, optionally an advertisement identification (ID) unit 241, and optionally one or more databases 241.

In the example described herein, the main control unit 233 may be configured for management and control of devices or units of the advertisement system 200 for the reproduction of one or more advertisements via the connected vehicle to increase the effect of advertisement. The main control unit 233 may be coupled to the communication unit 235 which may be configured to communicate with the one or more servers 107 over the network 105 or with other connected vehicles 101 or structures 103, as shown in FIG. 1. Also, as for the communications with the one or more servers 107 over the network 105, various wireless telecommunications technologies such as the third generation (3G), the fourth generation (4G) or the fifth generation (5G) telecommunications technology may be used as the enabling technology for voice as well as high-speed data services with Internet connectivity. Further, in an aspect of the present disclosure, the communication unit 235 of the advertisement system 200 may be configured to include various transceivers that are needed for communicating with other connected vehicles 101 or structures 103. For example, the wireless technologies such as Wi-Fi or other vehicular communication technologies, e.g., vehicle to vehicle (V2V), vehicular ad hoc networks (VANETs), or the like may be used for communications between the connected vehicles 101 or between the connected vehicles 101 and the structures 103. In one implementation, V2V may be used between the connected vehicles 101, which is an automobile technology designed to allow automobiles to communicate with each other and is designed to use a region of 5.9 GHz band, and Wi-Fi may be used for communications between the connected vehicles 101 and the structures 103.

Furthermore, the sensor unit 237 of the advertisement system 200 may include a GPS, UWB transceivers, cameras, vehicular sensors, environmental sensors, etc. to collect various information and data relating to the connected vehicle 101 as well as the surrounding environments. By way of example, the GPS of the sensor unit 237 may be used to collect rough location information of the connected vehicle 101, e.g., GPS coordinates, and the UWB transceivers may be used to obtain relative location or more granular location information of the connected vehicle 101 with respect to other connected vehicles nearby. In another implementation, the sensor unit 237 may also include one or more location identification systems based on cellular signals, Wi-Fi signals, or beacons. Also, in another implementation, the sensor unit 237 of the advertisement system 200 may include other location identification systems based on lidar, laser, ultrasonic waves, or the like. Further, the sensor unit 237 of the advertisement system 200 may include one or more cameras configured to capture images in real-time of inside as well as outside of the connected vehicle, the images of which will be further processed various purposes including identification of one or more advertisements, identification of people, identification and extraction of characteristics or attributes of people (e.g., age, sex, preferences, trends, etc.), for example.

In an aspect of the present disclosure, in the example, one or more external cameras of the connected vehicle may be used to recognize or detect, in cooperation with other software and/or hardware components, one or more advertisement contents displayed on other connected vehicles or stationery or moving structures, such as billboards, trucks, buses, building walls, or etc. The one or more external cameras of the connected vehicle may be used to determine certain traits of people, such as age, sex, preferences, etc. by processing images of the people outside the connected vehicle, for reproducing one or more suitable advertisement contents on the external displays and/or speakers of the connected vehicle based on the determined trains of people. Further, in an aspect of the present disclosure, one or more internal cameras of the connected vehicle may be used to recognize or detect, in cooperation with other software and/or hardware components, certain data relating to one or more occupants in the connected vehicle, including a driver as well as passengers. Further, the one or more internal cameras of the connected vehicle may be used to determine certain traits of people, such as age, sex, preferences, etc. by processing images of the people inside the connected vehicle, for the purpose of reproducing one or more suitable advertisement contents on the internal displays and/or speakers of the connected vehicle based on the determined traits or characteristics of people.

Further, the advertisement system 200 of the connected vehicle 101 may optionally include an advertisement identification unit 241 configured to recognize and identify one or more visual contents of an advertisement reproduced on external displays of other connected vehicles or billboard displays nearby.

Additionally, the advertisement system 200 of the connected vehicle 101 may optionally include one or more databases comprising a database of advertisement contents, a database of advertisers, and/or profiles of drivers, users, or owner of the connected vehicle 101, etc. In an aspect of the present disclosure, the one or more databases 241 of the advertisement system 200 may be used to reproduce advertisements or advertisement contents including visual advertisement contents and/or audio advertisement contents on the connected vehicle 101 or other connected vehicles 101, without retrieving the advertisements from the one or more servers 107 over the first wireless network 111 as shown in FIG. 1.

Further, the one or more databases 241 may include advertisement contents, news, weather, videos, audios, broadcasts, user profiles, driver profiles, vehicle owner profiles, vehicle status profiles, or many others. As noted above, the "advertisement" or "advertisement content" includes both audio and/or visual components. The user profiles may include various information on a user of the connected vehicle, including but not limited thereto, personal data including name, age, sex, shopping preferences, interests, past use history, preferred route information, etc. The driver profiles may include various information on a driver of the connected vehicle, including but not limited thereto, personal data including name, age, sex, shopping preferences, past use history, driving habits, etc. In one implementation, the user profile may be the same as the driver profile, but not necessarily so in other implementations. The vehicle owner profiles may include various information on a vehicle owner, including but not limited thereto, personal data including name, age, sex, shopping preferences, interests, driving habits, auto insurance, etc.

Further, in another aspect of the present disclosure, the one or more databases 241 of the advertisement system 200 disposed in the connected vehicle 101 may be automatically updated on a regular basis over the first wireless network 111 from the one or more servers 107 over the network 105. Further, the one or more databases 241 of the advertisement system 200 may automatically synchronize on a periodic basis in part or in whole with one or more network databases via the one or more servers 107 over the network.

Figure 3:
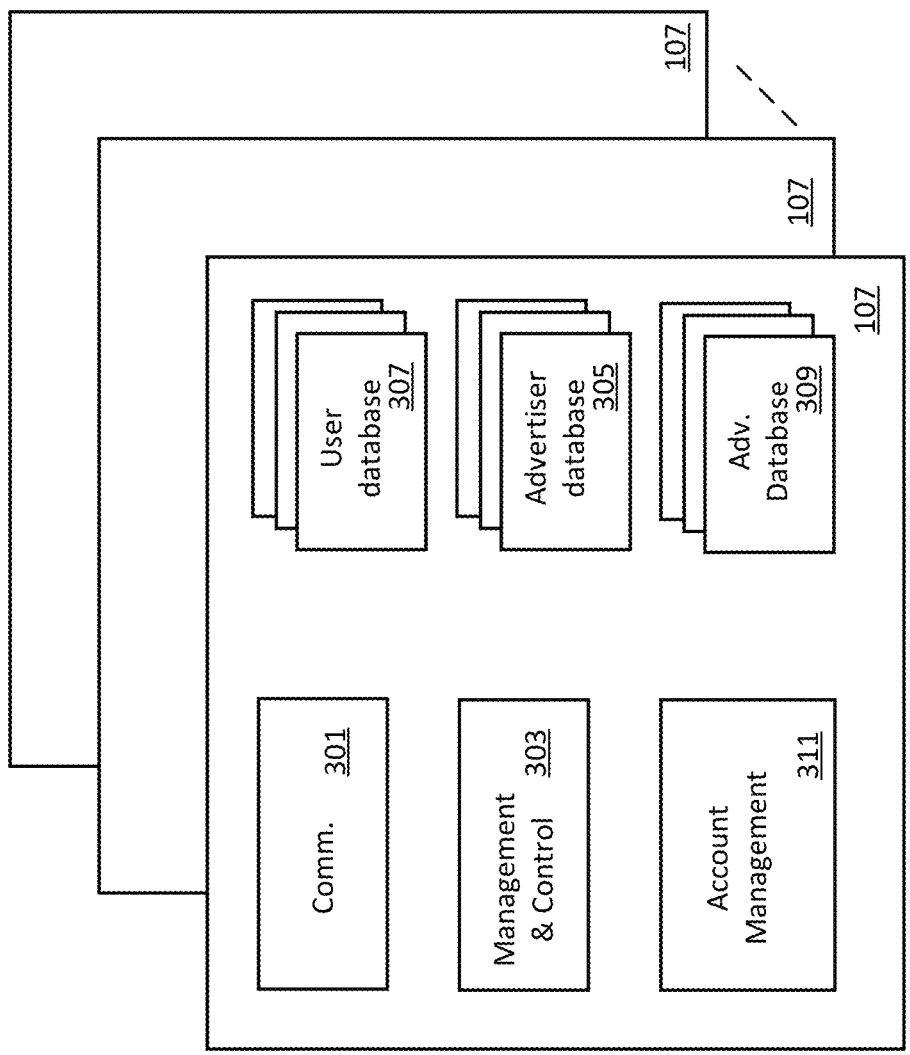
FIG. 3 is a diagram conceptually illustrating an example embodiment of the present technology in accordance with an aspect of the present disclosure.

FIG. 3 illustrates a diagram conceptually illustrating various components of one or more servers 107 over the network 105 for managing and delivering advertisement contents to connected clients 101 or 103. By way of example, in an aspect of the present disclosure, a server 107 (e.g., ADC server) may be configured to include a communications unit 301, a management and control 303, and an account management 311. The server 107 may further include, or alternatively coupled to, one or more databases, including but not limited thereto, a database of advertisement contents 305, a database of user profiles 307, a database of advertiser profiles 309. Further, in another aspect of the present disclosure, various other functionalities or databases may be implemented in multiple servers in a distributed manner.

In an aspect of the present disclosure, the communication unit 301 of the server 107 may be configured to include a receiving unit (not shown) configured to receive certain data (e.g., vehicle location information, vehicle status and diagnostic data, advertisement status, etc.) from one or more clients 101 or 103 and a transmitting unit (not shown) configured to send commands and/or data including advertisements to the clients 101 or 103. Also, the management and control 33 of the server 107 may be configured to manage and control the connected vehicles 101 as well as delivery of the advertisements to the connected vehicles 101. Further, the account management 311 of the server 107 may be configured to store and manage accounting data (e.g., subscription status, rewards status, payment status, etc.) relating to the users, drivers, vehicle owners, as well as advertisers. The account management 311 of the server 107 may be configured to administer payment of one or more rewards to the users, drivers, or vehicle owners when certain actions are taken, which the advertisers specify relating to the advertisements that are reproduced by the connected vehicles.

Furthermore, in an aspect of the present disclosure, the database of advertisement contents 305 may be configured to include one or more advertisements or advertisement contents that are to be delivered to the connected vehicles 101 over the network 105 and 111. As noted above, each advertisement may include audio and/or visual components, e.g., audio advertisement content and/or visual advertisement content. Also, the one or more advertisements may be selected and delivered to the connected vehicles over the network, based on certain information such as, including but not limited thereto, location information of the connected vehicles, local time information, advertisement event information, advertiser requests, or attributes of people (e.g., age, sex, preferences, etc.).

In another aspect of the present disclosure, the database of user profiles 307 may be configured to include one or more profiles of users (including drivers) of a connected vehicle, e.g., user information, including but not limited thereto, name, age, sex, personal preferences, interests, preferred routes, shopping habits, an amount of rewards, etc.

Further, in an aspect of the present disclosure, the database of advertisers 305 may be configured to include one or more profiles of advertisers, e.g., advertiser information, including but not limited thereto, advertiser name, location, type of business, advertisement contents, reward payment criteria, etc. The advertiser may include a corporate entity or an individual person who pays for an advertisement event.

Furthermore, the one or more servers 107 may include (or be coupled to) databases of other types of information such as current news, sports news, weather information, podcasts, live broadcasts, videos, audios, etc. that may be of interest to the public.

Having discussed some aspects of the systems of the present technology at a high level, more detailed aspects of the present technology are provided in the following using flowcharts and various embodiments.

Figure 4:
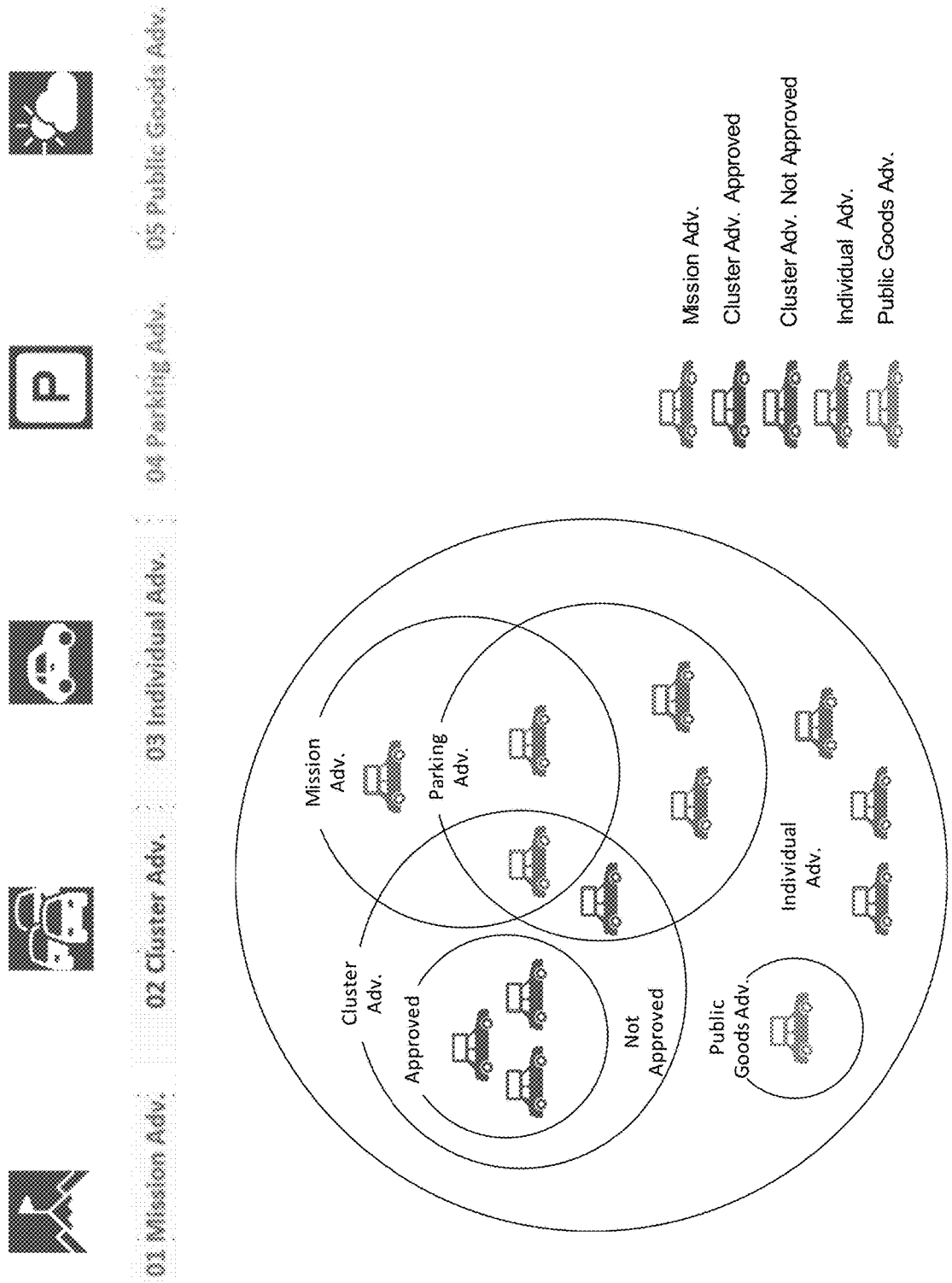
FIG. 4 conceptually illustrates an example embodiment of the present technology in accordance with an aspect of the present disclosure.

FIG. 4 illustrates different types of advertisement that may be reproduced on connected vehicles in accordance with an aspect of the present technology. By way of example, one or more advertisements disclosed herein may be classified into different types: mission advertisements, cluster advertisements, individual advertisements, parking advertisements, and public goods advertisements. One may include others.

The connected vehicles such as 101 of FIG. 1 may be configured to reproduce one or more of different types of advertisements based in part on location information of the connected vehicles and/or instructions received from a server such as the server 107.

In the present disclosure, the mission or mission advertisement may include one or more advertisements that are carried out or reproduced by at least one vehicle, e.g., connected vehicle 101, when a driver of the at least one vehicle accepts a mission or mission advertisement that is made available by a system or server (e.g., the ADC server such as the server 107) over a network. The mission or mission advertisement may be determined based in part on factors, including but not limited thereto, certain location information, time, duration, etc. related to the one or more advertisements requested by an advertiser. Further, the mission advertisement may further include an advertisement service provided for a special event including but not limited thereto, a birthday, Christmas, New Year's Day, Thanksgiving Day, Veterans Day, etc.

As mentioned above, a cluster advertisement may include one or more advertisements reproduced simultaneously or in a coordinated manner by at least three vehicles as a cluster, e.g., a group of connected vehicles. Further, the cluster advertisement may include a non-interactive advertisement or an interactive advertisement. For the cluster advertisement, a cluster may be formed by the ADC server based on two sets of vehicle information that each connected vehicle collects and/or sends to the ADC server: a first set (e.g., GPS information) for rough location information and a second set (e.g., UWB data) for precise location and position information. Based on these two sets of data, the ADC server may determine the precise location and relative position information of the connected vehicle. As such, the cluster may be determined by the ADC server in consideration of: the vehicle location, status of an advertisement in reproduction in the vehicle, a vehicle profile, an advertiser profile, advertiser location, advertisement event details, or the like.

In an aspect of the present disclosure, the vehicle location includes current location information of a connected vehicle and/or destination location information. The advertiser location includes location information of one or more stores of an advertiser. The event location may include location information where an advertisement is to take place. The event location may include a spot near the one or more stores of the advertiser or a specific driving route of interest. The status of an advertisement in reproduction in the vehicle may include information on a type of advertisement, identification of the advertisement, and how much time is remaining for playing the advertisement, or the like. The vehicle profile may include information including vehicle type, model, make, color, size, etc. The advertiser profile may include information including advertiser preferences such as types of advertisements, durations, target audience, routes, rewards, or the like.

Further, in the example, based on the received information from the connected vehicle, the ADC server may be configured to determine whether the connected vehicle is to participate in a specific cluster advertisement. As such, after the determination, the ADC server may notify the connected vehicle of a status of the connected vehicle as to participation in a cluster advertisement, e.g., cluster advertisement approved (in) or cluster advertisement not approved (out). Further, the ADC server may be configured to determine whether the connected vehicle is to participate in an advertisement event based in part on user preferences. In the present disclosure, the term "user preference(s)" as used herein may mean one or more preference(s) indicated by a driver or user of a connected vehicle, as part of a profile stored in a database over a network. That is, a user of the connected vehicle may indicate his or her desire to participate in one or more advertisement events in the user's profile. As mentioned above, user profiles of registered users of connected vehicles may be stored in a database which is coupled to the ADC server, and the ADC server may access the database of the user profiles and consult the profile of the user (or driver) of the connected vehicle to determine whether the connected vehicle is to participate in the advertisement event.

Also, an individual advertisement may include one or more advertisements reproduced by a connected vehicle when not participating in either a mission advertisement or a cluster advertisement. In the individual advertisement, either an image or a video advertisement may be reproduced, based on a predetermined order, including but not limited thereto, advertisement priority, a reproduction counter for a currently running advertisement, arrival time to a specific location, specific time of the day, status on preceding and following vehicles, etc.

Further, a parking advertisement may include one or more advertisements reproduced by at least one connected vehicle in a parking lot. In a parking lot, such as a department store parking lot or other public or private parking lot, a group of connected vehicles may be parked. In such a case, a cluster for advertisement may be formed and the parking advertisement may be reproduced right after when transmission of a wireless signal from a remote controller to a parked vehicle near the cluster is detected. Furthermore, a public goods advertisement or public goods announcement includes one or more public goods advertisements or announcements that are reproduced for non-commercial purposes by at least one connected vehicle. The public goods advertisement may include a video or an image displaying weather, dust, traffic, news, train or bus schedules, emergency announcements, etc. based on location of the connected vehicle.

Figure 5A:
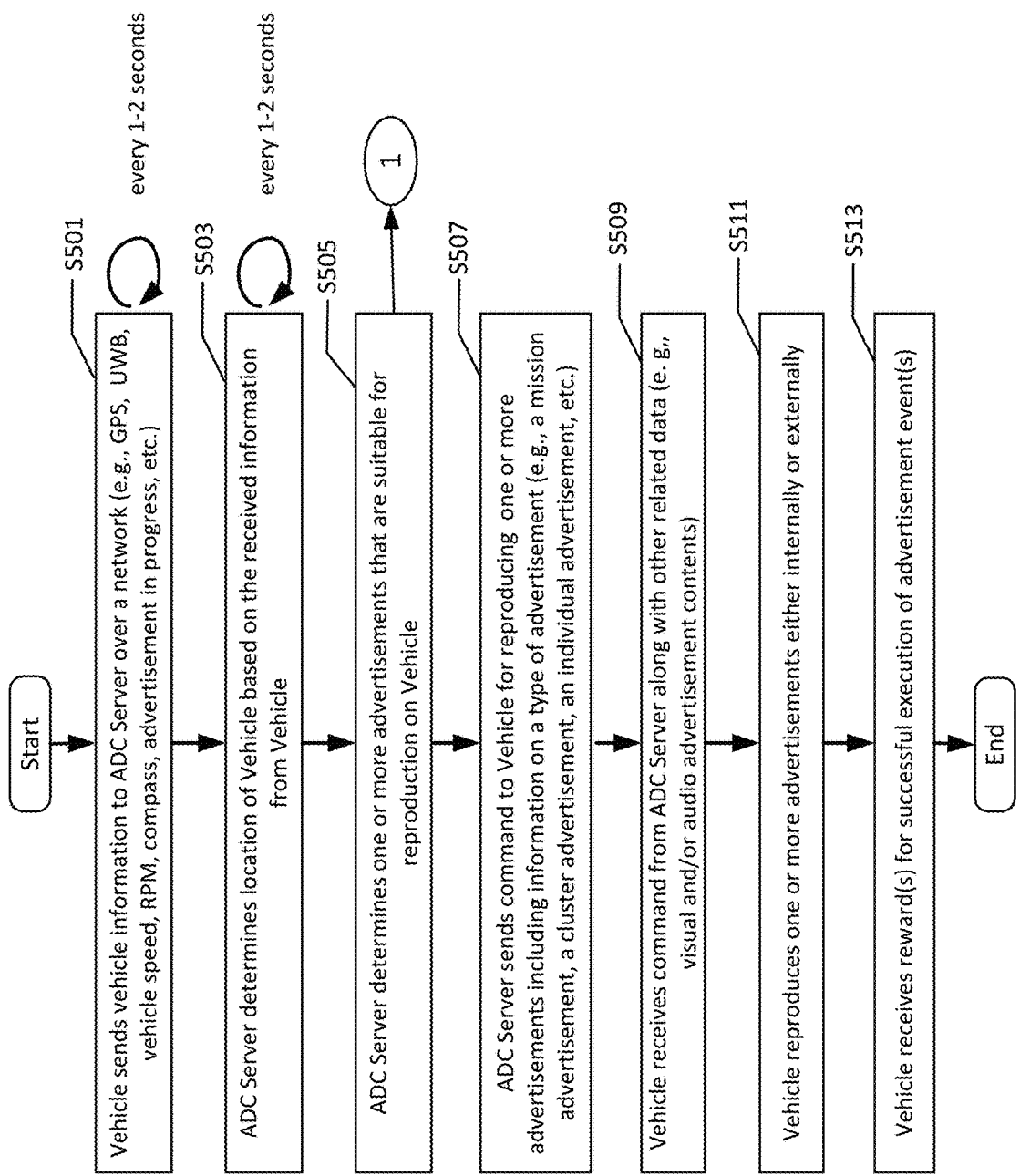
FIGS. 5A, 5B, and 5C conceptually illustrate example embodiments of the present technology in accordance with an aspect of the present disclosure.
Figure 5B:
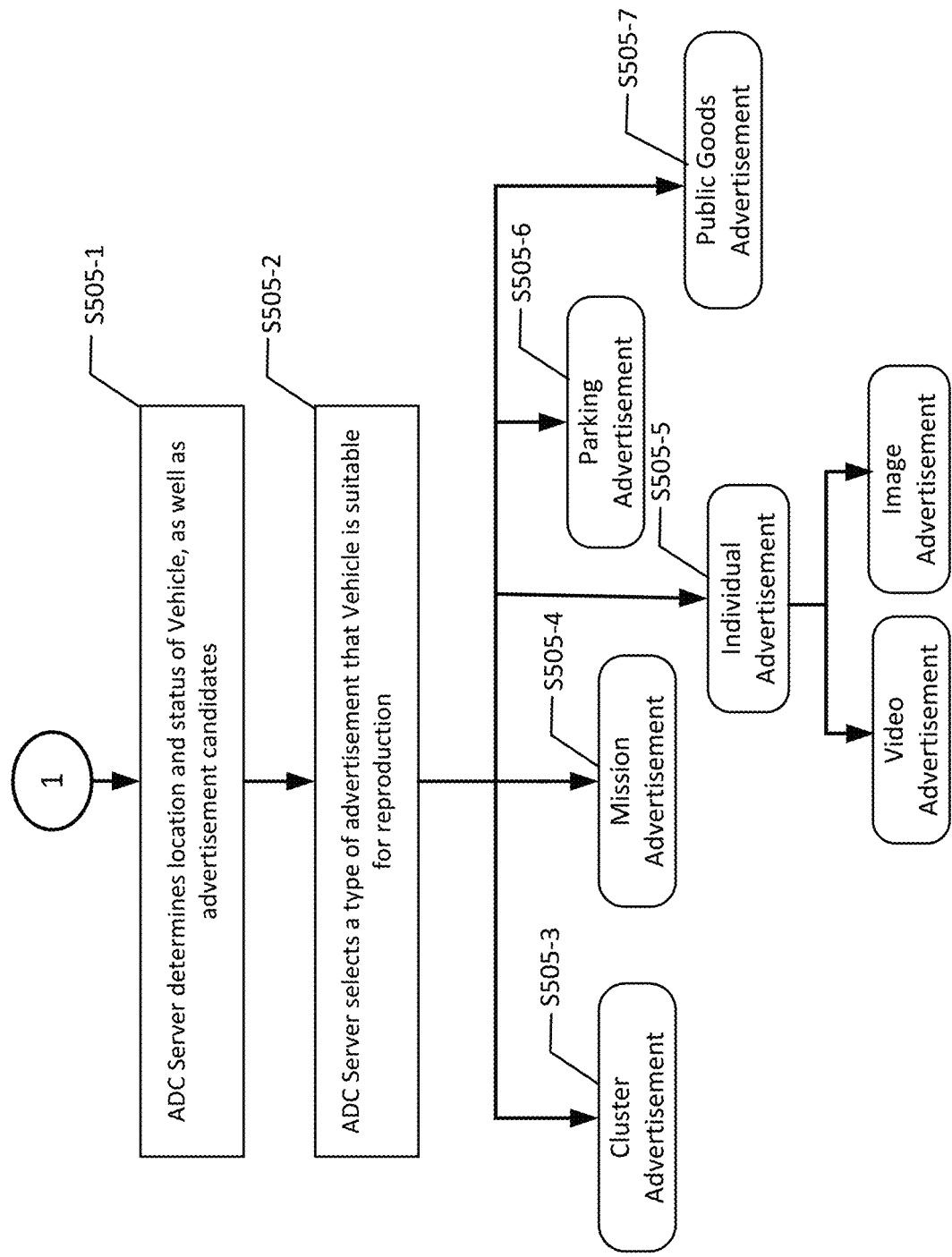
Figure 5C:
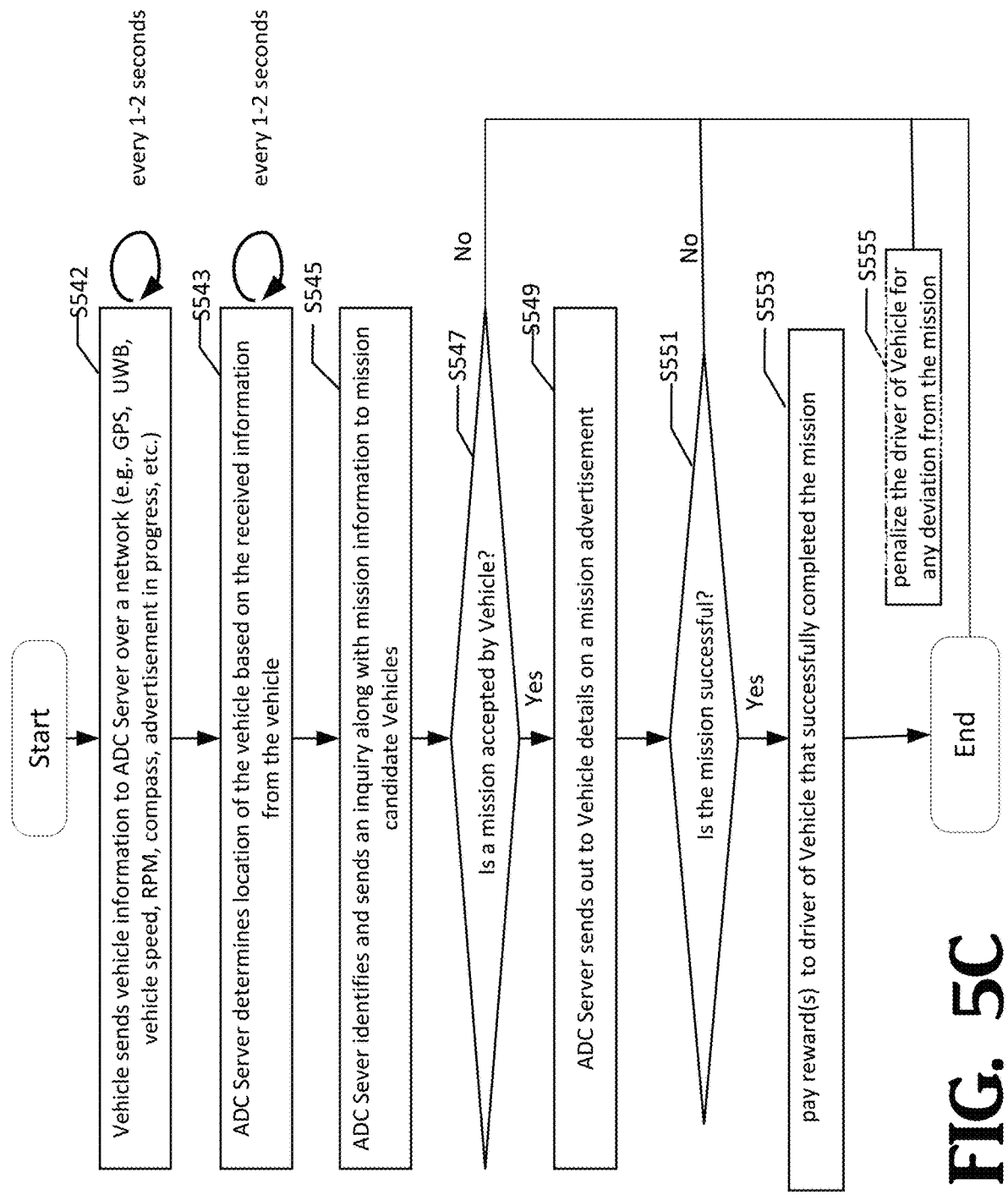
Figure 6:
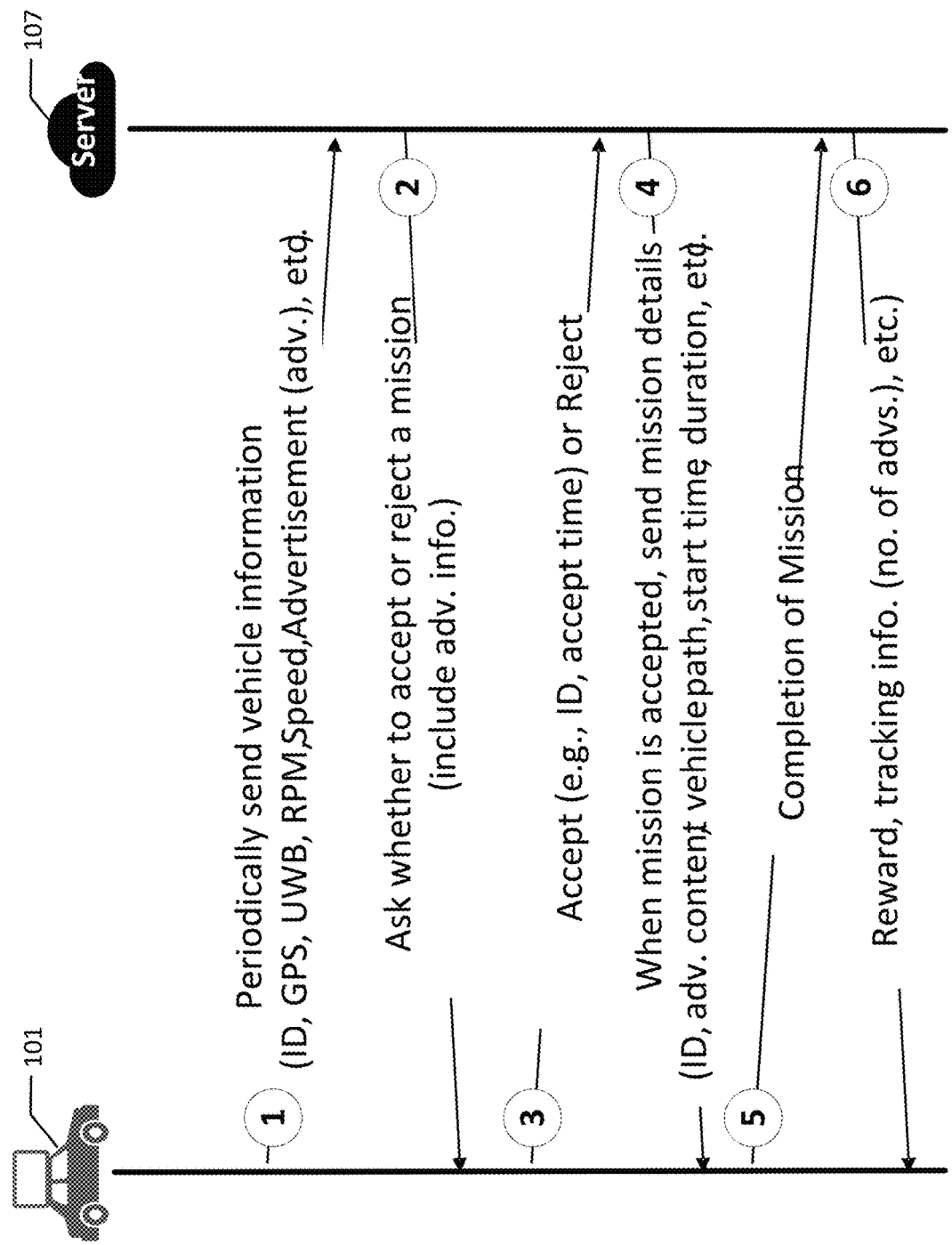
FIG. 6 conceptually illustrates an example embodiment of the present technology in accordance with an aspect of the present disclosure.
Figure 7:
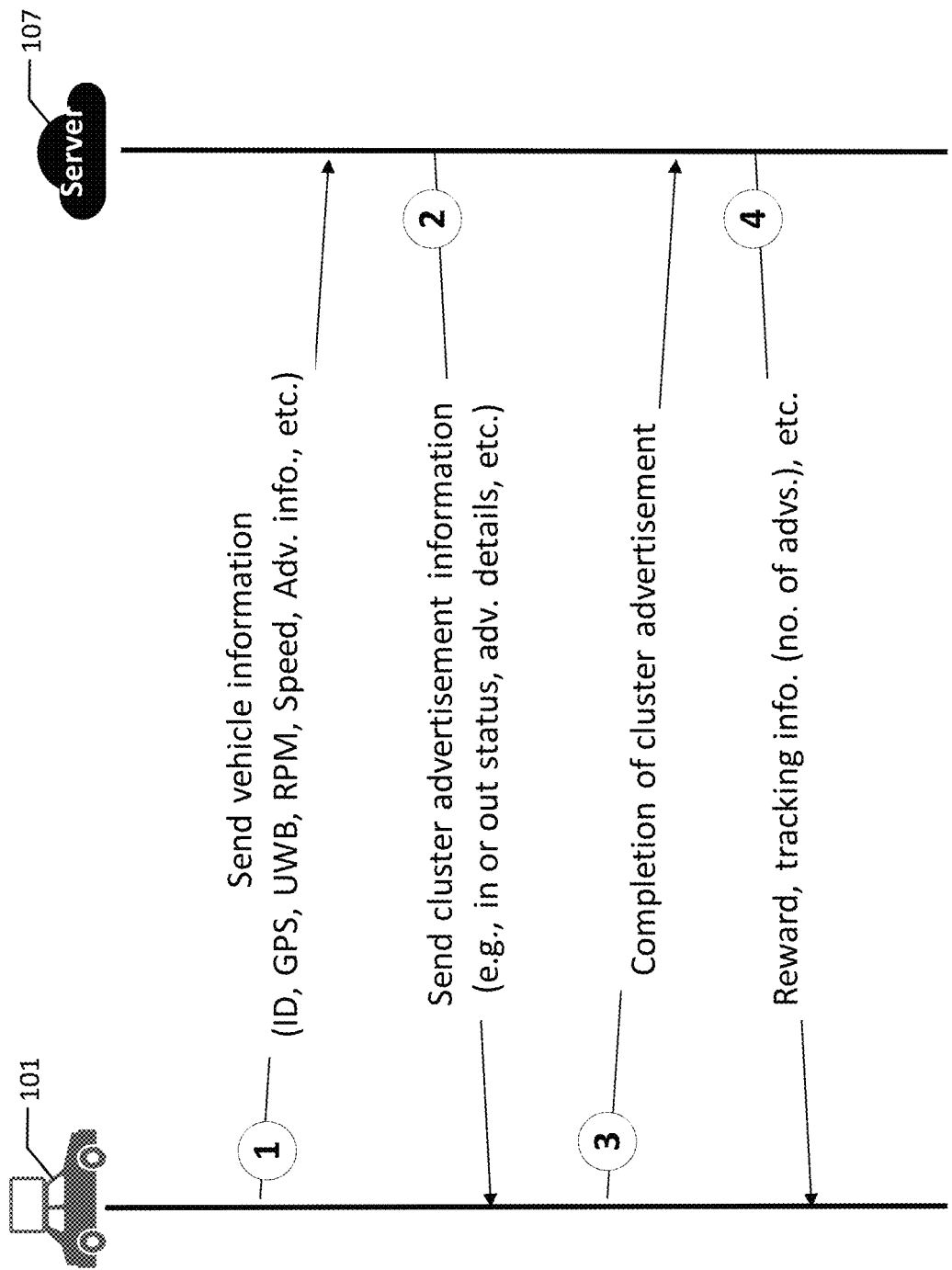
FIG. 7 conceptually illustrates an example embodiment of the present technology in accordance with an aspect of the present disclosure.
Figure 8:
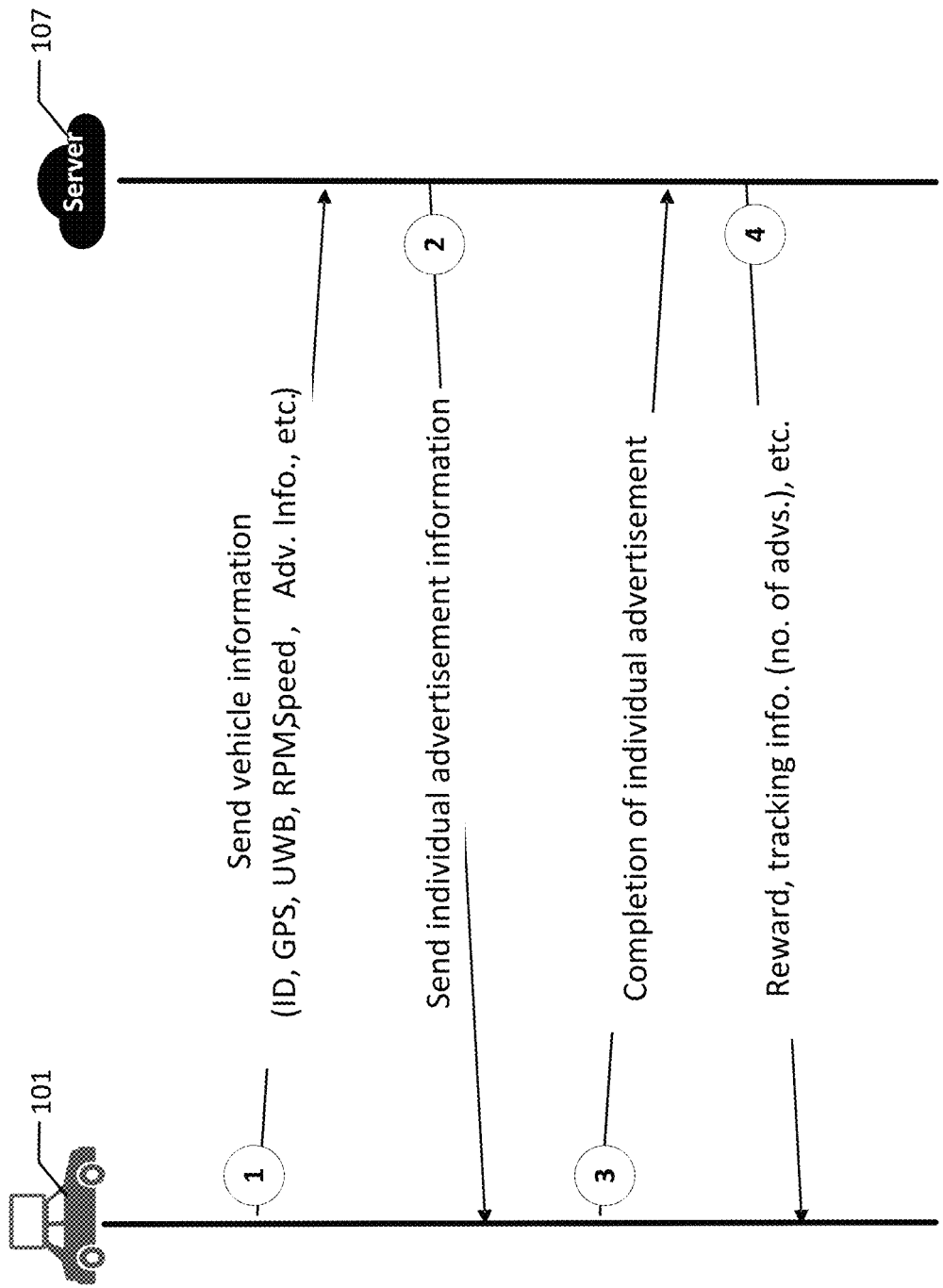
FIG. 8 conceptually illustrates an example embodiment of the present technology in accordance with an aspect of the present disclosure.

FIGS. 5-8 illustrates example process flows in accordance with aspects of the present disclosure. FIGS. 5A-5C are example flowcharts and FIGS. 6-8 are message diagrams conceptually illustrating communications between a connected vehicle and the server 107.

FIG. 5A is a diagram conceptually illustrating, at a high level, a process flow as to how a connected vehicle carries out an advertisement in accordance with an aspect of the present disclosure. By way of example, at S501, a connected vehicle sends periodically certain vehicle information to a server over a network, e.g., ADC server 107. The certain vehicle information may include real-time data on GPS location, UWB, vehicle speed, vehicle diagnostic information, compass information, advertisement in progress, etc.

At S503, the ADC server is configured to use the GPS location data to roughly determine the current location of the connected vehicle and UWB data to determine the more precise location of the connected vehicle along with relative positioning information among a plurality of connected vehicles. Also, the ADC server may use the compass data to aid in determining the orientation of the connected vehicle at the current location of the connected vehicle, relative to other connected vehicles in the area. Further, the ADC server may use the vehicle speed, vehicle diagnostic information, advertisement in progress, or the like to determine the current status of the connected vehicle as well as advertisement reproduction status on the connected vehicle.

At S505, the ADC server is further configured to determine one or more advertisements that are suitable for reproduction on the connected vehicle based in part on received information from the connected vehicle, in accordance with an example flowchart shown in FIG. 5B. Based on the received information from the connected vehicle, the ADC server is configured to determine location information of the connected vehicle, as well as advertisement candidates for reproduction, at S505-1. The advertisement candidates may be determined from a database of advertisements based on the determined location of the connected vehicle, vehicle profiles, as well as advertiser profiles.

At S505-2, the ADC server is further configured to select one or more advertisements that are to be reproduced by the connected vehicle, e.g., as a cluster advertisement (S505-3), a mission advertisement (S505-4), an individual advertisement (S505-5), a parking advertisement (S505-6), and a public goods advertisement (S505-7). The cluster advertisement is selected only when the connected vehicle is determined to be able to participate in a cluster advertisement, based on the location of the connected vehicle, a driver profile, an advertiser profile, vehicle information (e.g., model, make, color, etc. of the connected vehicle), or the like. The mission advertisement is selected when the connected vehicle is determined to be able to perform a mission advertisement event as requested by an advertiser. The individual advertisement is selected when the connected vehicle is determined to be able to perform an individual advertisement, not able to participate in the cluster advertisement, mission advertisement, parking advertisement, or public goods advertisement. Further, the individual advertisement may include a video advertisement or an image advertisement.

At S507, the ADC server is further configured to send commands to the connected vehicle for reproducing one or more advertisements including information on a type of advertisement such as, a mission advertisement, a cluster advertisement, an individual advertisement, a parking advertisement, or a public goods advertisement.

At S509, the connected vehicle is further configured to receive the command from the ADC server and other related data including visual and/or audio advertisement contents relating to the type of advertisement commanded for reproduction on the connected vehicle.

At S511, the connected vehicle is further configured to reproduce the one or more advertisements either internally via internal displays and/or speakers or externally via external displays and/or speakers. In the even that the connected vehicle detects the reproduction of an existing advertisement is in progress, the connected vehicle is further configured to wait until the reproduction of the existing advertisement is finished unless instructed otherwise from the ADC server.

At S513, after successful execution of one or more advertisement events, the connected vehicle (and/or the driver of the connected vehicle) receives a notification of award of reward(s) for participation in the advertisement event, e.g., reproducing the one or more advertisements requested by the ADC server.

Further, in particular, with respect to a mission advertisement, FIG. 5 illustrates an example flow for a mission advertisement in accordance with an aspect of the present disclosure.

At S542, the connected vehicle is configured to send vehicle information to the ADC server every 1 or 2 seconds, including various data such as GPS, UWB, vehicle speed, vehicle diagnostics, compass, advertisement reproduction status, etc.

At S543, the ADC server is configured to determine the location of the connected vehicle based in part on the received information from the connected vehicle. By way of example, the GPS location data is used to roughly determine the current location of the connected vehicle and additionally, the UWB data is used to determine a more precise location of the connected vehicle along with relative positioning information among a plurality of connected vehicles. In one implementation, for the location information, the GPS data may be used, and for granular location information, as needed for further applications, the UWB data may be used in addition to the GPS data.

Also, in an aspect of the present disclosure, the ADC server may be configured to use the compass data as well as the UWB data to assist in determining orientation information of the connected vehicle, relative to other connected vehicles nearby. Further, the ADC server may be configured to use a vehicle driving data such as the vehicle speed, vehicle diagnostic information, status on advertisements in reproduction, advertisement details (e.g., identification and duration of the advertisement, etc.) or the like to determine the current driving status of the connected vehicle as well as the advertisement reproduction status on the connected vehicle.

At S545, the ADC server is configured to send a mission inquiry along with mission information, based in part on the location of the connected vehicle, driver profile, advertiser profile, or the like. Some drivers may prefer to carry out mission advertisements than other types of advertisements. Some advertisers may also prefer to use certain types of connected vehicles (e.g., vehicle make, model, size, color, etc.) for their advertisements. Based on such profiles of the driver and advertisers, as well as the information of the connected vehicle, the ADC server may be configured to identify and classify the connected vehicle as a mission candidate vehicle for a carry-out of one or more mission advertisements.

At S547, the ADC server is further configured to determine whether an acceptance reply from the connected vehicle is received for the mission advertisement. At S549, if the acceptance reply from the connected vehicle is received from the connected vehicle, then the ADC server sends out details on the mission advertisement. If not accepted, then the process for the mission advertisement for the connected vehicle terminates.

At S551, the ADC server is further configured to monitor whether the mission advertisement is successfully carried out by the connected vehicle. If the mission advertisement is successfully carried out, then the ADC server is configured to pay rewards(s) to the driver of the connected vehicle that successfully completed the mission, at S553. If, during the mission advertisement, however, the connected vehicle failed to carry out the mission advertisement or deviated from the mission advertisement guidance, then a penalty is assessed and imposed on the driver of the connected vehicle at S555.

In the example, the mission advertisement may be a cluster advertisement or an individual advertisement along a specific route. That is, the mission advertisement may require the connected vehicle to show up a specific location at a certain designated time and carry out the cluster advertisement. Also, the mission advertisement may require the connected vehicle to show up at a specific location at a certain designated time to drive around a certain route while reproducing a specific advertisement on external displays and/or speakers of the connected vehicle. The mission advertisement may be designed based in part on one or more advertiser's specific needs.

FIGS. 6-8 are message diagrams conceptually illustrating communications between a connected vehicle 101 and a server 107 (e.g., ADC server) for example applications in accordance with aspects of the present disclosure.

For example, FIG. 6 shows messages exchanged between the connected vehicle 101 and the ADC server 107 for a mission advertisement. At the beginning of a process, the connected vehicle 101 periodically sends message(s) (e.g., Message Type 1) to the ADC server sends vehicle information including but not limited thereto, vehicle identification (ID), GPS information, UWB information, vehicle RPM information, vehicle speed information, advertisement status information, or the like. Based on the received information from the connected vehicle 101, the ADC server 107 sends to the connected vehicle 101 a message (e.g., Message Type 2) asking whether to participate in an upcoming mission. Then the connected vehicle 101 replies to the ADC server 107 in response to the inquiry message whether to accept the mission or reject the mission (e.g., Message Type 3). The message of Message Type 3 may include certain information such as vehicle ID, mission accept time, etc. Upon receiving the mission accept message, the ADC server 107 sends to the connected vehicle 101 details on the upcoming message (e.g., Message Type 4). The message may include certain information such as vehicle ID, advertisement content (video and/or audio advertisement content), vehicle path, start time, duration, or the like. After completing the mission based on information contained the message (e.g., Message Type 4), the connected vehicle 101 sends a report message informing the ADC server 107 (e.g., Message Type 5) that the mission has been successfully completed. Upon receiving the message of successfully completion of the mission from the connected vehicle 101, the ADC server 107 determines whether the mission was carried out in accordance with mission instructions or details, whether there was any deviation during the carry-out of the mission, or the like. After the successful completion of the mission by the connected vehicle 101 is confirmed, the ADC server 107 provides one or more rewards and send a message including a reward notification and number of advertisements carried out during the mission for accounting purposes.

FIG. 7 illustrates messages exchanged between the connected vehicle 101 and the ADC server 107 for a cluster advertisement. At the beginning of a process, the connected vehicle 101 periodically sends message(s) (e.g., Message Type 1) to the ADC server sends vehicle information including but not limited thereto, vehicle identification (ID), GPS information, UWB information, vehicle RPM information, vehicle speed information, advertisement status information, or the like. Based on the received information from the connected vehicle 101, the ADC server 107 determines whether the connected vehicle 101 is suitable for participation in a cluster advertisement. The ADC server 107 sends to the connected vehicle 101 a message (e.g., Message Type 2) including details on the cluster advertisement. For example, the connected vehicle may be informed whether the connected vehicle 101 is selected for a carry-out of the cluster advertisement, which in an aspect of the present disclosure is based in part on the location and profile information, through the "in" or "out" status information included in the message of Message Type 2. The connected vehicle 101 performs the cluster advertisement and after completing the cluster advertisement contained the message (e.g., Message Type 2), the connected vehicle 101 sends a report message informing the ADC server 107 (e.g., Message Type 3) that the cluster advertisement has been successfully completed. Upon receiving the message of successfully completion of the cluster advertisement from the connected vehicle 101, the ADC server 107 determines whether the cluster advertisement was carried out in accordance with the cluster advertisement instructions or details. After the confirmation of the successful completion of the cluster advertisement by the connected vehicle 101, the ADC server 107 provides one or more rewards and send a message including a reward notification and number of advertisements carried out during the mission for accounting purposes.

FIG. 8 illustrates messages exchanged between the connected vehicle 101 and the ADC server 107 for an individual advertisement. At the beginning of a process, the connected vehicle 101 periodically sends message(s) (e.g., Message Type 1) to the ADC server sends vehicle information including but not limited thereto, vehicle identification (ID), GPS information, UWB information, vehicle RPM information, vehicle speed information, advertisement status information, or the like. Based on the received information included in the message of Message Type 1 from the connected vehicle 101, the ADC server 107 determines whether the connected vehicle 101 is suitable for participation in an individual advertisement. The ADC server 107 sends to the connected vehicle 101 a message (e.g., Message Type 2) including details on the individual advertisement. The connected vehicle 101 performs the individual advertisement and after completing the individual advertisement contained the message (e.g., Message Type 2), the connected vehicle 101 sends a report message informing the ADC server 107 (e.g., Message Type 3) that the individual advertisement has been successfully completed. Upon receiving the message of successfully completion of the cluster advertisement from the connected vehicle 101, the ADC server 107 determines whether the individual advertisement was carried out in accordance with the individual advertisement instructions or details. After the confirmation of the successful completion of the individual advertisement by the connected vehicle 101, the ADC server 107 provides one or more rewards and send a message including a reward notification and number of advertisements carried out during the mission for accounting purposes. Further, in other implementations, one or more processes like the those shown in FIGS. 6-8 may be adopted for other types of advertisement such as parking advertisements as well as public goods advertisements.

Figure 9:
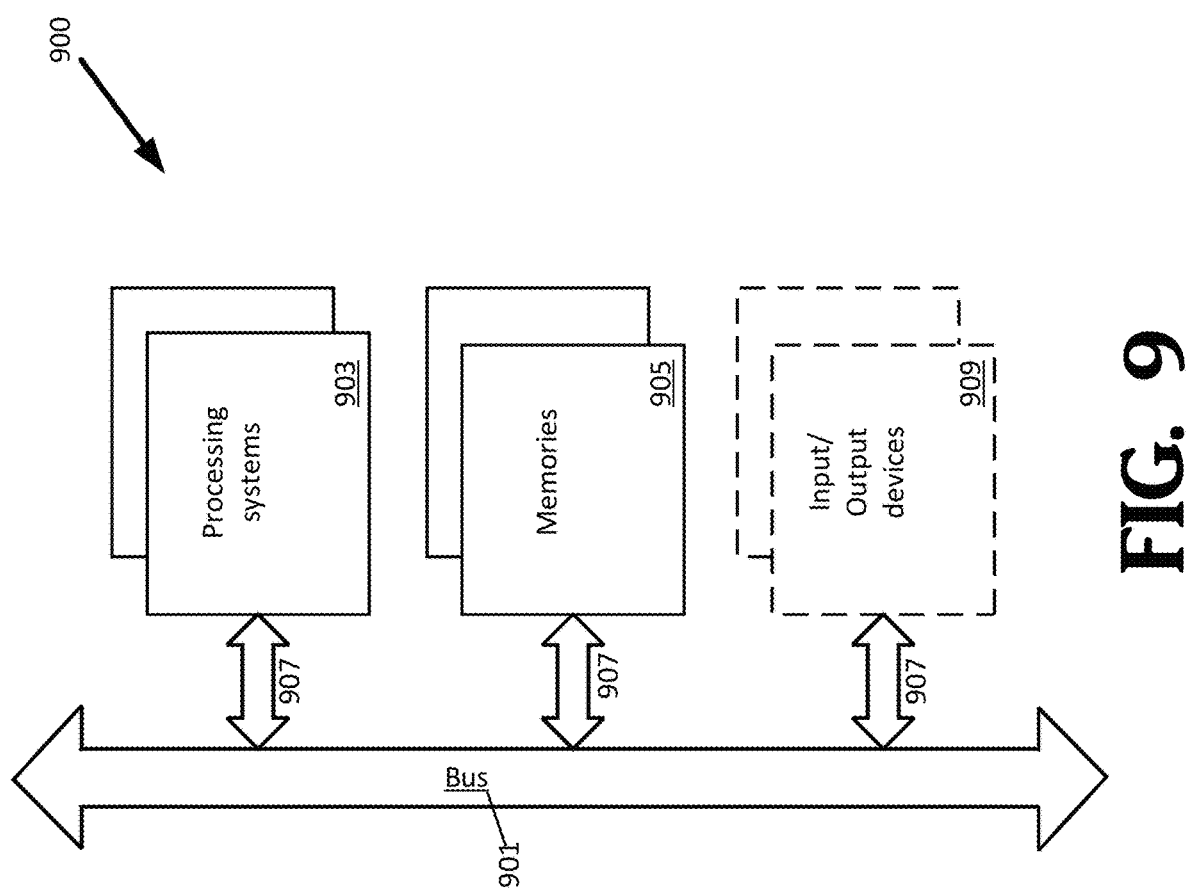
FIG. 9 is a block diagram conceptually illustrating an example of an embodiment in accordance with an aspect of the present disclosure.

FIG. 9 illustrates an example diagram conceptually illustrating an apparatus for implementing various functions, e.g., control and monitoring functions or units or circuitry, in connected vehicle (as shown in FIGS. 1-28), structures 103, and advertisement system 200 and/or the server 107. By way example, as shown in FIGS. 1-3, the advertisement system 200, various components of the advertisement system 200 (e.g., the main control unit 233, the communication unit 235, the sensor unit 237, the output unit 239, the advertisement identification unit 241, databases, or the like), the server 107, various components of the server 107 (e.g., the communication unit 301, the management and control unit 303, the account management unit 311, databases 305, 307, and 309), and other components may be implemented using in part an example apparatus 900 shown in FIG. 9.

As shown in FIG. 9, a bus 901 may link together various circuits, including one or more processing systems (or processors) 903, one or more memories (or storage units) 905, one or more communication interfaces 907, and/or optionally one or more input/output devices 909. The one or more processing systems 903 may be responsible for managing the bus and general processing, including the execution of software stored on a non-transitory computer-readable medium, relating to the one or more functions for present technology as disclosed herein.

Further, the one or more processing systems 903 may include one or more processors, such as microprocessors that interpret and execute instructions. In other implementations, the one or more processing systems 903 may be implemented as or include one or more application specific integrated circuits (ASICs), field programmable gate arrays (FPGAs), or the like. The software, when executed by the one or more processing systems 903, may cause the one or more processing systems 903 to perform the various functions or methodologies described herein for any apparatus. The non-transitory computer-readable medium may also be used for storing data that is manipulated by the one or more processing systems 903 when executing software.

Furthermore, the one or more memories 905 may include various types of memories, including a random-access memory and/or a read only memory, and/or other types of magnetic or optical recording medium and its corresponding device for storing information and/or instructions and/or retrieval thereof. Further, the one or more communication interfaces 907 may also include or coupled to any transceiver-like mechanism that enables communication with other devices and/or systems. The one or more input/output devices 909 may include devices that permit inputting information and/or outputting information to an operator.

FIGS. 10-28 illustrate various embodiments of the present technology in accordance with aspects of the present disclosure.

Figure 10:
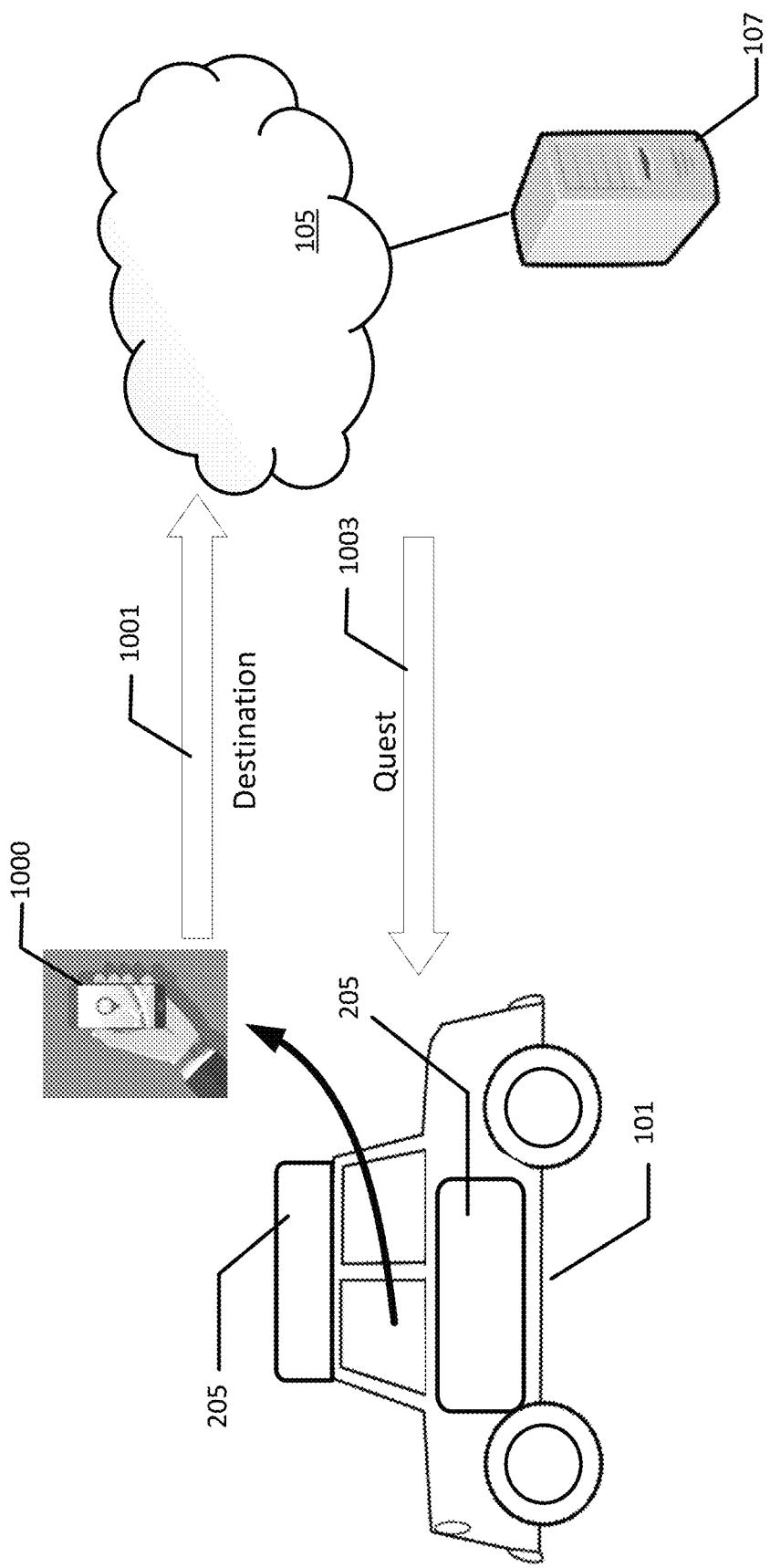
FIG. 10 conceptually illustrates an example embodiment of the present technology in accordance with an aspect of the present disclosure.

FIG. 10 illustrates an example embodiment in accordance with an aspect of the present technology. In an aspect of the present disclosure, a level of driver participation in an advertisement event may be increased by providing a quest (or recommendation) according to a driving route of the driver and available advertisement events. That is, in an aspect of the present disclosure, each of the plurality of connected vehicles may be configured to: receive input on a driving destination from a driver of the connected vehicle, send the received input to the server over the network, and in response, receive one more quests (or recommendations) from the server for a driving route. The one or more quests may be determined by the server, based in part on information on one or more driving routes to the driving destination of the driver, and available advertisement events in the one or more driving routes.

As shown in FIG. 10, by way of example, a driver of a connected vehicle 101 may enter a driving destination via an application on the driver's mobile device 1000 or an in-vehicle navigation device (not shown). The inputted destination information is transmitted to a server 107 over a network 105, via one or more messages 1001. The server 107 then is configured to receive the destination information and determine one or more advertisement campaign(s) or event(s) within the driver's driving path. The server 107 may be configured to prepare and send one or more quest(s) including information on the one or more advertisement campaign(s) or event(s), via one or more push notifications 1003 on the mobile application 1000 in the mobile device. Alternatively, the one or more quest(s) including information on the one or more advertisement campaign(s) or event(s) may be sent to the in-vehicle navigation device for presenting to the driver for selection. That is, it is possible to provide in real-time information about available advertisement events within the driver's expected driving route, e.g., a commute path, via push notifications on the driver's mobile device.

In an aspect of the present disclosure, alternatively, it may be also possible to receive input on a specific destination in advance from the driver, and to provide to the driver real-time information on an advertisement event within one hour from the estimated departure time through one or more push notifications of a mobile phone application.

Further, in another aspect of the present disclosure, the server 107 may be configured to include a function to prepare and recommend one or more quest(s) in consideration of a travelling route, time or the like, with respect to a connected vehicle suitable for the characteristics of the advertisement event among registered advertisement vehicles including connected vehicles such as 101, based on the location and time information of the advertisement event inputted by an advertiser. Further, the characteristics of the advertisement event may include target advertisement audience including audience's age, sex, preference, etc.

In an aspect of the present disclosure, the driver of the connected vehicle 101 may review the received quest(s) and accept the one or more quest(s) prior to departure to the specific destination. When the one or more quest(s) are accepted by the driver, a driving route according to the one or more quest(s) is set in an in-vehicle navigation system of the connected vehicle and driving instructions are provided to the driver of the connected vehicle. Alternatively, the driver of the connected vehicle 101 may request and receive a different request for change while driving to the specific destination.

As a result, the level of driver participation in advertisement event(s) may be greatly increased, by providing one or more quests based on a planned driving route of a driver of the connected vehicle 101.

Figure 11B:
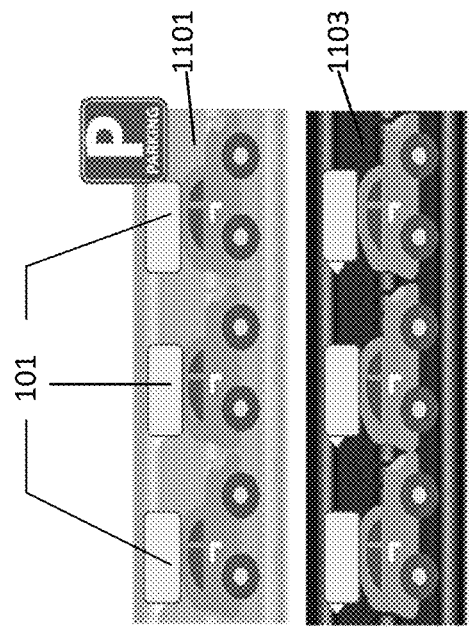
FIGS. 11A, 11B, and 11C conceptually illustrate an example embodiment of the present technology in accordance with an aspect of the present disclosure.
Figure 11A:
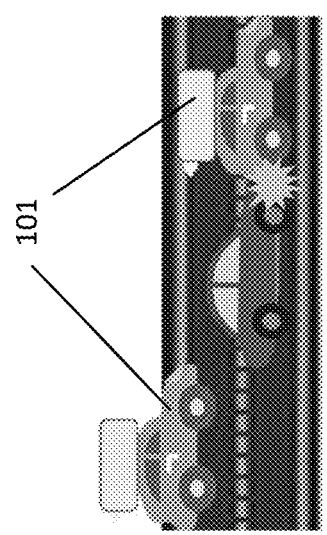
Figure 11C:
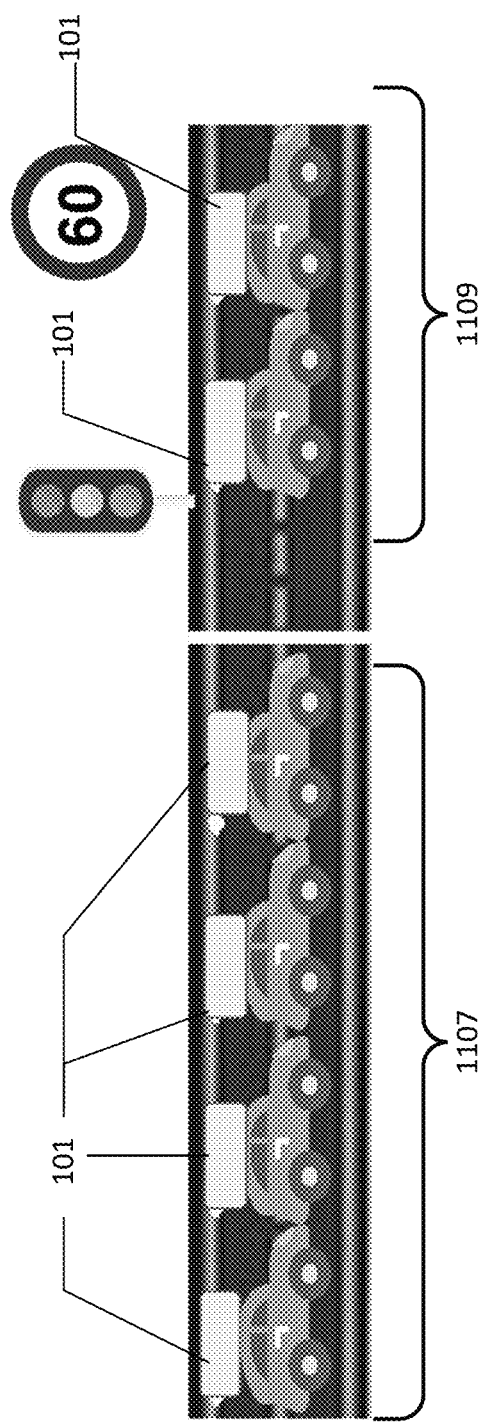

FIGS. 11A, 11B and 11C illustrate example embodiments in accordance with an aspect of the present technology. In preparation for performing a parade or a mission for an advertisement event using a plurality of connected vehicles 101, there may be a need for controlling the connected vehicles 101 to cluster at a predetermined area. By way of example, in preparation for performing the parade or the mission, the plurality of connected vehicles may be instructed to gather together at a predetermined location, e.g., a parking lot or a road with the least traffic.

As shown in FIG. 11A, in one implementation, if one or more connected vehicles 101 await other connected vehicles on a road, there may be a danger of causing an accident or interfering with other vehicles on the road while waiting for other connected vehicles to follow in the parade. Thus, as shown in FIG. 11B, in an aspect of the present disclosure, the connected vehicles 101 that are to participate in a parade for an advertisement event may be clustered either in a designated parking lot 1101 or on a road with the least amount of traffic on the road 1103.

In an aspect of the present disclosure, the server 107 may be configured to search for a parking lot nearby a target parade area and send commands or instructions to a plurality of connected vehicles 101 that are going to participate in the parade to drive and cluster in the parking lot in preparation for the parade. In another aspect of the present disclosure, when there is no such a parking lot for the plurality of connected vehicles that are going to participate in the parade to cluster for the parade, the server 107 may be further configured to search for a road nearby the target parade area with the least amount of traffic on the road, and send commands or instructions to the plurality of connected vehicles 101 to cluster on the road 1103 in preparation for the parade. In the example, the server 107 may collect and analyze data on traffic density or vehicle density information on the roads around the target parade area and select an appropriate cluster location based in part on distance to the target parade area and traffic or vehicle density information.

In another aspect of the present disclosure, during a parade, a traffic light may separate the cluster into two groups, a first group and a second group. In such a case, the first group and the second group need to be controlled so that the two groups can be re-clustered for the parade. That is, during the parade, when the cluster for the parade gets broken into multiple groups by a traffic light, then speeds as well as driving routes of the connected vehicles in multiple groups are controlled by the server 107 over the network such that the multiple groups cluster again into a single procession for the parade or the mission.

By way of example, as shown in FIG. 11C, a plurality of connected vehicles 101 participating in the parade (forming a cluster) are separated into the first group 1109 and the second group 1107 by a traffic light. For an effective management of the parade, the server 107 may be configured to detect that the cluster is separated into two groups by the traffic light. The server 107 may be configured to provide different driving instructions to the first group 1109 and the second group 1107 respectively. For example, the server 107 may provide directions to the first group to drive at a lower speed after the separation and provide instructions to the second group that follows the first group to drive at a higher speed so that the first and second groups can re-cluster at a point for carrying out of the parade. The server 107 may also verify minimum and/or maximum speed limits on the road and provide appropriate instructions to the first and the second groups for re-clustering for the parade.

In another aspect of the present disclosure, the server 107 may collect road information nearby for preparing instructions for the re-clustering for the parade. The server 107 may further provide a set of instructions to the first group to drive to a road with less traffic and wait there for re-clustering and provide another set of instructions to the second group to drive to the road on which the first group is waiting and re-cluster as a group for the parade.

Figure 12B:
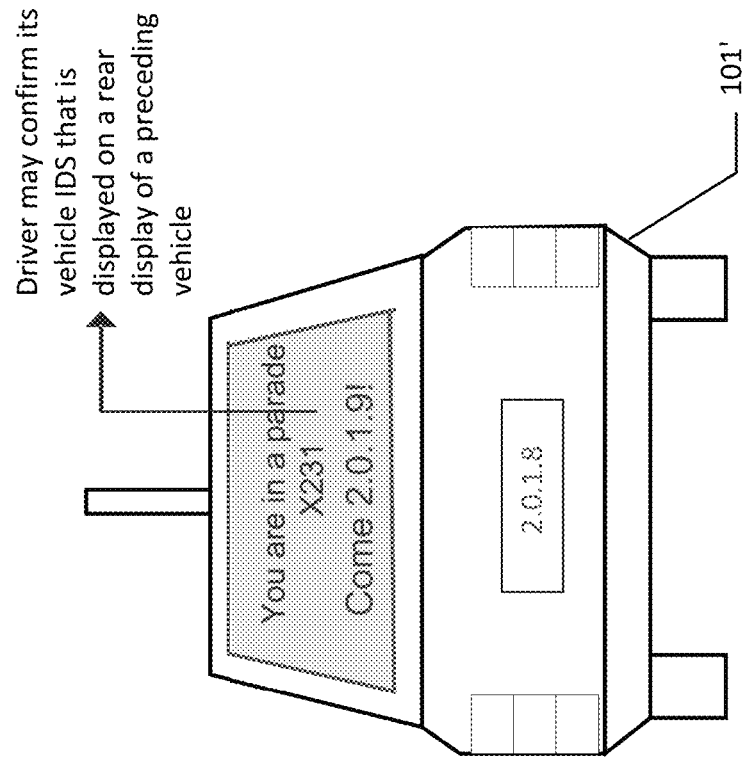
FIGS. 12A and 12B conceptually illustrates an example embodiment of the present technology in accordance with an aspect of the present disclosure.
Figure 12A:
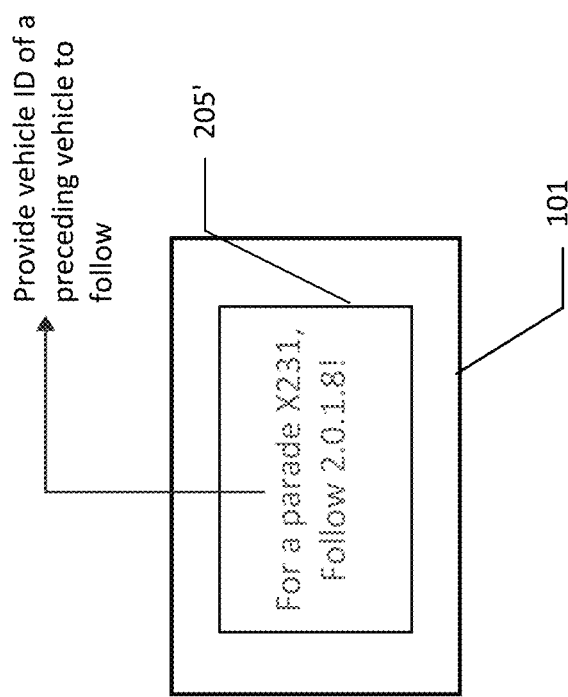

FIGS. 12A and 12B illustrates an example embodiment in accordance with an aspect of the present technology. During a parade for an advertisement event, when driving routes for the parade are simply provided to a driver of a connected vehicle participating in the parade and asked to participated in the parade, there may be a confusion to the driver because the driver may not be able to identify or determine whether a preceding vehicle in front of his or her vehicle is another vehicle participating in the same parade. As such, in an aspect of the present disclosure, the vehicles participating in the same parade may be provided with vehicle information during the parade by the server 107.

In the example, as shown in FIG. 12A, the server 107 may provide vehicle identification information of a preceding vehicle to the connected vehicle 101 that is participating in the parade for internal display of the information to the driver of the connected vehicle. That is, the connected vehicle 101 receives the information and display on an internal display 205' of the connected vehicle 101 for participation in the parade. For example, the driver of the connected vehicle 101 only need to confirm that he or she is following the connected vehicle identified as "2.0.1.8". Further, the server 107 may additionally send identification information of the connected vehicle 101 to the preceding vehicle 101' participating in the parade such that the driver of the connected vehicle 101 may see the identification information of the connected vehicle 101 on the external displays of the connected vehicle 101'. As a result, the driver of the connected vehicle 101 may confirm that the connected vehicle 101 is following a correct vehicle for successful execution of the parade.

Alternatively, the plurality of connected vehicles participating in the parade may communicate with each other to manage and control the connected vehicles independent of the server 107 until the end of the successful execution of the parade. One of connected vehicles may be selected as a master vehicle which serves to manage the parade order and cluster management during the parade. For example, during the parade, a tethered communication link may be established and maintained among the plurality of connected vehicles participating in the parade for a smooth execution of the parade. When a connected vehicle is determined to be driving out of order in the parade, one or more alert messages are generated and displayed on internal displays of the connected vehicles that are driving out of order. Based on the one or more alert messages, the drivers of the connected vehicles may take corrective action to regroup and participate in the parade as the cluster. Alternatively, when the server detects out-of-order connected vehicles in the parade, the server may send driving instructions to the out-of-order connected vehicles to form the cluster as originally designed for the parade.

Figure 13:
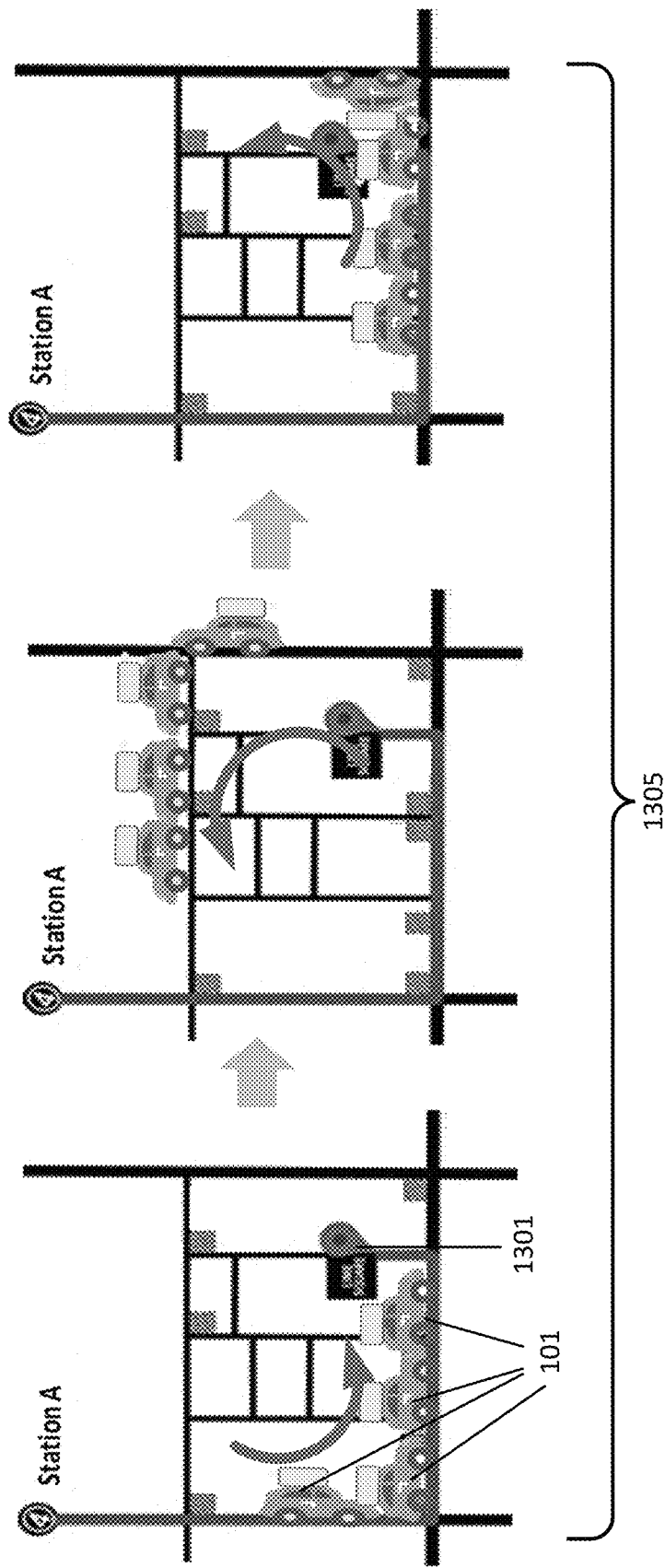
FIG. 13 conceptually illustrates an example embodiment of the present technology in accordance with an aspect of the present disclosure.
Figure 14A:
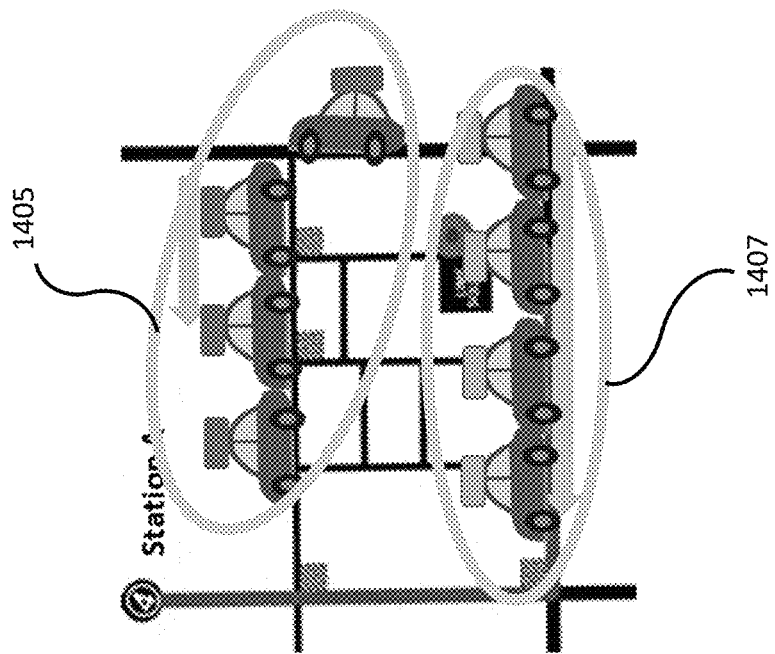
FIGS. 14A and 14B conceptually illustrate example embodiments of the present technology in accordance with an aspect of the present disclosure.
Figure 14B:
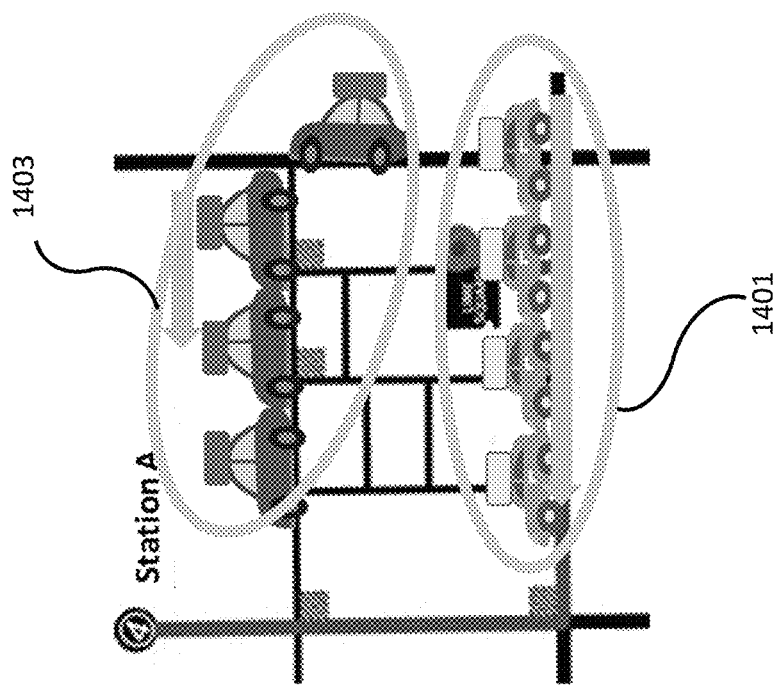

FIGS. 13, 14A and 14B illustrate example embodiments in accordance with an aspect of the present technology. In an aspect of the present disclosure, during a parade in which a plurality of connected vehicles drives together in a target parade area, reproducing the same advertisement, the effect of advertisement may be maximized by inducing repeat recognition.

By way of example, as shown in FIG. 13, for connected vehicle 101 form a cluster for the parade, in which the same advertisement is to be reproduced on the connected vehicles for the benefit of an advertiser's store 1301. For an effect of repeat recognition on people outside viewing the advertisement on the parade, the connected vehicles 101 may make 2-3 turns of the parade around the indicated route (e.g., a repeat recognition route indicated by arrows). FIG. 13 illustrates an example of a repeat recognition route showing a single turn 1305 of the repeat recognition route.

In an aspect of the present disclosure, the server 107 may be configured to identify a repeat recognition route for the parade based in part on factors including the location of the advertiser's store, traffic density on roads nearby the advertiser's store, and/or density information of people in the area. The number of turns around the repeat recognition route may also be determined based in part on the above factors.

Further, in another aspect of the present disclosure, as shown in FIG. 14A, the connected vehicles participating in the parade may be classified and sub-grouped for the parade based on vehicle information such as vehicle type, color, etc. As shown in FIG. 14A, by way of example, two different subgroups 1401 and 1403 may be formed near the target area, based on the vehicle information (e.g., vehicle type, model, make, color, size, or etc.) and drive along different parade routes. The two different sub-groups 1401 and 1403 are configured to reproduce the same or similar advertisement during the parade on the different parade routes, thereby increasing the effect of the advertisement during the parade.

Further, as shown in FIG. 14B, in another aspect of the present disclosure, two or more sub-groups, e.g., sub-groups 1405 and 1407, may be formed for the parade near the target area based in part on types of advertisements and/or advertisement contents or vehicle information. In the example, when the advertisement contents are selected for reproduction based on driver's preferences, etc., the connected vehicles that are to reproduce similar advertisements may be grouped into the different sub-groups 1405 and 1407 for the parade on the different parade routes.

In an aspect of the present disclosure, in one implementation, the server 107 may be configured to determine appropriate subgroups for the parade based in part on vehicle information and driver's preference of the connected vehicles participating in the parade. Further, such groupings (or clustering) for the parade may be done based in part on other factors, including but not limited thereto, a density of people on nearby roads, profile information of people on streets near the target area, types of advertisements to be reproduced by different subgroups, types of vehicles, make or model of vehicles, color of vehicles, etc. or any combination thereof. For some advertisements, factors having similar characteristic may be considered for the subgrouping of the connected vehicles participating in the parade. For other advertisements, factors having different characteristic may be considered for the subgrouping of the connected vehicles participating in the parade, to maximize the effect of the advertisement on people viewing the advertisements reproduced on the connected vehicles participating in the parade.

Figure 15:
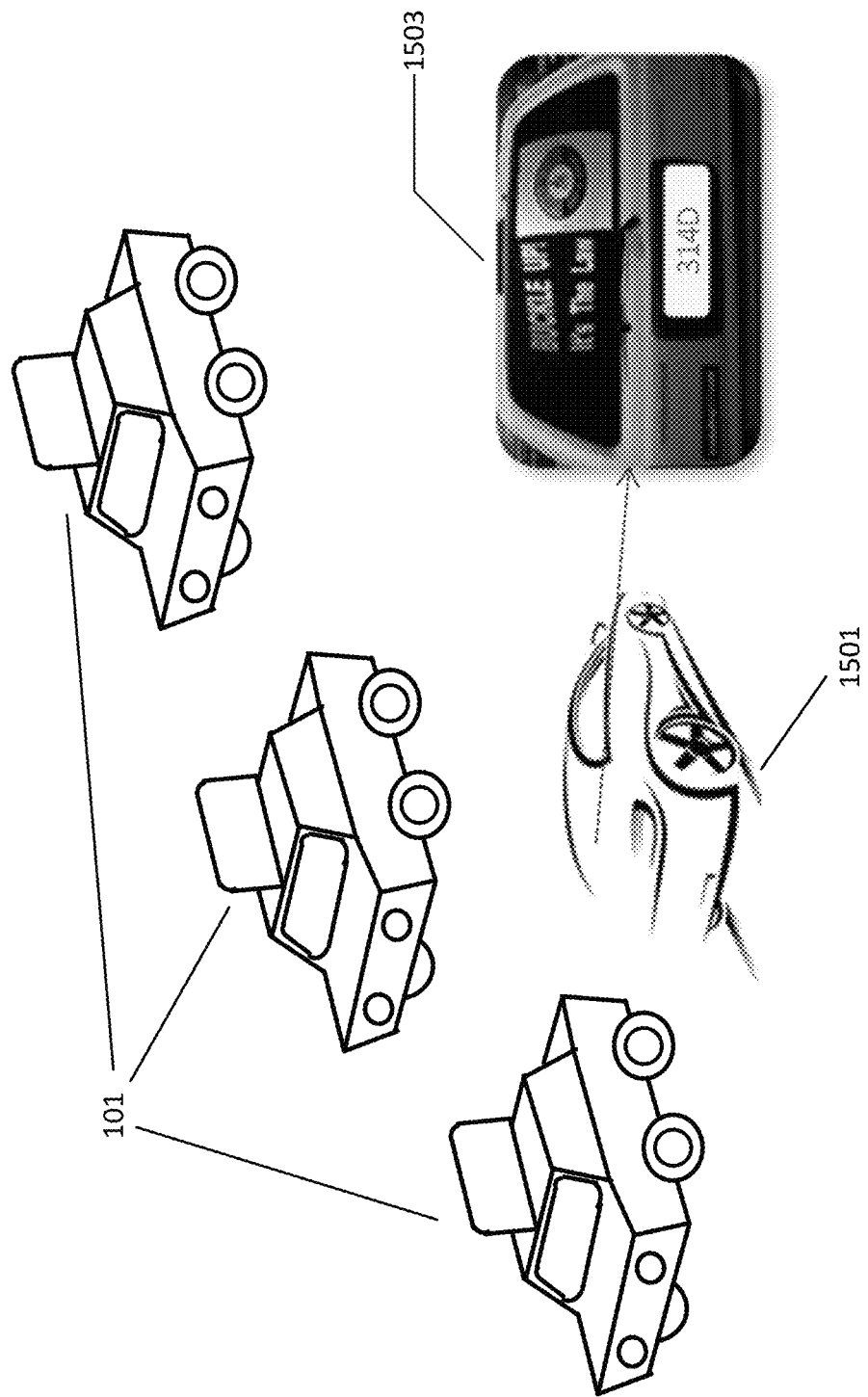
FIG. 15 conceptually illustrates an example embodiment of the present technology in accordance with an aspect of the present disclosure.

FIG. 15 illustrates an example embodiment in accordance with an aspect of the present technology. In an aspect of the present disclosure, during a parade of connected vehicles 101 for an advertisement event, some vehicles may desire to participate in the parade. In such a case, the server may be configured to allow a vehicle to participate in the parade, even though the vehicle has not registered for the advertisement event in advance of the parade. By way of example, as shown in FIG. 15, a vehicle 1501 may try to cut in the middle of the parade of connected vehicles 101. The sever 107 may be configured to detect such an attempt to cut in the parade by the vehicle 1501 and determine whether the vehicle 1501 can successfully participate in the parade. The server 107 may receive a request for registration for the advertisement event via a mobile application on the driver's mobile phone. Upon receipt of the request, the server 107 checks whether the vehicle 1501 is equipped to participate in the advertisement event. After the vehicle 1501 is determined to be able to participate in the parade for the advertisement event, the server 107 may send information on the advertisement for reproducing on the vehicle 1501.

By way of example, as shown in FIG. 15, the vehicle 1501 may be configured to project the advertisement using an in-vehicle projector or the like onto a rear or side window of the vehicle 1501, as shown in 1503, and participate in the parade procession, reproducing the same or similar advertisement through an in-vehicle projector or the like in the vehicle 1501. That is, the vehicle 1501 may be configured to project the same or similar advertisement on a rear window shield or a side window of the vehicle 1501, while participating in the procession of the parade. After the parade is finished, the server 107 may be configured to award a reward to the vehicle 1501 for participation in the parade. In the example, as noted above, although the vehicle 1501 may not be registered in advance prior to the participation in the parade, during the parade, the driver of the vehicle 1501 may register for the participation in the parade via the mobile application on the driver's mobile device.

Figure 16A:
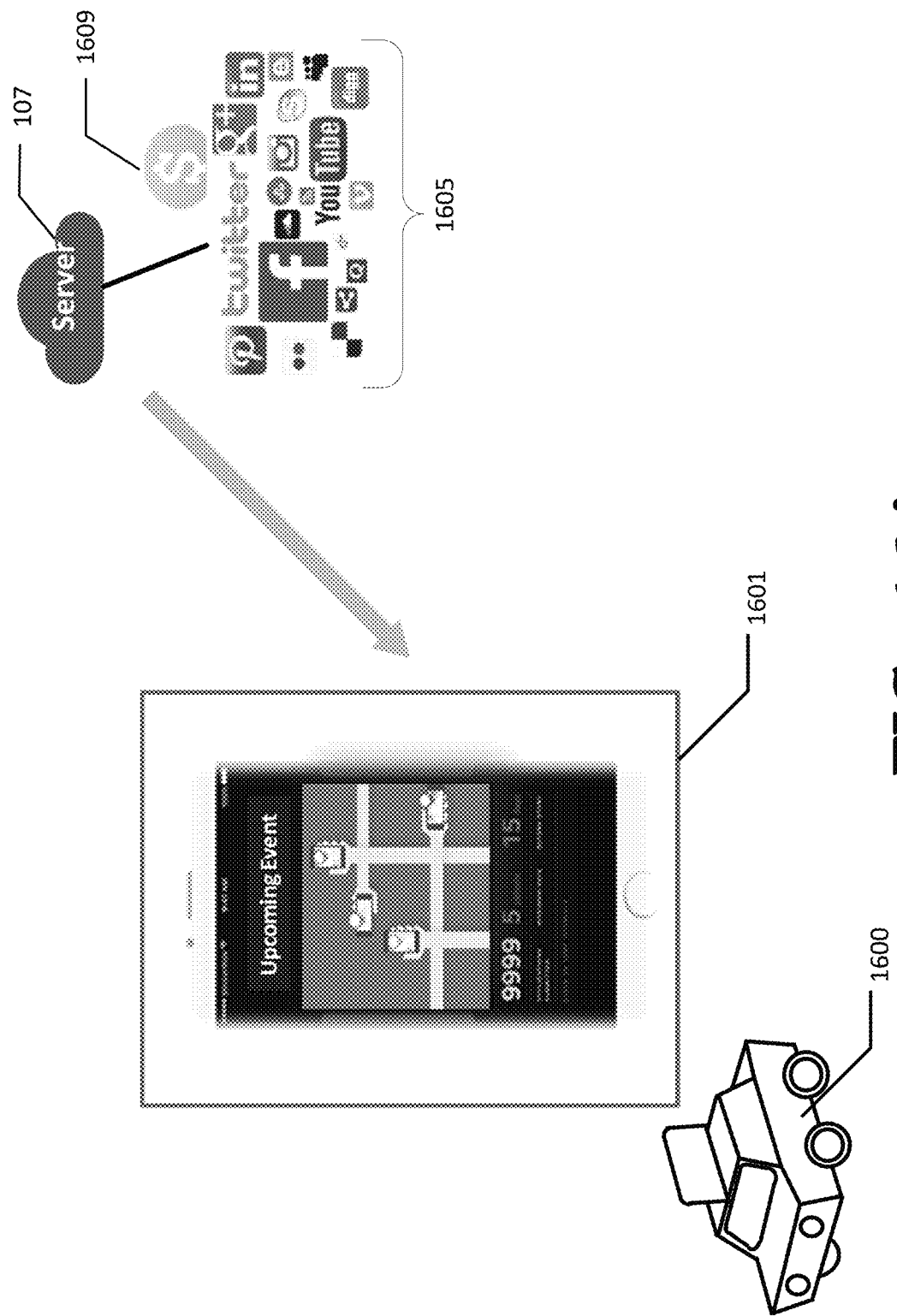
FIGS. 16A and 16B conceptually illustrate an example embodiment of the present technology in accordance with an aspect of the present disclosure.
Figure 16B:
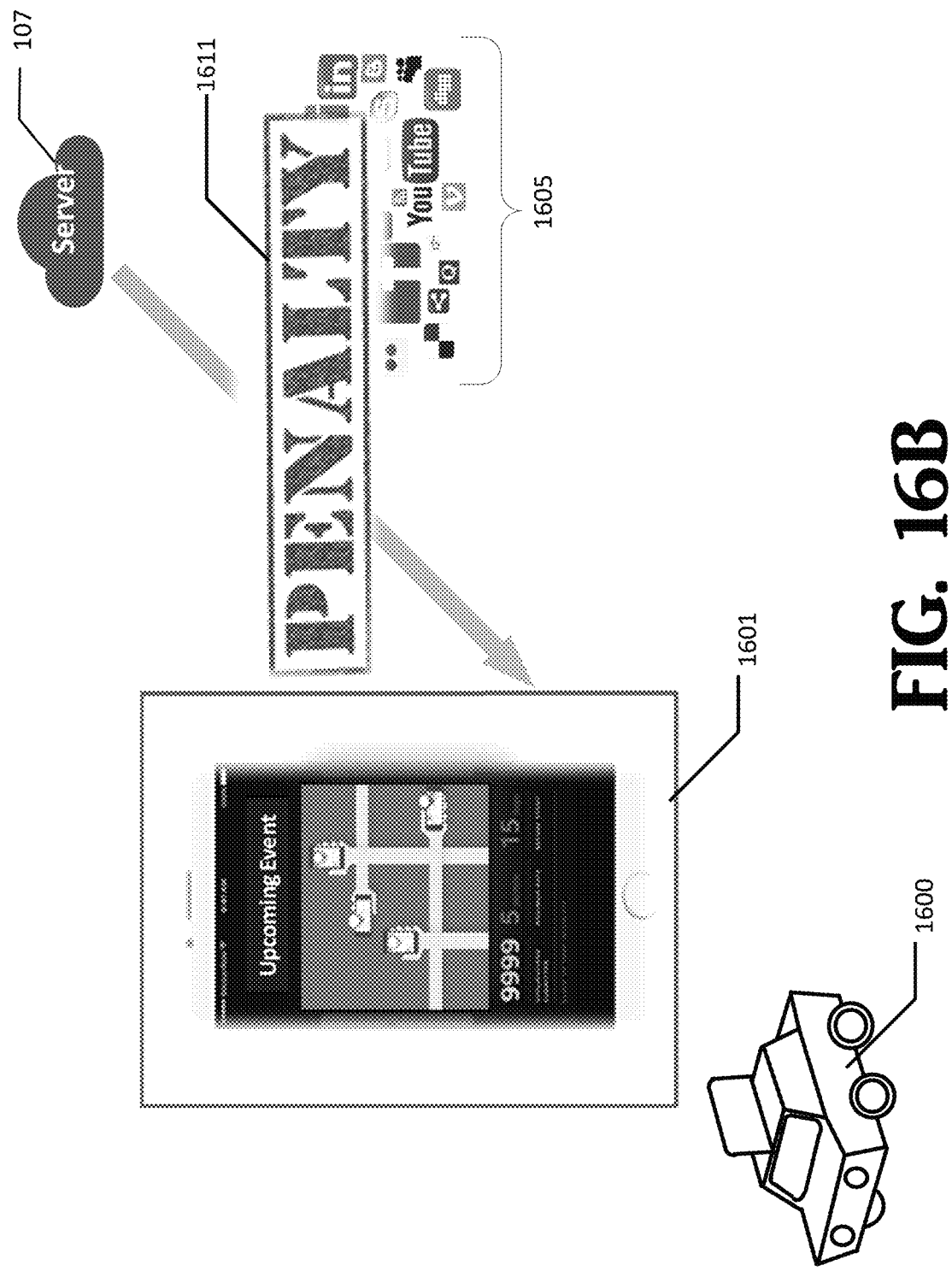

FIGS. 16A and 16B illustrate example embodiments in accordance with an aspect of the present technology. A planned advertisement event may be cancelled due to a shortage of target connected vehicles participating in the planned advertisement event. As shown in FIG. 16A, an application or in-vehicle display 1601 may be used to provide to a driver of the connected vehicle 1600 (having components like those of the connected vehicle 101) who signed up for participation in an upcoming advertisement event, real-time information about whether a predetermined target number of connected vehicles for carrying out the advertisement event has been reached or recruited.

In the example, the driver of the connected vehicle 1600 may find out various information about the upcoming advertisement event through an in-vehicle display 1601. In the example, the in-vehicle display 1601 may show that for the upcoming advertisement event, a predetermined target number of connected vehicles is set to 15 and so far, only 5 connected vehicles are recruited for the upcoming advertisement event, as well as locations of the connected vehicles. The predetermined target number of connected vehicles for the advertisement event may be set by the server 107 based on input from an advertiser 1605 that is sponsoring or paying for the advertisement event. When it is determined that for the upcoming advertisement event a minimum target number of connected vehicles has not been reached and it is less than a predetermined time duration (e.g., one hour) from the start of the planned advertisement event, the server 107 may send a notice of cancellation to the connected vehicle 1600 that is recruited for the advertisement event. The predetermined time duration may be provided by the sponsoring advertiser. Further, if the number of connected vehicles participating in the upcoming advertisement event is high, the server 107 may pay a high reward 1609 to participating connected vehicles (or drivers of the connected vehicles), thereby inducing or encouraging a high level of participation in the advertisement event.

In another aspect of the present disclosure, connected vehicles that are recruited for participation in the advertisement event are continuously monitored by the server 107. This is because some drivers of the connected vehicles who signed up for the upcoming advertisement event may not participate in the advertisement event, which is disadvantageous to the advertiser who invested in the upcoming advertisement event. As such, as shown in FIG. 16B, when the server 107 determines that the connected vehicle 1600 fails to participate in the advertisement event for which the connected vehicle 1600 was recruited, the server 107 is configured to impose a penalty to the connected vehicle 1600 (or the driver of the connected vehicle 1600). The penalty may be in the form of a deduction in points. Also, when the connected vehicle 1600 or the driver of the connected vehicle 1600 is determined to fail to participate in the advertisement events over than a certain number of times, e.g., 3 times, the server 107 may restrict the connected vehicle 1600 or the driver of the connected vehicle 1600 from participating in future advertisement events.

Thus, the effect of advertisement using the connected vehicles may be increased based on high rewards for participation in the advertisement events as well as penalties for failure to participate in signed-up advertisement events.

Figure 17:
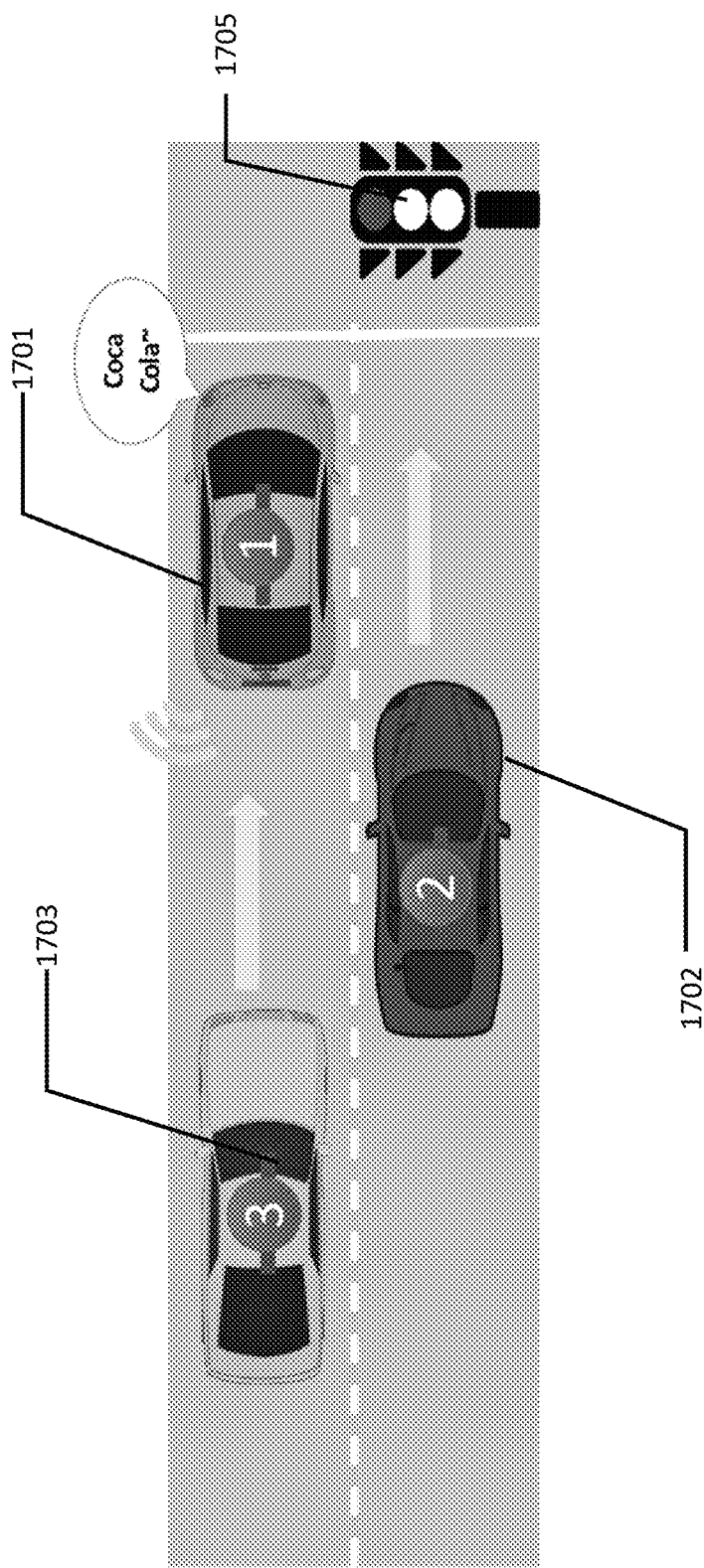
FIG. 17 conceptually illustrates an example embodiment of the present technology in accordance with an aspect of the present disclosure.
Figure 18:
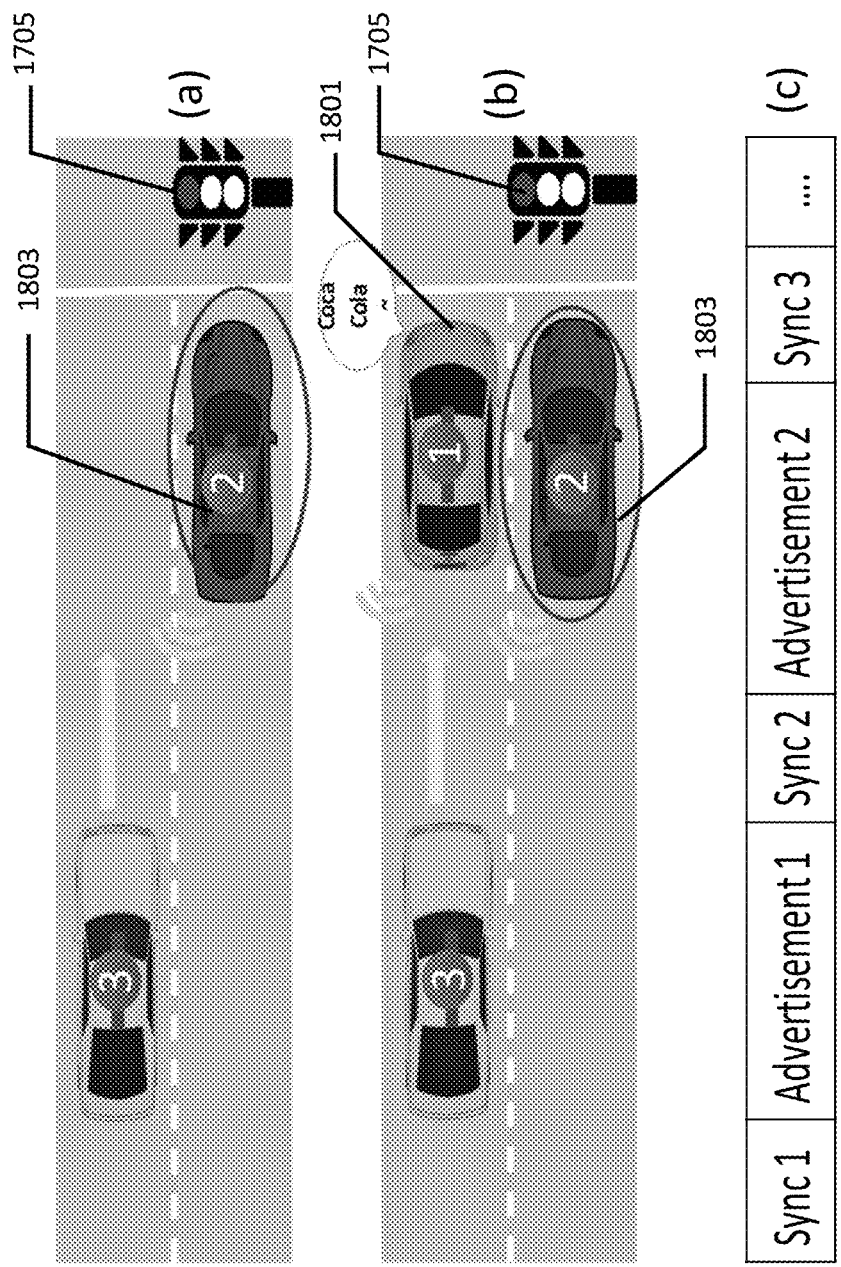
FIG. 18 conceptually illustrates an example embodiment of the present technology in accordance with an aspect of the present disclosure.

FIG. 17 and FIG. 18 ((a), (b), and (c)) illustrates an example embodiment in accordance with an aspect of the present technology. When a same advertisement (e.g., an audio advertisement) is reproduced at a stop signal of a traffic light, the reproduction of the same advertisement by connected vehicles may be viewed as noise to other vehicles or pedestrians when each connected vehicle is configured to reproduce the same advertisement at each stop of each connected vehicle 1701, 1702, or 1703 (having components similar to those of the connected vehicles 101) without coordination with each other, as shown in FIG. 17. In such a case, the effect of the audio advertisement may be greatly reduced. In an aspect of the present disclosure, a process for synchronizing the reproduction of the audio advertisement is disclosed herein to effectively reproduce the same advertisement simultaneously on the plurality of connected vehicles 1701, 1702, and 1703 entering the stop signal of the traffic light.

Referring to FIGS. 18(*a*)-(*c*), in another aspect of the present disclosure, a connected vehicle 1803 approaches and comes to a stop signal of the traffic light 1705, shown in FIG. 18(*a*). The connected vehicles 1801 and 1803 have components like those of the connected vehicles 101. First, it is determined whether there is another connected vehicle already stopped at the stop signal of the traffic light 1705. If there is no other connected vehicle already stopped at the stop signal of the traffic light 1705, then a first advertisement (including an audio and/or a video content) is immediately reproduced while the connected vehicle 1803 is stopped at the stop signal of the traffic light 1705. In the example, the connected vehicle 1803 may be configured to receive the first advertisement from the server 107 for reproduction or retrieve the first advertisement from one or more internal storages. Further, the first advertisement may be selected based in part on location information of the connected vehicle 1803.

On the other hand, as shown in FIG. 18(*b*), when it is determined that there is another connected vehicle 1801 already stopped at the traffic light 1705 and the connected vehicle 1801 is reproducing a first advertisement (e.g., "Coca Cola"), the connected vehicle 1803 is configured to wait until the first advertisement is finished. When the reproduction of the first advertisement by the connected vehicle 1801 is finished, the connected vehicle 1803 is configured to synchronize with the connected vehicle 1801 for reproduction of a second advertisement as shown in FIG. 18(*c*). That is, the timings of reproduction of the second advertisement by the first and second connected vehicles are controlled so that the first connected vehicle 1801 and the second connected vehicle 1803 are configured to simultaneously reproduce the second advertisement using external speakers and/or external displays while the first connected vehicle 1801 and the second connected vehicle 1803 are stopped at the stop signal of the traffic light 1705. Further, in an aspect of the present disclosure, the synchronization among the connected vehicles 1801 and 1803 may be obtained through the server 107 over the network. Alternatively, the synchronization among the connected vehicles 1801 and 1803 may be obtained through vehicle-to-vehicle communications between the connected vehicles 1801 and 1803.

Figure 19:
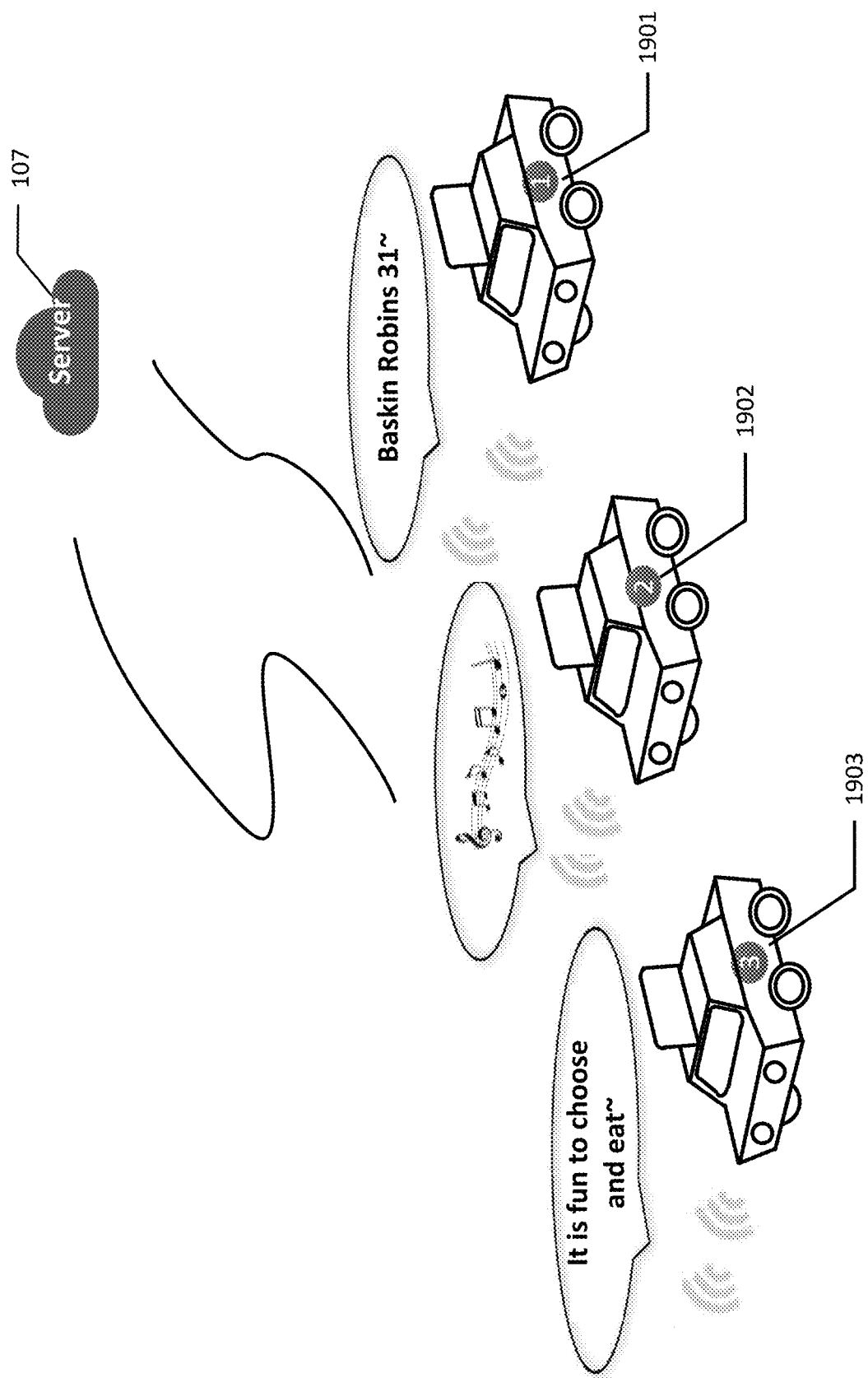
FIG. 19 conceptually illustrates an example embodiment of the present technology in accordance with an aspect of the present disclosure.

FIG. 19 illustrates an example embodiment in accordance with an aspect of the present technology. In an aspect of the present disclosure, while a plurality of connected vehicles (or advertisement vehicles) are clustered together, the same advertisement may be reproduced through external speakers of connected vehicles, having the external speakers form a stereo system, thereby an effect of delivery of the advertisement will likely be high on people outside the connected vehicles.

By way of example, in an aspect of the present disclosure, as shown in FIG. 19, when a plurality of connected vehicles 1901, 1902, and 1903 (having components similar to those of the connected vehicles 101) are stopped and commanded to form a cluster for the purpose of reproducing a same advertisement via the plurality of connected vehicles 1901, 1902, and 1903, via external speakers and/or external displays of the connected vehicles. In the example, each of the external speakers of the connected vehicle is configured to form a stereo system to increase the effect of the advertisement delivery.

Further, by way of example, the server 107 over a network may determine, based in part on location of the plurality of connected vehicles 1901, 1902, and 1903, profiles of people (e.g., traits or characteristics of people), or advertiser preferences that an ice cream advertisement be reproduced as a stereo advertisement by the cluster of connected vehicles 1901, 1902, and 1903 at a specific location. That is, the three connected vehicles are configured to reproduce the same advertisement as a stereo advertisement. For example, the connected vehicle 1902 may be configured to play a background music (BGM) for the ice cream advertisement via its external speakers, the connected vehicle 1903 may be configured to reproduce an audio content of the advertisement, e.g., "It is fun to choose and eat~" via its external speakers and the connected vehicle 1901 may be configured to reproduce another audio content of the advertisement, e.g., "Baskin Robins 31~" via its external speakers, thereby playing the advertisement as the stereo advertisement. In the example, there is no need to separately synchronize an audio advertisement, and thus the effect of an advertisement delivery power can be increased.

In an aspect of the present disclosure, the connected vehicle 1902 may become a master and the connected vehicles 1901 and 1903 may become slaves in a master-slave environment for reproducing the same advertisement. The master may assign different roles to slaves and may control timings of reproduction of the same advertisement on the plurality of connected vehicles as the cluster.

Further, in the example, the server 107 over the network is configured to send commands and control the plurality of connected vehicles 1901, 1902, and 1903 to reproduce the same ice cream advertisement as a stereo advertisement. However, in another aspect of the present disclosure, the group of connected vehicles 1901, 1902, and 1903 may form a cluster on an ad-hoc basis by communicating with each other. The master vehicle may be determined among the group of connected vehicles 1901, 1902, and 1903 to by the server 107. Alternatively, the master vehicle may be determined via ad-hoc communications among the group of connected vehicles 1901, 1902, and 1903 to. Also, the server 107 may send the same advertisement to the plurality of connected vehicles in the cluster and assign different roles to the connected vehicles for reproducing the same advertisement as the stereo advertisement. In another implementation, the different roles may be determined based in part on profiles of the connected vehicles (e.g., types of vehicles, color, make, size, etc.). As such, by delivering an advertisement in a more interesting way, e.g., a stereo advertisement using a plurality of connected vehicles, the effect of delivery of the advertisement may be greatly increased on people who are exposed to the stereo advertisement.

In another aspect of the present disclosure, as shown in FIG. 19, the one or more advertisements may be reproduced as a cluster advertisement or an interactive advertisement, using the plurality of connected vehicles as an advertisement platform. In an aspect of the present disclosure, an advertisement platform for reproducing one or more advertisements may include a plurality of connected vehicles forming a cluster of connected vehicles. The cluster of connected vehicles is configured to reproduce the one or more advertisements as a cluster advertisement or an interactive advertisement. Further, in an aspect of the present disclosure, the reproduction of the cluster advertisement may include reproduction of the same advertisement in synchronization with other connected vehicles in the cluster. Also, in another aspect of the present disclosure, the reproduction of the interactive advertisement may include reproduction of the one or more advertisements among the cluster, in which the plurality of connected vehicles may be assigned different roles in the reproduction of the interactive advertisement. In another aspect of the present disclosure, the reproduction of the cluster advertisement or the interactive advertisement may be controlled either by a server over a network or by a master connected vehicle among the cluster. Further, in another aspect of the present disclosure, the reproduction of the interactive advertisement may be configured to respond to input from a person who views the interactive advertisement reproduced by the cluster. Furthermore, in an aspect of the present disclosure, in the example, the one or more advertisements are provided by a server over a network, by one or more in-vehicle storage systems, or by one or more removable storage systems.

Figure 20:
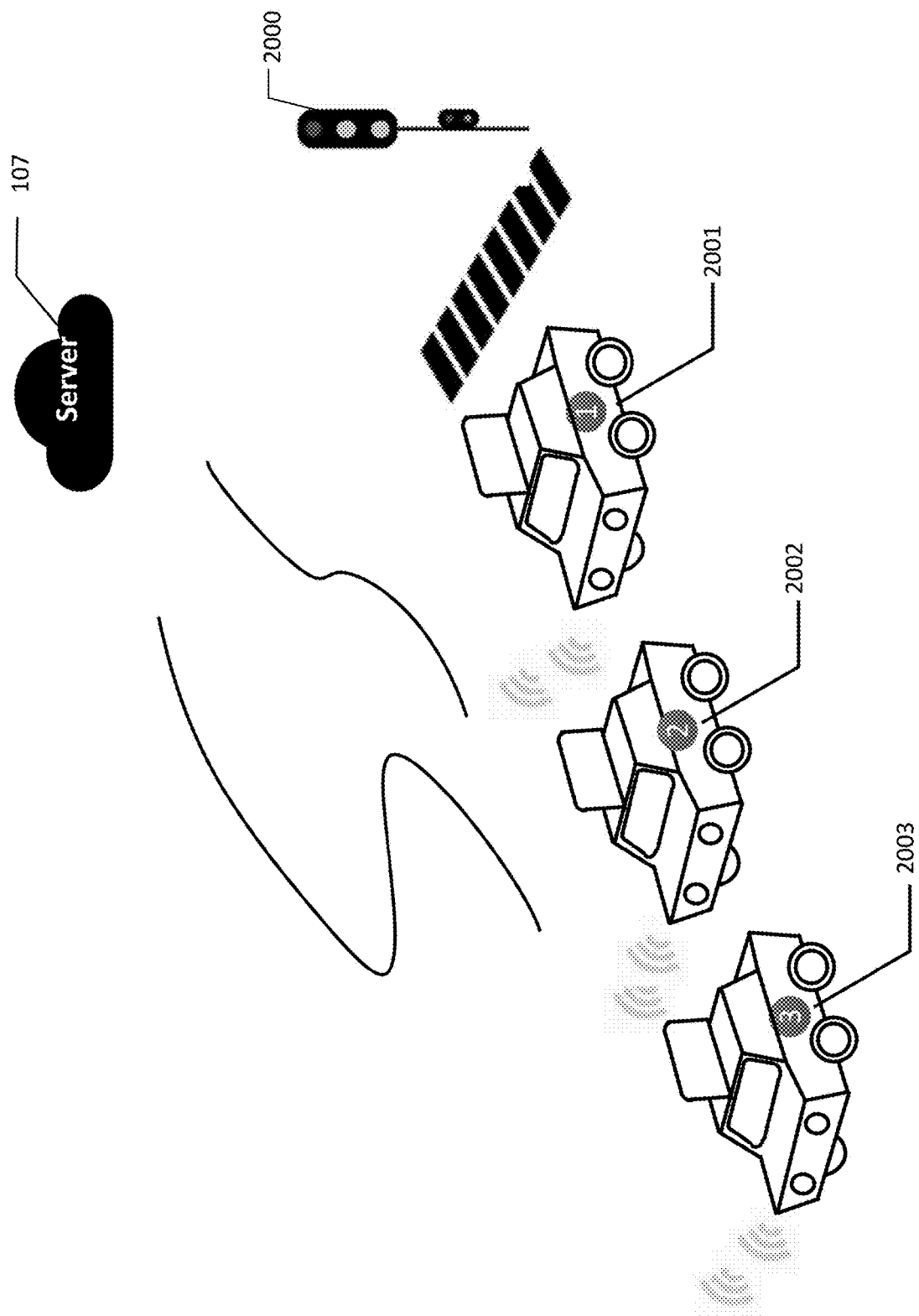
FIG. 20 conceptually illustrates an example embodiment of the present technology in accordance with an aspect of the present disclosure.

FIG. 20 illustrates an example embodiment in accordance with an aspect of the present technology. In an aspect of the present disclosure, a plurality of connected vehicles may be configured to reproduce or play one or more advertisements in various forms as a group, to increase an effect of the advertisement. During driving, it may be impossible to reproduce an advertisement through external speakers of the connected vehicles due to the Doppler effect. Thus, to increase the effect of the advertisement, when the connected vehicles are stopped or slowing down, a plurality of connected vehicles may be controlled to reproduce or play the same advertisement through external speakers of the connected vehicles participating in a parade.

By way of example, as shown in FIG. 20, a plurality of connected vehicles 2001, 2002, and 2003 (each having components like those of the connected vehicle 101) may come to a stop at a traffic stop 2000. The plurality of connected vehicles 2001, 2002, and 2003 may be controlled to reproduce the same advertisement at the same time. Alternatively, in another aspect of the present disclosure, the same advertisement may be played in a tune song form or a continuous manner, to increase the effect of the advertisement. In an aspect of the present disclosure, the playback or reproduction format of the same advertisement may be determined based in part on profiles of the connected vehicles or profiles of people in a surrounding area, advertiser preferences, or the like.

In another aspect of the present disclosure, the same advertisement may be reproduced when the connected vehicles are parked in a certain area or when the speed of the connected vehicles is below a certain level, e.g., 25 mph.

Further, in the example, the server 107 over the network is configured to control the plurality of connected vehicles 2001, 2002, and 2003 to reproduce the same advertisement as a group of connected vehicles (or as a cluster advertisement). However, in another aspect of the present disclosure, the group of connected vehicles 2001, 2002, and 2003 may form a cluster, and reproduce the same advertisement upon a command from a master vehicle. The master vehicle may be determined among the group of connected vehicles 2001, 2002, and 2003 by the server 107. Alternatively, the master vehicle may be determined via ad-hoc communications among the group of connected vehicles 2001, 2002, and 2003.

Furthermore, in another aspect of the present disclosure, as mentioned herein with reference to various embodiments including those of FIGS. 17-20, when a plurality of connected vehicles participating in an advertisement event are stopped at a traffic light or parked at a certain location or moving with a speed lower than a predetermined speed, the plurality of connected vehicles is configured to reproduce the same advertisement via external speakers of the connected vehicles in a coordinated manner. The coordinated manner may include a simultaneous reproduction of the same advertisement or a sequential reproduction of the same advertisement as a round advertisement among the plurality of connected vehicles.

In the present disclosure, the term "round advertisement" as used herein means an advertisement which can be reproduced by two or more connected vehicles. In a round advertisement, similar to a round song, one group of connected vehicles (or a first connected vehicle) starts off reproducing an advertisement and the next group of connected vehicles (or a second connected vehicle) starts to reproduce the same advertisement a bit later. When a group gets to the end of the advertisement, the group reproduces the same advertisement again, replaying the advertisement several times.

Further, in another aspect of the present disclosure, between reproductions of advertisements for products, one or more video reviews of the products by actual consumers may be reproduced, thereby increasing the effect of the advertisements. By way of example, when a plurality of vehicles is stopped at a stop signal of a traffic light, there may be an excellent opportunity to utilize one or more video advertisement because there is enough time for external viewers to be exposed to the advertisement reproduced on the connected vehicles. The connected vehicles are configured to receive from the server (e.g., ADC server) one or more review videos of products by real consumers and reproduce one or more review videos between the advertisements. In an aspect of the present disclosure, the one or more video reviews may be selected by an advertiser. The ADC server may provide an option to the advertiser such that the advertise can i) search for related user review videos using a video advertisement platform, including but not limited thereto, e.g., YouTube®, and ii) select review videos with high viewer counts among the searched review videos. As a result, by playing consumer produced review videos between advertisements on the connected vehicles, more consumers can be attracted and consumer loyalty to product brands may be greatly increased.

Figure 21:
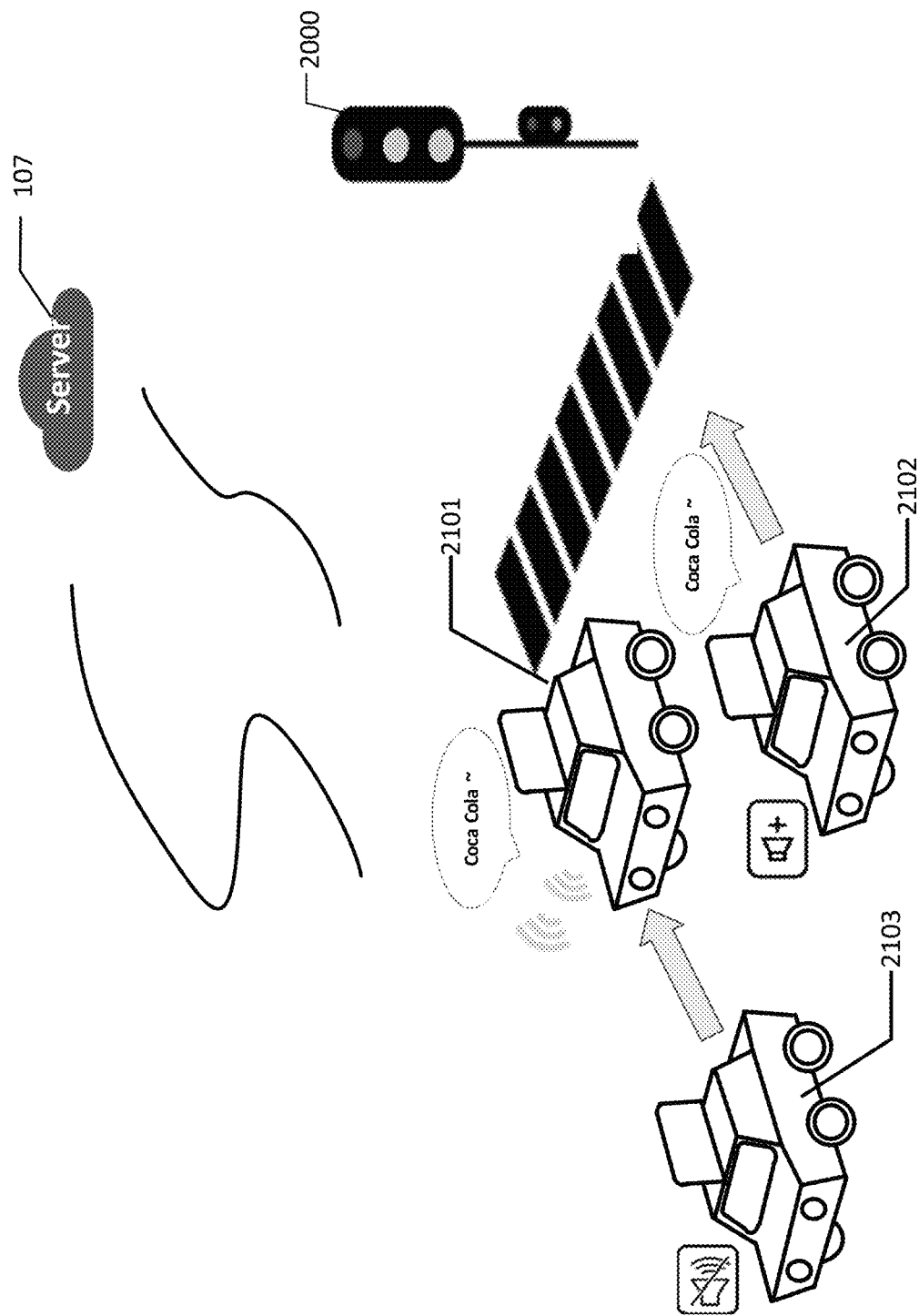
FIG. 21 conceptually illustrates an example embodiment of the present technology in accordance with an aspect of the present disclosure.

FIG. 21 illustrates an example embodiment in accordance with an aspect of the present technology. In another aspect of the present disclosure, and by way of example, as shown in FIG. 21, the server 107 may be configured to monitor and detect that a plurality of connected vehicles 2101, 2102, and 2103 (each having components like those of the connected vehicle 101) are entering a stop signal at a traffic light 2000. When it is determined that a same audio advertisement is to be played or reproduced through external speakers of the connected vehicles 2101, 2012, and 2013, the server 107 is configured to send control and command instructions to each of the connected vehicles 2101, 2102, and 2103, so that the reproduction of the audio advertisement is synchronized.

By way of example, in the example, the server 107 is configured to detect that the connected vehicle 2103 is about to enter a particular zone, based on location information received from the connected vehicle 2103. In the event that a particular audio advertisement is to be reproduced in the particular zone, the server 107 may be configured to send commands and control messages, along with an advertisement, to the connected vehicle 2103 which is approaching the traffic light 2000. It is noted that the connected vehicle 2103 may further be configured to reproduce the advertisement inside the connected vehicle 2103, while turning off the external speakers, before entering the stop signal. Upon entering the stop signal, however, the connected vehicle 2103 may turn on the external speakers for reproducing the audio advertisement via the external speakers. Further, the connected vehicle 2102 may be configured to gradually increase the volume of the external speaker(s) in accordance with the driving speed of the connected vehicle 2102.

Also, in an aspect of the present disclosure, in the example, all the connected vehicles 2101, 2102, and 2103 entering the stop signal may be controlled by the server 107 to reproduce the same audio advertisement via the external speakers at the same time in a most natural manner, to increase the effect of the advertisement.

Further, in the example, although the server 107 over the network is configured to control the plurality of connected vehicles 2101, 2102, and 2103 to reproduce the same advertisement in a coordinate manner. However, in another aspect of the present disclosure, the connected vehicles 2101, 2102, and 2103 may communicate with each other and reproduce the audio advertisement, upon entering the particular zone and the stop signal, independent of command and control by the server 107.

As such, the same audio advertisement may be effectively reproduced in a synchronized manner using external speakers of the connected vehicles entering a stop signal in a particular zone, thereby increasing the effect of the audio advertisement.

In an aspect of the present technology, a method or methodology for delivering advertisements using a plurality of connected vehicles is disclosed. The plurality of connected vehicles is configured to participate in an advertisement event and each connected vehicle is configured to receive one or more instructions from a server over a network to cluster near or at a target area for reproducing an advertisement in a coordinated manner as a group of the connected vehicles. Alternatively, each connected vehicle is configured to receive one or more instructions from one of the connected vehicles over another network. In another aspect, the advertisement event may be a parade or a mission, and the plurality of vehicles participating in the advertisement event may be determined based in part on vehicle profiles or user preferences.

Further, when the advertisement event is a parade, the method is further configured to include continuously monitoring movements of the plurality of connected vehicles participating in the parade by the server over the network, or alternatively by one of the connected vehicles over another network. In an aspect of the present disclosure, during the parade, the method further includes displaying vehicle identification information of a preceding vehicle to follow in the parade on an internal display of the connected vehicle. In another aspect of the present disclosure, the method further includes displaying vehicle identification information of the connected vehicle on an external display of the preceding vehicle that the connected vehicle is following in the parade. In another aspect of the present disclosure, the method is further configured to include displaying on an internal display an indication of whether the connected vehicle is at a right position in the parade.

In another aspect of the present disclosure, the method is further configured to include driving a predetermined route near or around the target are with a predetermined number of turns around the predetermined route, while reproducing the same advertisement in the coordinated manner as the group of connected vehicles, thereby increasing an effect of the advertisement on people outside the connected vehicles.

The predetermined number of turns around the predetermined route may be determined in advance by the server over the network, based in part on location of an advertiser, a density of traffic, or a density of people on the predetermined route.

In another aspect of the present disclosure, the method is further configured to include receiving in advance, prior to arrival at or near the target area, real-time information on whether a minimum number of connected vehicles for a carry-out of the advertisement event has already arrived at or near the target area. Further, when it is determined that the minimum number of connected vehicles that are needed for the carry-out of the advertisement event has not reached within a predetermined period of time, the method is further configured to include receiving a cancellation notice of the advertisement event from the server over the network. Further, when it is determined that the minimum number of connected vehicles that are needed for the carry-out of the advertisement event has reached within a predetermined period of time, the method is further configured to include providing a reward to drivers of the connected vehicles participating in the advertisement event for participating in the advertisement event. In an aspect of the present disclosure, the method is further configured to include providing a penalty to a driver of a connected vehicle participating in the advertisement event when the connected vehicle is determined to deviate from the carry-out of the advertisement event in which the driver of the connected vehicle has previously indicated to participate.

In another aspect of the present disclosure, when a first connected vehicle of the plurality of connected vehicles participating in the advertisement event is stopped at a traffic light, the first connected vehicle is configured to reproduce via an external speaker of the first connected vehicle an audio content of the advertisement. When a second connected vehicle of the plurality of connected vehicles participating in the advertisement event is stopped at the traffic light, the second connected vehicle is configured to wait until the reproduction of the audio content of the advertisement by the first connected vehicle is finished, and the first and second connected vehicles are configured to reproduce the same advertisement in a synchronized manner as the group of connected vehicle while the first and second connected vehicles are stopped at the traffic light.

In another aspect of the present disclosure, the method is further configured to include, when the plurality of connected vehicles participating in the advertisement event is configured to reproduce the advertisement as a cluster advertisement, reproducing the cluster advertisement as a stereo advertisement among the plurality of connected vehicles.

In another aspect of the present disclosure, when the connected vehicles participating in the advertisement event are stopped at a traffic light or parked at a certain location or moving with a speed lower than a predetermined speed, the method is further configured to include reproducing the same advertisement via external speakers of the connected vehicles in the coordinated manner. The coordinated manner includes a simultaneous reproduction of the same advertisement or a sequential reproduction of the same advertisement as a round advertisement among the plurality of connected vehicles. In another aspect of the present disclosure, when it is determined that the connected vehicles are coming to a stop, the method is further configured to include controlling the reproduction of the same advertisement on external speakers of the connected vehicles so that an audio volume of the same advertisement is increased in accordance with lower speeds of the connected vehicles that are coming to the stop.

Figure 22:
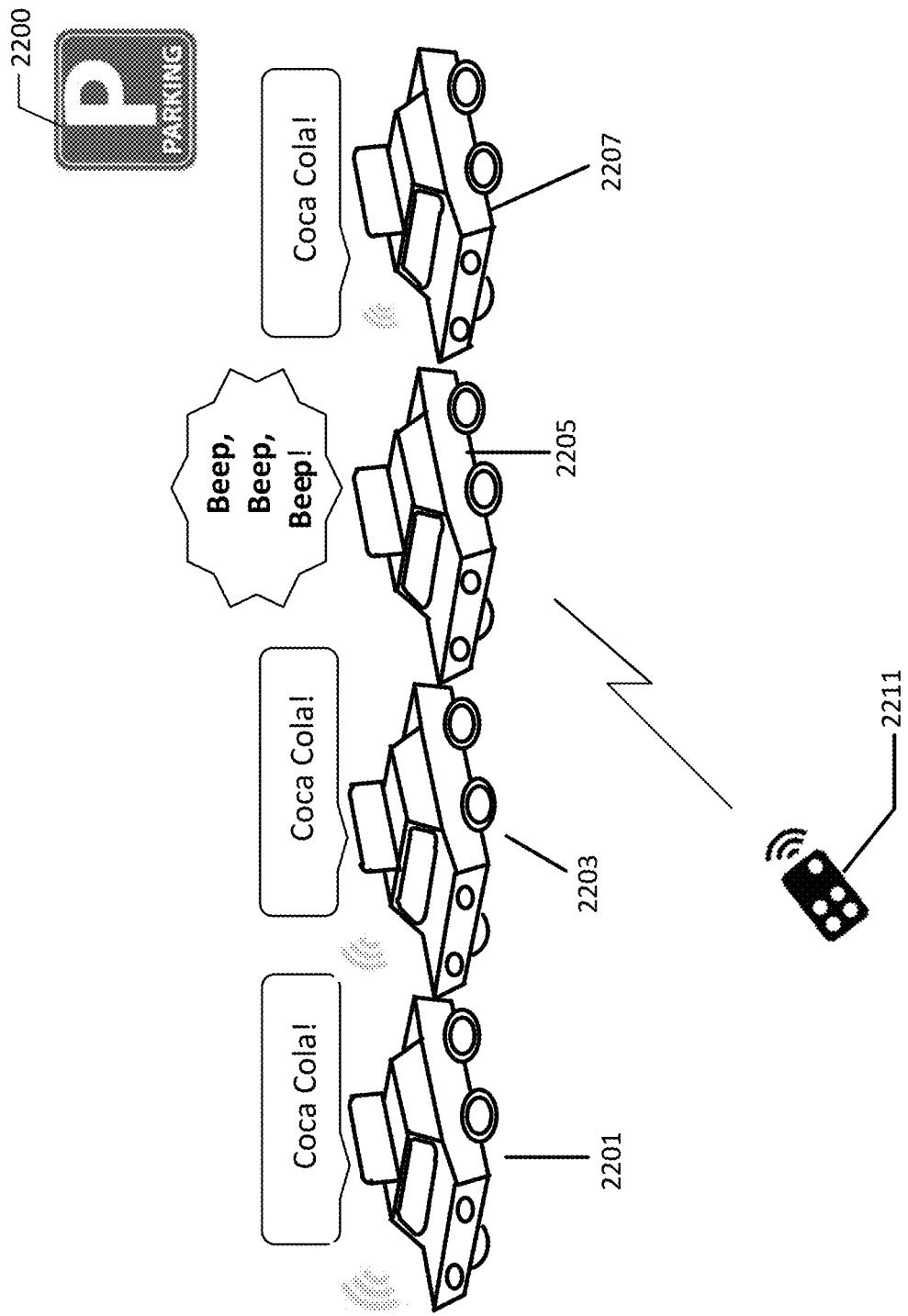
FIG. 22 conceptually illustrates an example embodiment of the present technology in accordance with an aspect of the present disclosure.

FIG. 22 illustrates an example embodiment in accordance with an aspect of the present technology. To maximize an effect of an advertisement, it is necessary to design various scenarios for when the advertisement needs to be output or reproduced. By way of example, in an aspect of the present disclosure, a same audio content of an advertisement (or the same audio advertisement) may be reproduced by a plurality of connected vehicles that are parked in a parking lot (e.g., a parking lot of a department store or the like) when a specific event occurs in the parking lot.

In an aspect of the present disclosure, in FIG. 22, a connected vehicle 2205 is parked among a plurality of other connected vehicles 2201, 2203, and 2207 in a parking lot 2200 of a department store. Each of the connected vehicles 2201, 2203, 2205, and 2207 have components like those of the connected vehicle 101. When a driver of the connected vehicle 2205 presses a button on a remote controller 2211 to lock or unlock the doors of the connected vehicle 2205, a wireless signal is generated from the remote controller 2211. The connected vehicle 2205 receives and determines that the wireless signal from the remote controller 2211 is for the connected vehicle 2205 and authenticates and respond to a command embedded in the wireless signal. When a lock command may be recognized, the connected vehicle 2205 produces a beeping sound to alert the user of the remote controller 2211 that the doors of the connected vehicle are locked. Alternatively, when an unlock command may be recognized, the connected vehicle 2205 produces a being sound to alert the user of the remote controller 2211 that the doors of the connected vehicle are unlocked.

In the example, when transmission of the wireless signal from the remote controller 2211 is detected, a plurality of connected vehicles 2201, 2203, and 2207 are configured to reproduce a same audio content of an advertisement (or an audio advertisement) at the same time, for example, "Coca Cola", relating to a specific event in the parking lot. In an aspect of the present disclosure, the audio advertisement may be received from a server like 107 over a network based in part on location information of the plurality of connected vehicles 2201, 2203, 2205, and 2207 as well as advertiser profiles.

Further, in another aspect of the present disclosure, after the connected vehicle 2205 is parked in the parking lot, the connected vehicle 2205 may communicate with the server over the network to receive instructions and/or advertisement details for reproduction on either external displays or external speakers of the connected vehicle 2205 while the connected vehicle 2205 is parked in the parking lot.

Further, in another aspect of the present disclosure, when transmission of a signal from the remote controller 2211 to the connected vehicle 2205 is detected, the plurality of connected vehicles 2201, 2203 and 2207 may reproduce a parking advertisement (either an audio advertisement or a video advertisement) using external displays and/or external speakers.

Further, in another aspect of the present disclosure, when transmission of a signal from the remote controller 2211 to the connected vehicle 2205 is detected, the plurality of connected vehicles 2201, 2203 and 2207 may reproduce a cluster advertisement (either an audio advertisement or a video advertisement) using external displays and/or external speakers. The cluster advertisement may be a non-interactive group advertisement or an interactive group advertisement.

In an aspect of the present disclosure, a system of connected vehicles is disclosed for delivering one or more advertisements, where the connected vehicles are parked near each other in a parking lot and the connected vehicles are configured to reproduce one or more advertisements when one of the connected vehicles is determined to receive a signal from a remote controller associated with the one of the connected vehicles. Further, the one or more advertisements may be selected for reproduction based at least in part on a profile of a user of the one of the connected vehicles, vehicle profile information, or location information of the connected vehicles. Also, the connected vehicles are configured to form a cluster and reproduce an audio content of an advertisement via external speakers of the connected vehicles in a synchronized manner as a group of the connected vehicles, when the one of the connected vehicles is determined to receive the signal from the remote controller associated with the one of the connected vehicles. Further, the connected vehicles are configured to reproduce the audio content of the advertisement after the one of the connected vehicles outputs a sound/or a flash in response to the signal from the remote controller associated with the one of the connected vehicles.

As such, by reproducing an advertisement using connected vehicles parked in a parking lot, an effect of advertisement relating to a specific event may be greatly increased.

As noted above, an autonomous vehicle is also known as a self-driving vehicle that is capable of sensing its environment and moving with little or no human input. In an aspect of the present disclosure, a connected vehicle may include an autonomous driving unit and an advertisement identification unit. The autonomous driving unit may be configured to sense its driving environment and drive the connected vehicle without human input. The advertisement identification (ID) unit is configured to recognize and identify, through one or more digital signal processing functions, one or more visual contents of an advertisement reproduced on external displays of other connected vehicles or billboard displays nearby.

Figure 23:
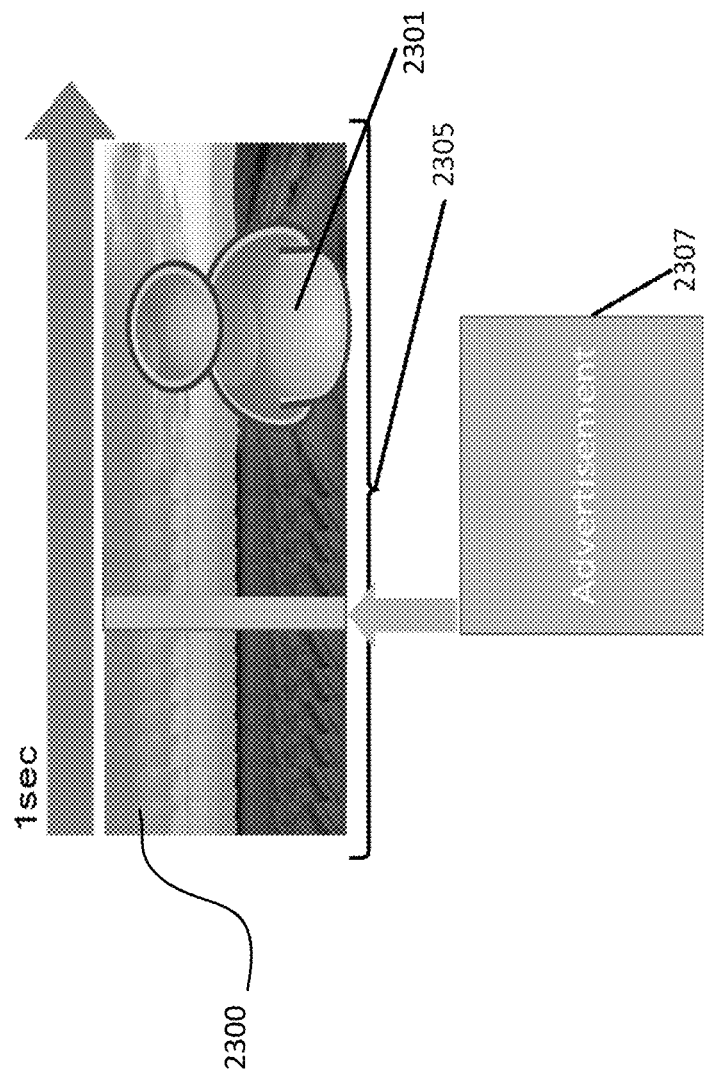
FIG. 23 conceptually illustrates an example embodiment of the present technology in accordance with an aspect of the present disclosure.

FIG. 23 illustrates an example embodiment in accordance with an aspect of the present technology. In an aspect of the present technology, the connected vehicle such as 101 may be an autonomous vehicle. When autonomous vehicles are in common use and fully commercialized, there may be a possibility that external displays of a vehicle may interfere with driving of an autonomous vehicle, e.g., the connected vehicle 101. In fact, there was an accident in which a TESLA model S vehicle in an autonomous mode collided with a large trailer, resulting in that an occupant of the vehicle was killed. The reason for the accident is known as a failure of an autopilot unit to detect and distinguish between a white trailer and a brightly lit sky. When autonomous vehicles are commercialized and in common use, a greater number of advertisements may be reproduced on external displays on vehicles. As such, there may be a greater chance of having such an accident. In fact, there may be a need for an advanced technique for the connected vehicles to detect and recognize an advertisement displayed as a series of image frames displayed on the external displays.

In an aspect of the present disclosure, the advertisement identification unit of the connected vehicle may be configured to recognize one or more visual contents of the advertisement reproduced on the external display, based in part on a number of pixels of the external display. That is, a minimum number of pixels in a display panel may be used by one or more sensors to recognize a display panel. That is, the number of pixels may be used as a marker for identifying the display panel, and on-board sensors on a connected vehicle may recognize an image reproduced on the display panel as an "advertisement".

In another aspect of the present disclosure, the advertisement identification unit of the connected vehicle may be configured to recognize the one or more visual contents of the advertisement reproduced on the external display, based in part on identification information embedded in image frames of the advertisement displayed on the external display. That is, the identification information may include, but not limited thereto, e.g., quick response (QR) code, numbers or symbols, or the like to indicate that the images are part of the advertisement.

Further, in another aspect of the present disclosure, as shown in FIG. 23, the advertisement identification unit of the connected vehicle may be configured to recognize the one or more visual contents of the advertisement reproduced on the external display, based in part on one or more image frames inserted in the one or more visual contents of the advertisement. The one or more image frames are configured to inform the advertisement identification unit that the one or more visual contents of the advertisement comprise a plurality of image frames that are designed to be reproduced on the external displays of the connected vehicles. By way of example, one of the plurality of image frames for the advertisement may be allocated for a frame to indicate it as an advertisement.

In one implementation, as shown in FIG. 23, an advertisement frame 2307 may be inserted among the plurality of frames 230 in an advertisement 2300 during one second reproduction time such that an image of a person 2301 in the advertisement in 2300 is recognized as part of the advertisement, not a real person. A driver may not recognize with naked eyes, but one or more processing systems of the connected vehicle may recognize the presence of a marker embedded in the plurality of image frames of a video content of the advertisement such that the video content is recognized as an advertisement by the one or more processing systems. Further, other image processing techniques may be employed to embed one or more markers in the images of an advertisement displayed on the external display. As such, using one or more aspects of the present technology disclosed herein, safety of autonomous connected vehicles may be greatly improved.

Figure 24:
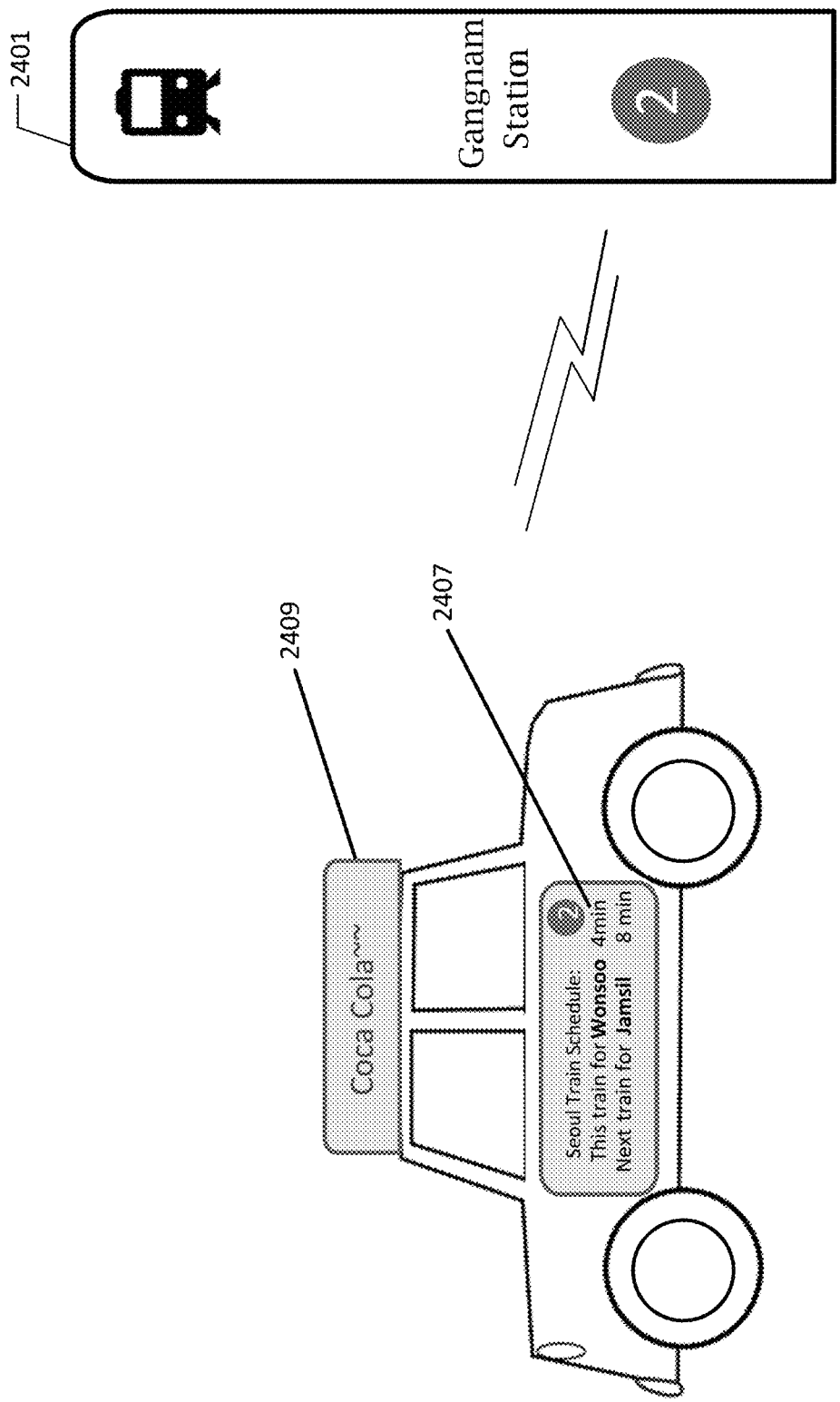
FIG. 24 conceptually illustrates an example embodiment of the present technology in accordance with an aspect of the present disclosure.

FIG. 24 illustrates an example embodiment in accordance with an aspect of the present technology. In the event of providing an advertisement on an external display of a connected vehicle, there may be an issue that the advertisement effect may be significantly reduced when the attention of the passers-by or pedestrians cannot be focused. If the attention of the passers-by or pedestrians is focused by using a beeping sound, it may be ignored when the beeping sound is continuously reproduced, or it may create a negative effect of the advertisement on people because passers-by or pedestrians may be annoyed or dislike hearing the beeping sound. As such, in an aspect of the present disclosure, the attention of passers-by or pedestrians is focused by allowing their gaze to stay on the external display of the connected vehicle at their own will through provisioning of necessary information to the passers-by or pedestrians outside a connected vehicle.

In an aspect of the present disclosure, a connected vehicle including am advertisement system configured to reproduce one or more advertisements on one or more externals displays of the connected vehicle is disclosed. The one or more advertisements include non-commercial information for the public interest. The advertisement system may be further configured to reproduce the non-commercial information between reproductions of commercial advertisements on the one or more external displays, and the commercial information may include news, weather, traffic, sports scores, or other public information or announcements. Further, the non-commercial information may further include location-based information relating to transporting schedules, including but not limited thereto, bus schedules (e.g., bus arrival and/or departure times, etc.), train schedules (e.g., train arrival and/or departure times, etc.), flight schedules (e.g., flight arrival and/or departure times, etc.), etc. when the connected vehicle is disposed at or near a bus station, a train station, or an airport or an airport shuttle stop or the like.

By way of example, as shown in FIG. 24, a connected vehicle 2405 (having components like those of the connected vehicle 101) may be configured to provide certain useful information to passers-by or pedestrians to befriend and focus their attention on an advertisement reproduced on external displays and/or external speakers by the connected vehicle 2405. In particular, FIG. 24 illustrates an example embodiment that the connected vehicle 2405 situated near a subway station 2401 is configured to display useful information on an external display 2407, such as train schedules including expected arrival times of subways at the subway station 2401.

In other aspects of the present disclosure, the useful information may include weather, news, sports score, public announcements or the like. In an aspect of the present disclosure, while the useful information is being displayed on the external display 2407 of the connected vehicle 2405, an external display 2409 may be configured to reproduce one or more commercial (or paid) advertisements. In another aspect of the present disclosure, when the connected vehicle 2405 may be disposed near or at a bus stop, the connected vehicle 2405 may be configured to display useful information related to bus schedules including estimated arrival time of a bus, etc. Also, when the connected vehicle 2405 is disposed near or at an airport or an airport shuttle service stop, the connected vehicle 2405 may be configured to display useful information related to flight schedules.

Further, in the example shown in FIG. 24, the connected vehicle 2405 may be configured to receive, based on location information of the connected vehicle 2405, other relevant advertisements and/or useful information from a server over a network like the one 107, and reproduce the received advertisements and/or useful information on the external displays 2409 or 2407.

Furthermore, in a case of providing an advertisement on a rear external display of the connected vehicle 2405 while driving on a highway or the like, useful information such as a road congestion situation, accident occurrence information or the like may be received from the server over the network and reproduced on the rear external display of the connected vehicle 2405 for the benefit of drivers of following the connected vehicle 2405. Further, in this example, the useful information may be reproduced between reproductions of commercial advertisements on the rear external display of the connected vehicle 2405.

Additionally, in another aspect of the present disclosure, the connected vehicle 2405 may be configured to communicate with a subway station 2401 or a bus stop or any other public facility to receive other useful information for reproduction on the external display 2409 or 2405. The communications may be done using one-way broadcast or two-way communications technologies including WiFi, near field wireless, short range wireless, or any other wireless technologies.

As such, using various methodologies disclosed herein, various useful information (e.g., news, weather, train or bus schedules, traffic conditions, accident information, etc.) may be provided to people nearby the connected vehicle 2405 to focus the attention of the people (e.g., passers-by, pedestrians or drivers in vehicles) outside the connected vehicle 2405 and befriend them, thereby increasing the effect of an advertisement reproduced on one or more external displays of the connected vehicle 2405.

Figures 25A, 25B:
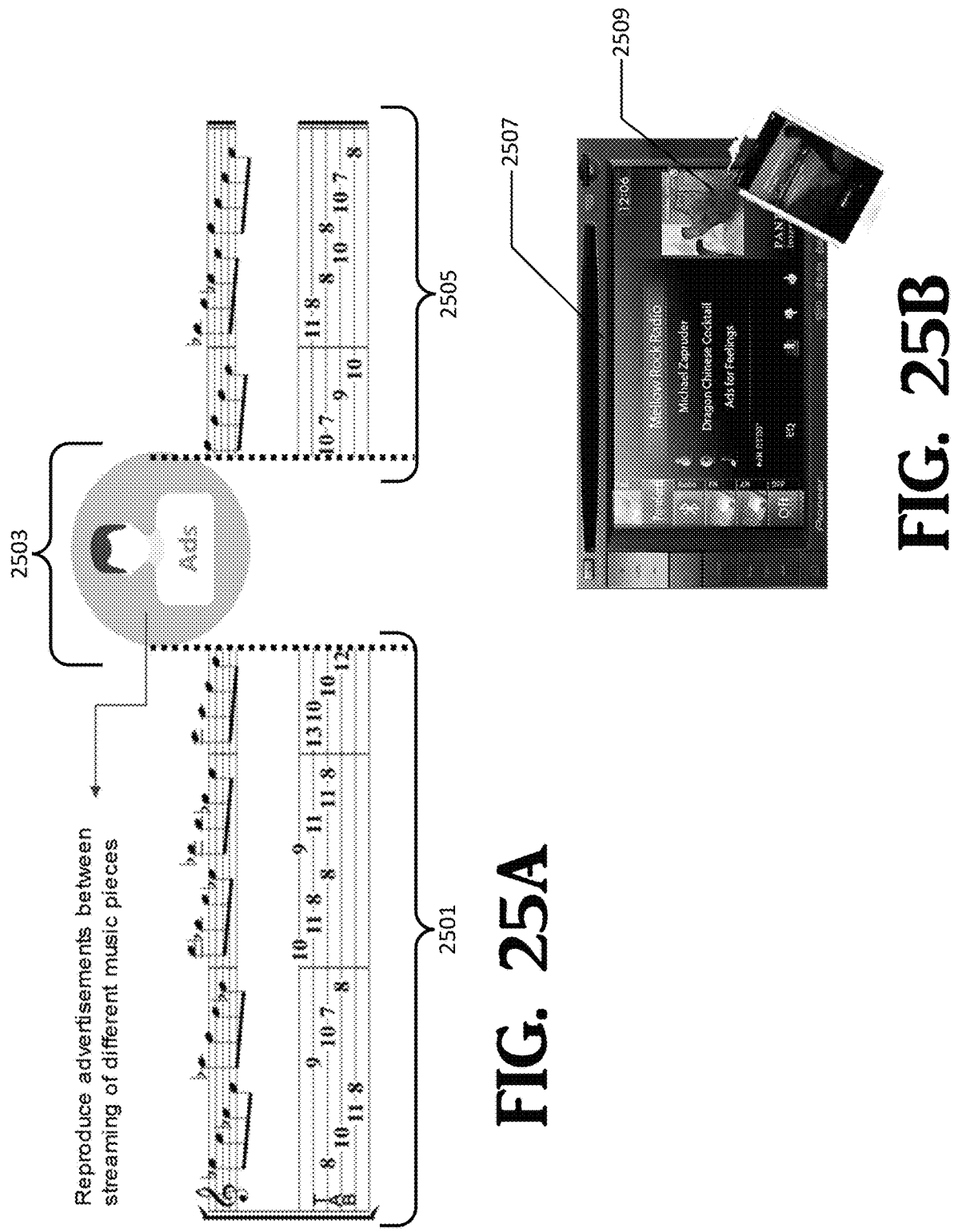
FIGS. 25A and 25B conceptually illustrates example embodiments of the present technology in accordance with an aspect of the present disclosure.

To further increase an effect of an advertisement on drivers or passengers in connected vehicles, FIGS. 25 and 16 provide example embodiments of the present technology. In an aspect of the present disclosure, a connected vehicle including an in-vehicle audio system and an advertisement system is disclosed. The in-vehicle audio system is configured to stream music inside the connected vehicle, and the advertisement system is coupled to the in-vehicle audio system and configured to detect the streaming of music and to reproduce one or more advertisements for one or more occupants inside the connected vehicle. The one or more occupants may include a driver and/or passenger in the connected vehicle. Further, the advertisement system is further configured to reproduce the one or more advertisements between streaming of music pieces. FIGS. 25A and 25B illustrate an example embodiment in accordance with an aspect of the present technology. Often, there is a need for reproducing an advertisement, not interfering with user's needs (or drivers' needs) or desires to listen to music while driving a vehicle.

In an aspect of the present disclosure, to meet such a need of the user of a connected vehicle like 101, a reproduction of an advertisement via in-vehicle audio and/or internal displays inside the connected vehicle 101 may be controlled in such a way that the reproduction of the advertisement is placed between music pieces.

By way of example, as shown in FIG. 25A, after the end of a streaming music 2501 that the user is listening to, an advertisement 2503 may be reproduced via the in-vehicle audio and/or internal displays in the connected vehicle and the streaming of another music piece 2505 is delayed until the end of the reproduction of the advertisement 2503. That is, timings of streaming music may be controlled so that the advertisement can be reproduced between two different music pieces. Further, in another aspect of the present disclosure, as shown in FIG. 25B, using an application in an in-vehicle system 2507, the streaming music and the advertisement 2509 may also be simultaneously provided to the user in the connected vehicle in a non-interfering manner. That is, in cooperation of an in-vehicle navigation system, the advertisement(s) may be reproduced in such a manner that the reproduction of the advertisement(s) does not interfere with audio guidance of the in-vehicle navigation system.

Figure 26:
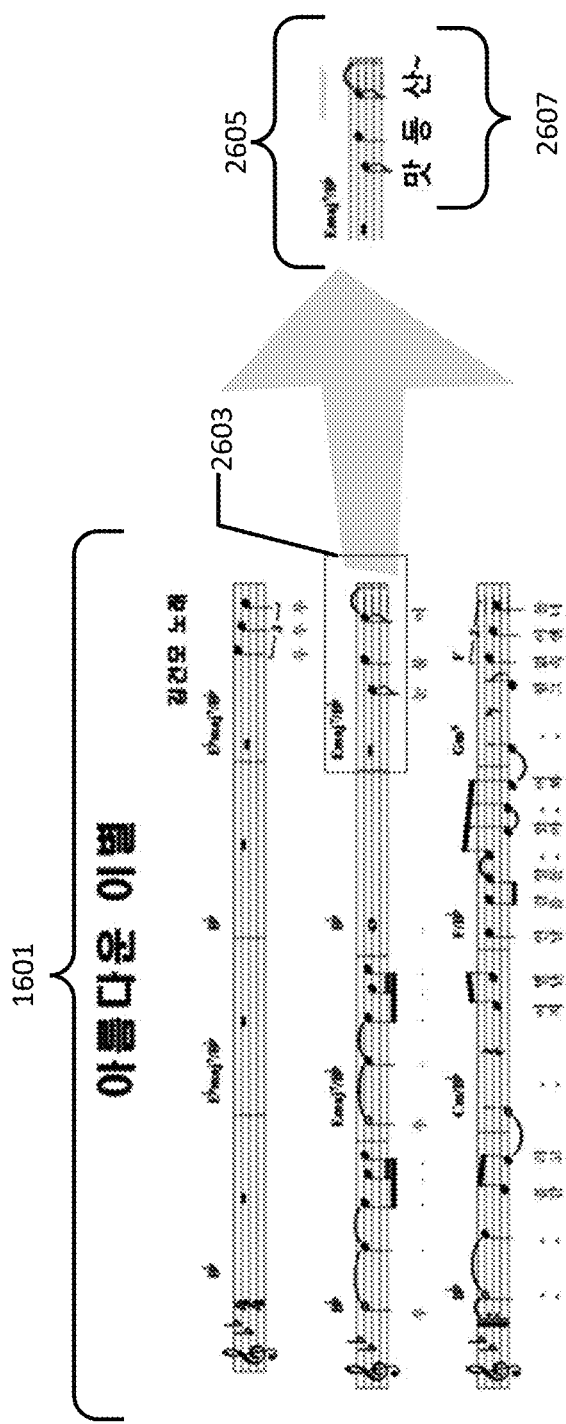
FIG. 26 conceptually illustrates an example embodiment of the present technology in accordance with an aspect of the present disclosure.

FIG. 26 illustrates an example embodiment in accordance with an aspect of the present technology. Most drivers listen to music while driving, and the driver's perception of music and their concentration is very high. To effectively provide an advertisement based on such driver's concentration, a tone rate or the like of the music to which the driver is listening in a connected vehicle is analyzed and an advertisement corresponding to a specific tone rate is reproduced by an advertisement system of the connected vehicle.

By way of example, and in an aspect of the present disclosure, as shown in FIG. 26, it is possible to designate a specific segment or portion (e.g., a melody) of the music that the user is listening to, read a tone rate of the specific segment or the melody of the music and generate an advertisement content that corresponds to the tone rate of the specific segment or the melody of the music.

That is, in an aspect of the present disclosure, the advertisement system of the connected vehicle may be configured to create one or more advertisements based in part on one or more segments of music that is played inside the connected vehicle and reproduce the one or more advertisements at an end of the streaming of the music. Further, the one or more advertisements may be created based in part on a melody of music and profile information of the one or more occupants in the connected vehicle. Further, the one or more advertisements may be created based in part on a melody of the music which is selected based on a number of characters in a commercial music. Furthermore, the one or more advertisements may also be reproduced within a predetermined period of time after the reproduction of the melody of the music is finished. Also, the advertisement system may be configured to control the reproduction of the one or more advertisements based in part on whether the music is played via a radio or a mobile device via Bluetooth. In the example, when the music is played via the Bluetooth, the music is streamed from the mobile device to an in-vehicle audio system.

By way of example, as shown in FIG. 26, a specific segment or melody 2603 of the music 1601 may be selected by either the advertisement system of the connected vehicle or the server 107 over the network and based on the specific segment or melody 2603 of the music 1601 a corresponding advertisement 2605 which is an audio content may be generated using advertisement characters 2607. Further, in an aspect of the present disclosure, a number of characters to be used in commercial music (CM) of the advertisement content may be considered in designating the specific segment in which the advertisement content is to be created (or generated).

Furthermore, the advertisement system of the connected vehicle may be further configured to control in such a way that the generated advertisement content is provided after the song ends or immediately after a specific segment or melody is reproduced. Alternatively, the server over the network may be configured to control the reproduction of the generated advertisement content either after the song ends or immediately after the specific segment or melody is reproduced. In another aspect of the present disclosure, the sever over the network or the advertisement system of the connected vehicle may further be configured to use different control methods depending on whether the music is played through a radio station or via Bluetooth. As such, based on the driver's preference or concentration on the music to which the driver is listening while driving, a new advertisement content may be generated and reproduced, adopting a tone rate or melody of the music so as to drastically increate the effect of advertisement on the driver in the connected vehicle.

With electric vehicles, there may be a problem that the electric vehicles do not produce noise due to operation and may threaten the safety of pedestrians near the electric vehicles. To solve this problem, in many different countries it has become mandatory for a manufacturer to install a virtual engine sound system in an electric vehicle. The virtual engine sound system is a system for producing a warning noise, providing synthetic audio feedback mimicking the sound of an idling internal combustion engine. The virtual engine sound system is designed to alert pedestrians to the presence of electric vehicles travelling at low speeds or when stopped at a location.

Figure 27A:
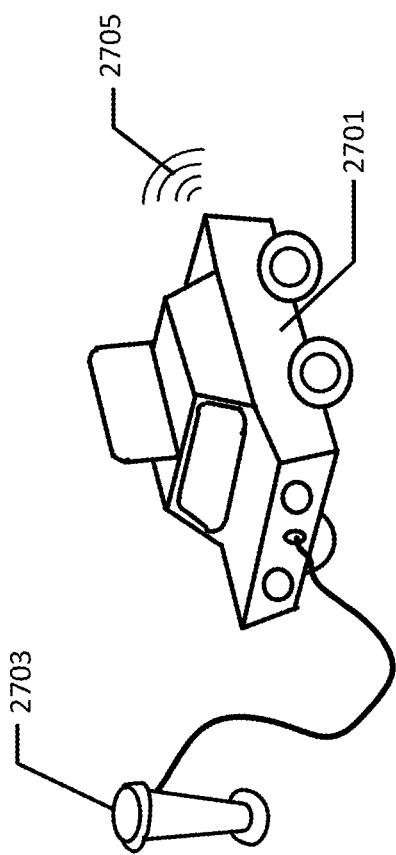
FIGS. 27A and 27B conceptually illustrates example embodiments of the present technology in accordance with an aspect of the present disclosure.
Figure 27B:
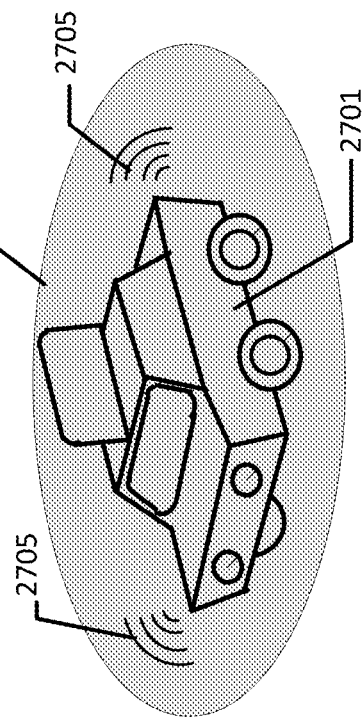

FIGS. 27A and 27B illustrate example embodiments in accordance with aspects of the present technology. In an aspect of the present disclosure, an advertisement reproduction system (e.g., the advertisement system 200 or part thereof, as shown in FIG. 2C) may be used to replace a virtual engine sound system in an electric vehicle.

By way of example, a connected vehicle comprising an electric vehicle including an advertisement system is disclosed. The advertisement system is configured to reproduce one or more audio advertisements in a continuous manner via external speakers of the connected vehicle in place of imaginary engine sounds, for safety of people outside the connected vehicle. In an aspect of the present disclosure, the advertisement system may be further configured to detect presence of people near the connected vehicle via one or more sensors. Further, the connected vehicle may be configured to reproduce a same advertisement substantially simultaneously with other connected vehicles disposed near the connected vehicle or to reproduce an advertisement in coordination with other connected vehicles.

Further, the connected vehicle may be further configured to include an auxiliary batter for external speakers, and the connected vehicle is further configured to reproduce one or more advertisements when the presence of people near the connected vehicle is detected via one or more proximity sensors of the connected vehicle. Furthermore, the external speakers of the connected vehicle may include one or more vibration speakers. A vibration speaker is a speaker configured to turn a solid surface into a speaker.

In the present disclosure, the term "proximity sensors" as used herein mean one or more electric sensors able to detect the presence of nearby objects without any physical contact, by emitting an electromagnetic field or a beam of electromagnetic radiation, e.g., infrared or the like. The proximity sensors may include inductor sensors, capacitive sensors, photoelectric sensors, magnetic sensors, or the like.

In one implementation, as shown in FIG. 27A, when the connected vehicle 2701 (including components like those of the connected vehicle 101) is stopped and/or charging from a charging station 2703, the connected vehicle 2701 (e.g., an electric vehicle) may be configured to continuously output or reproduce one or more advertisements 2705 via external speakers outside the connected vehicle 2701. In an aspect of the present disclosure, the connected vehicle 2705 may be further configured to continuously reproduce brand names, commercial music (CM) songs, slogans or the like, to alert pedestrians near the connected vehicle 2701. Further, as shown FIG. 27B, the connected vehicle 2701 may be configured to check whether there is a pedestrian or a moving object in a nearby area (e.g., a proximity area 2707) of the connected vehicle 2701 and reproduce one or more advertisements 2701 while moving a slow speed or parked in a space. That is, using its external sensors (e.g., proximity sensors or the like) outside the connected vehicle 2701, the connected vehicles 2701 may be configured to detect presence of a pedestrian or any moving object, and reproduce the one or more advertisements 2705 accordingly.

In another aspect of the present disclosure, when a plurality of connected vehicles is clustered together and configured to output different advertisements, there may be a problem that the advertisements may be unclear to the pedestrian due to inferences of the multiple advertisements. In such a case, the plurality of connected vehicles may be configured to communicate with each other and control a reproduction order of the multiple advertisements among the plurality of connected vehicles. Alternatively, the plurality of connected vehicles may further be configured to reproduce the same advertisement at the same time in a synchronized manner such that the pedestrian may recognize and understand an amplified or enhanced version of the advertisement that is being reproduced by the connected vehicles.

As such, by using an advertisement reproduction system of the connected vehicle 2701 a virtual engine sound system may be replaced in the connected vehicle 2701, and the safety of the pedestrian may be provided in a cost-effective way.

Further, in another aspect of the present disclosure, the connected vehicle 2701 may be configured to include one or more vibrations speakers (or vibration transducers) as part of an advertisement system (e.g., the advertisement system 200 of the connected vehicle 101). The vibration speakers turn surfaces into speakers. The one or more vibrations speakers may be mounted on a front, a left side, a right side, or under a hood of the connected vehicle 2701 and use the surface of a body of the connected vehicle 2701 to produce a rich and full sound. As such, in an aspect of the present disclosure, the connected vehicle 2701 may include one or more vibration speakers as part of an advertisement reproduction system (or the advertisement system) of the connected vehicle 2701 to reproduce one or more audio advertisements outside the connected vehicle 2701.

FIG. 28 illustrates an example embodiment in accordance with an aspect of the present technology. In an aspect of the present disclosure, to enhance public goods and interests as well as ensuring safe driving of a connected vehicle, one or more rewards may be paid to a driver of the connected vehicle (e.g., a driver of a rental vehicle) for safe driving and observing traffic laws and regulations. Alternatively, for observing traffic laws and/or regulations 2803 on the road, other benefits including a discount in auto insurance premium may be paid to an owner of the connected vehicle 2801 (having components like those of the connected vehicle 101). By way of example, the server 107 is configured to continuously monitor driving conditions of the connected vehicle 2801 by a driver. When it is determined that the connected vehicle 2801 (or the driver of the connected vehicle 2801) observed all traffic laws and/or regulations for safe driving on the road, the server 107 is configured to pay or give one or more rewards to the connected vehicle 2801 and/or the driver of the connected vehicle 2801.

Further, the server 107 is configured to monitor each connected vehicle such as 2801 and determine whether the driver of the connected vehicle 2801 has observed traffic laws and/or regulations on the road. Also, logs for the connected vehicle including a number of observances of traffic laws and regulations including speed limits, traffic signs, etc. may be created and kept. When the number of observances is determined to be greater than a predetermined value, then the server 107 may be configured to pay out one or more rewards to the driver of the connected vehicle 2801 or the owner of the connected vehicle 2801 in various forms, including but not limited to, a discount in insurance premium, a credit for future use, etc.

Further, in another aspect of the present disclosure, the server 107 may be configured to provide hints or guidance as to traffic enforcement or provide alert messages to the driver of the connected vehicle 2801 when the connected vehicle 107 is about to drive through one or more traffic enforcement areas. In another aspect of the present disclosure, when the connected vehicle 2801 is a rental vehicle, the reward may be provided to the driver of the connected vehicle 2801 in the form of an additional use time, a discount in rental fee, a future credit for use, a coupon for other services, or the like such that the safe driving of the connected vehicle may be encouraged.

Furthermore, in another aspect of the present disclosure, the plurality of connected vehicles may be configured to provide guidance information via external displays and/or external speakers of the connected vehicles while driving on the road, when an emergency vehicle approaches the plurality of connected vehicles on the road. For example, in one implementation, the server 107 may control driving paths of the connected vehicles on the road when an emergency vehicle coming towards the plurality of connected vehicles on the road. The server 107 may also be configured to detect the presence of the emergency vehicle on the road in a vicinity of the connected vehicles and control the driving routes of the connected vehicles on the road such that one of a plurality of lanes may be open and emptied for a quick pass through of the emergency vehicle.

In the example, the server 107 may be further configured to predict entry of the emergency vehicle into the driving route of the connected vehicles. Also, through the reproduction of route guidance via external displays and/or speakers of the connected vehicles, it will be possible to allow other vehicles to yield the right of way for the emergency vehicles. In an aspect of the present disclosure, the server 107 may further be configured to provide a deduction in penalties, taxes, etc. for the connected vehicles that operated in accordance with the driving route guidance provided by the server. Alternatively, fines may be imposed on the connected vehicles that fail to operate in accordance with the driving route guidance when the emergency vehicles are on the road. As such, by encouraging the yield of the right of way to the emergency vehicles and/or other vehicles, it will be possible to contribute to the public goods and interest. Further, in another aspect of the present disclosure, when there is a need for putting out a public notice, such as an emergency warning or alert, e.g., an earthquake warning, a war warning, a traffic warning, a disaster warning, or other emergency warnings or the like, the server 107 may be configured to receive such emergency warning or information from a public or government server, and send the information to the plurality of connected vehicles such that the information may be reproduced on the external displays and/or speakers of the connected vehicles, thereby contributing to the public goods and interest.

As such, by using connected vehicles as a platform, public goods and interests may be advanced and safe driving of the connected vehicles may also be encouraged through various forms of incentives including one or more rewards for compliance with traffic laws and regulations or the like.

Even though particular combinations of features are disclosed in the specification and/or recited in the claims, these combinations are not intended to limit the disclosure of the present technology. Further, the methods or methodologies for the present technology disclosed herein, including one or more systems, apparatuses, and flowcharts, in accordance with various aspects of the present disclosure, may be implemented in software, hardware, any combinations of software and hardware, a computer program or firmware incorporated in a computer readable medium for execution by a controller, a processor, a computer, or a processing system that includes one or more processors. Examples of processors include microcontrollers, microprocessors, digital signal processors (DSPs), discrete hardware circuits, gated logic, state machines, programmable logic devices (PLDs), FPGAs, and other suitable hardware configured to perform various functions described herein.

While, for simplicity, the methodologies are described herein as a series of steps or acts, it is to be understood that the claimed subject matter is not limited by the order of steps or acts, as some steps or acts may occur in different orders and/or concurrently with other acts from that shown and described herein. Further, not all illustrated steps or acts, e.g., various flowcharts, may be required to implement various methodologies according to the present technology disclosed herein. Furthermore, the methodologies disclosed herein and throughout this specification are capable of being stored on an article of manufacture to facilitate transporting and transferring such methodologies to one or more processing systems.

The term "software" as used herein is to be construed broadly to mean any instructions, instruction sets, programs, subprograms, code, program code, software modules, applications, software packages, routines, objects, executables, threads of execution, procedures, functions, etc. including firmware, microcode, middleware, software, hardware description language, or the like. The software may also refer to general software, firmware, middleware, microcode, hardware description language, or etc. As noted above, the software may be stored on a computer-readable medium.

Examples of a computer-readable medium may include a non-transitory computer-readable medium, such as, by way of example, an optical disk, a magnetic storage device, a digital versatile disk, a flash memory, random access memory (RAM), read only memory (ROM), a register, programmable ROM (PROM), erasable PROM (EPROM), electrically erasable PROM (EEPROM), a removable disk, a flash memory device, and any other suitable medium for storing software that may be accessed and read by a processor or a processing system. It is also appreciated that one skilled in the art will recognize how best to implement the described functionality relating to adding new system functionalities to an existing network element, depending upon a application within design constraints.

The term "unit" or "component" as used herein means software, hardware, or any combinations thereof. A unit may be implemented as a software component, a hardware component, or any combinations thereof, including a processor, a central processing unit (CPU), a FPGA, logic, logic arrays, ASIC, DSP, microcontroller, microprocessor, etc. or any combinations thereof. The unit thus may include software components, task components, processes, procedures, functions, program code, firmware, micro-codes, circuits, data structures, tables, arrays, and variables.

The term "article of manufacture" is intended to encompass a computer program accessible from any computer-readable device, carrier, or medium. A singular form may include a plural form if there is no clearly opposite meaning in the context. Also, as used herein, the article "a" is intended to include one or more items. Further, no element, act, step, or instruction used in the present disclosure should be construed as critical or essential to the present disclosure unless explicitly described as such in the present disclosure.

As used herein, except explicitly noted otherwise, the term "comprise" and variations of the term, such as "comprising," "comprises," and "comprised" are not intended to exclude other additives, components, integers or steps. The terms "first," "second," and so forth used herein may be used to describe various components, but the components are not limited by the above terms. The above terms are used only to discriminate one component from other components, without departing from the scope of the present disclosure.

Also, the term "and/or" as used herein includes a combination of a plurality of associated items or any item of the plurality of associated items. Further, it is noted that when it is described that an element is "coupled" or "connected" to another element, the element may be directly coupled or directly connected to the other element, or the element may be coupled or connected to the other element through a third element. Also, the term "in" may include "in" and "on".

Further, the term "include" or "have" as used herein indicates that a feature, an operation, a component, a step, a number, a part or any combination thereof described herein is present. Further, the term "include" or "have" does not exclude a possibility of presence or addition of one or more other features, operations, components, steps, numbers, parts or combinations.

Although the present technology has been illustrated with specific examples described herein for purposes of describing example embodiments, it is appreciated by one skilled in the relevant art that a wide variety of alternate and/or equivalent implementations may be substituted for the specific examples shown and described without departing from the scope of the present disclosure. As such, the present disclosure is intended to cover any adaptations or variations of the examples and/or embodiments shown and described herein, without departing from the spirit and the technical scope of the present disclosure.

What is claimed is:

1. A system for delivering advertisements, the system comprising:
   a plurality of connected vehicles comprising automobiles, the plurality of connected vehicles participating in an advertisement event comprising a parade,
   wherein each of the plurality of connected vehicles is configured to receive an instruction from one of the connected vehicles over a first network or a server over a second network to cluster near or at a target area for the purpose of reproducing an advertisement in a coordinated manner as a group of the connected vehicles,
   wherein movements of the plurality of connected vehicles participating in the parade are continuously monitored by the one of the connected vehicles over the first network or the server over the second network,
   wherein each of the plurality of connected vehicles participating in the parade is configured to display vehicle identification information of a preceding vehicle to follow in the parade on an internal display of the connected vehicle,
   wherein each of the plurality of connected vehicles is configured to synchronize reproduction of one or more advertisements with other connected vehicles as a cluster advertisement, while participating in the advertisement event, and
   wherein the connected vehicles participating in the parade are configured to drive following a predetermined route near or around the target area with a predetermined number of turns around the predetermined route for the advertisement event, while reproducing a same advertisement in a coordinated manner as the group of connected vehicles, thereby increasing an effect of the advertisement on people outside the connected vehicles.

2. The system of claim 1, wherein each of the plurality of connected vehicles participating in the parade is configured to display an indication of whether the connected vehicle is at a right position in the parade.

3. The system of claim 1, wherein the preceding vehicle is configured to display vehicle identification information of a connected vehicle that is following in the preceding vehicle on an external display of the preceding vehicle.

4. The system of claim 1, wherein the predetermined number of turns around the predetermined route for the advertisement event is determined in advance by the server over the network, based in part on location of an advertiser, a density of traffic, or a density of people on the predetermined route.

5. The system of claim 1, wherein each of the plurality of connected vehicles is configured to receive in advance, prior to arrival at or near the target area, real-time information on whether a minimum number of connected vehicles for a carry-out of the advertisement event have already arrived at or near the target area.

6. The system of claim 5, wherein when it is determined that the minimum number of connected vehicles that are needed for the carry-out of the advertisement event is not reached within a predetermined period of time, the plurality of connected vehicles is configured to receive a cancelation notice of the advertisement event from the server over the network; and
   wherein when it is determined that the minimum number of connected vehicles that are needed for the carry-out of the advertisement event has reached within a predetermined period of time, drivers of the connected vehicles participating in the advertisement event receives a reward for participating in the advertisement event.

7. The system of claim 6, wherein a driver of a connected vehicle receives a penalty when the connected vehicle is determined to deviate from the carry-out instructions of the advertisement event in which the driver of the connected vehicle has previously indicated to participate.

8. The system of claim 1, wherein when a first connected vehicle of the plurality of connected vehicles participating in the advertisement event is stopped at a traffic light, the first connected vehicle is configured to reproduce, via an external speaker of the first connected vehicle, an audio content of the advertisement.

9. The system of claim 8, wherein when a second connected vehicle of the plurality of connected vehicles participating in the advertisement event is stopped at the traffic light, the second connected vehicle is configured to wait until the reproduction of the audio content of the advertisement by the first connected vehicle is finished; and
   wherein the first and second connected vehicles are configured to reproduce the same advertisement in a synchronized manner as a group of connected vehicles while the first and second connected vehicles are stopped at the traffic light.

10. The system of claim 1, wherein when the plurality of connected vehicles participating in the advertisement event is configured to reproduce the advertisement as a stereo advertisement.

11. The system of claim 1, wherein the connected vehicles participating in the advertisement event are stopped at a traffic light or parked at a certain location or moving with a speed lower than a predetermined speed, the connected vehicles are configured to reproduce the same advertisement via external displays and/or speakers of the connected vehicles in the coordinated manner as a cluster advertisement.

12. The system of claim 11, wherein the coordinated manner comprises a simultaneous reproduction of the same advertisement or a sequential reproduction of the same advertisement as a round advertisement among the plurality of connected vehicles.

13. The system of claim 11, wherein when it is determined that the connected vehicles are coming to a stop, the reproduction of the same advertisement on external speaker of the connected vehicles is controlled so that an audio volume of the same advertisement is increased in accordance with decreasing speeds of the connected vehicles coming to the stop.

14. The system of claim 1, wherein the system is configured to award a reward to a driver of a connected vehicle for safe driving, and wherein the reward is configured to include a discount in an auto insurance premium or other benefits.

* * * * *